United States Patent [19]

Sheehan et al.

[11] Patent Number: 4,527,241
[45] Date of Patent: Jul. 2, 1985

[54] AUTOMATIC COMBINE HARVESTER ADJUSTMENT SYSTEM

[75] Inventors: Ronald T. Sheehan; E. William Rowland-Hill, both of Lancaster; Carl E. Bohman, New Holland, all of Pa.

[73] Assignee: Sperry Corporation, New York, N.Y.

[21] Appl. No.: 413,196

[22] Filed: Aug. 30, 1982

[51] Int. Cl.³ .......................................... A01D 41/00
[52] U.S. Cl. ..................................... 364/424; 56/10.2
[58] Field of Search .............. 364/424, 551, 525, 900, 364/188, 568, 148, 189; 340/52 R, 52 F, 684; 307/10 AT; 56/10.2, DIG. 15

[56] References Cited

U.S. PATENT DOCUMENTS

| | | | |
|---|---|---|---|
| 4,064,394 | 12/1977 | Allen | 364/189 |
| 4,204,253 | 5/1980 | van den Hanenberg et al. | 364/189 |
| 4,236,594 | 12/1980 | Ramsperger | 307/10 AT |
| 4,259,829 | 4/1981 | Strubbe | 56/10.2 |
| 4,296,409 | 10/1981 | Whitaker et al. | 364/424 |
| 4,337,611 | 7/1982 | Mailander et al. | 56/10.2 |
| 4,376,298 | 3/1983 | Sokol et al. | 364/424 |
| 4,437,295 | 3/1984 | Rock | 56/10.2 |
| 4,466,231 | 8/1984 | Rowland-Hill et al. | 130/27 R |

*Primary Examiner*—Felix D. Gruber
*Assistant Examiner*—Thomas G. Black
*Attorney, Agent, or Firm*—Griffin, Branigan, & Butler

[57] ABSTRACT

The adjustment of operating parameters such as the sieve opening, concave opening, chaffer opening, rotor speed and/or fan speed is/are accomplished under the control of a microprocessor operating in response to the striking of keys on a keyboard. The combine harvester operator may select a particular parameter for adjustment by striking a key corresponding to that parameter. The desired setting of the selected parameter is then keyed into the keyboard and an ADJUST key struck to activate the adjustment process. Alternatively, the operator may strike a key corresponding to the crop to be harvested, a further key corresponding to the ambient moisture level of the crop, and then the ADJUST key. In this case the microprocessor reads from a stored table the values for adjusting all parameters so as to obtain a satisfactory sample and a maximum yield for the crop being harvested. The microprocessor sends signals to actuators for adjusting the various parameters and transducers sense the various parameters and provide information to the microprocessor for determining when the parameters have been adjusted to the selected values. A visual display is provided so that the operator may monitor the parameters and also observe entries keyed in at the keyboard.

17 Claims, 42 Drawing Figures

Fig. 7
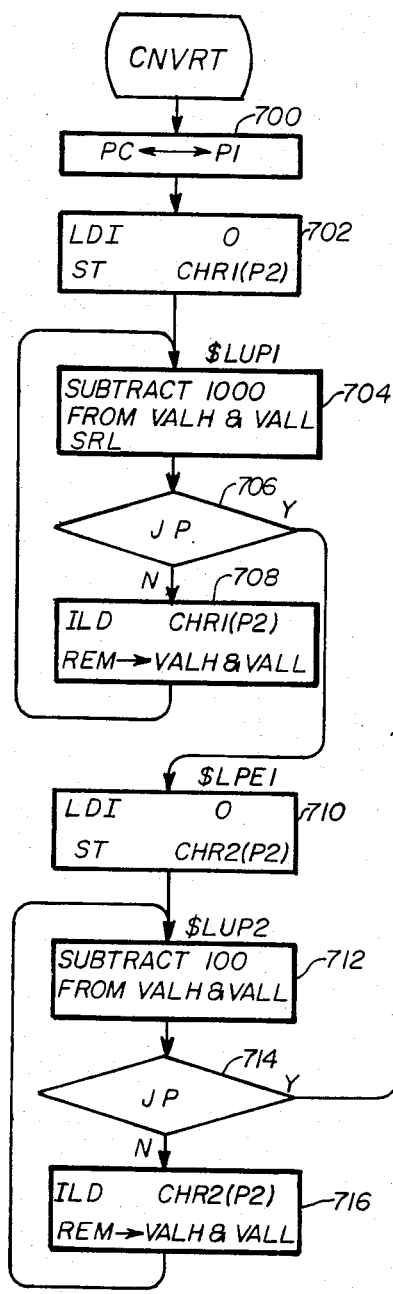
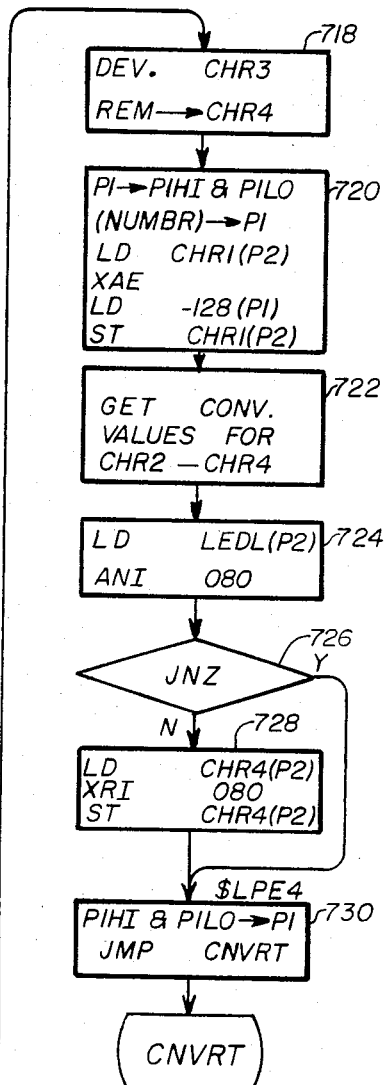
Fig. 8
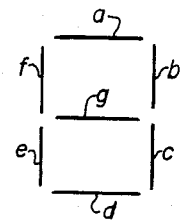

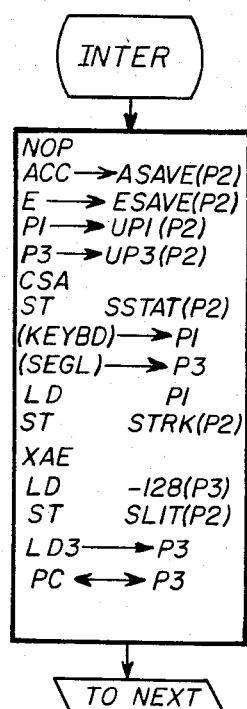
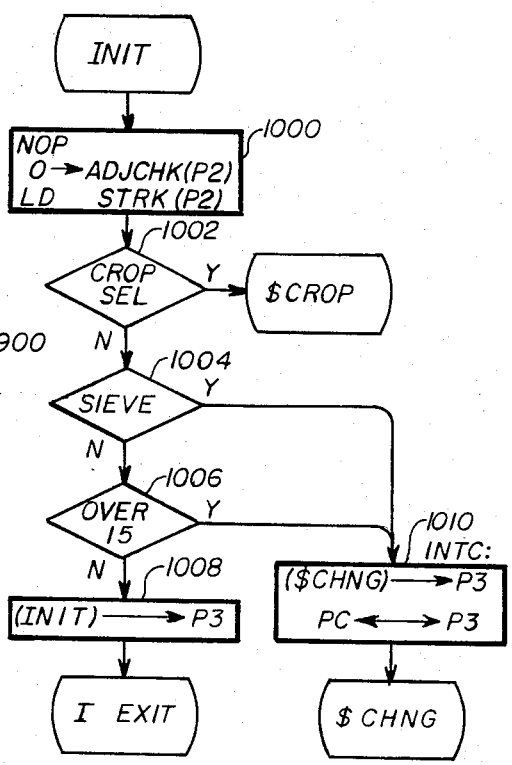
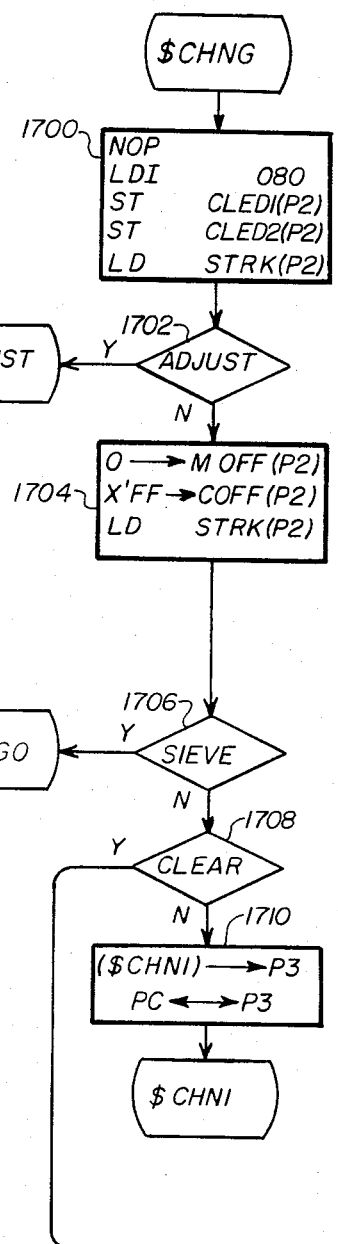
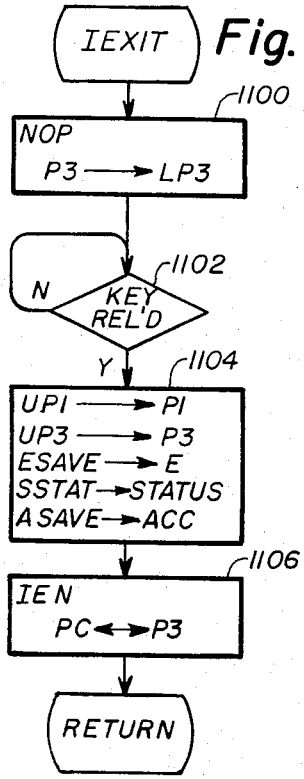
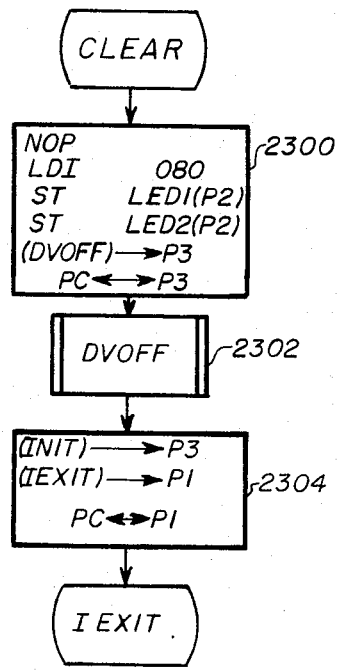
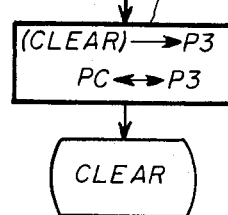

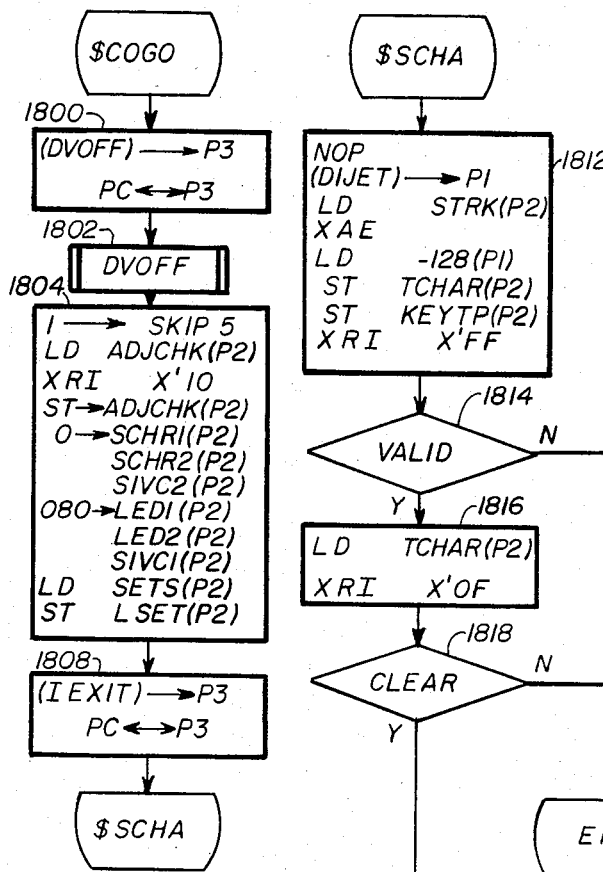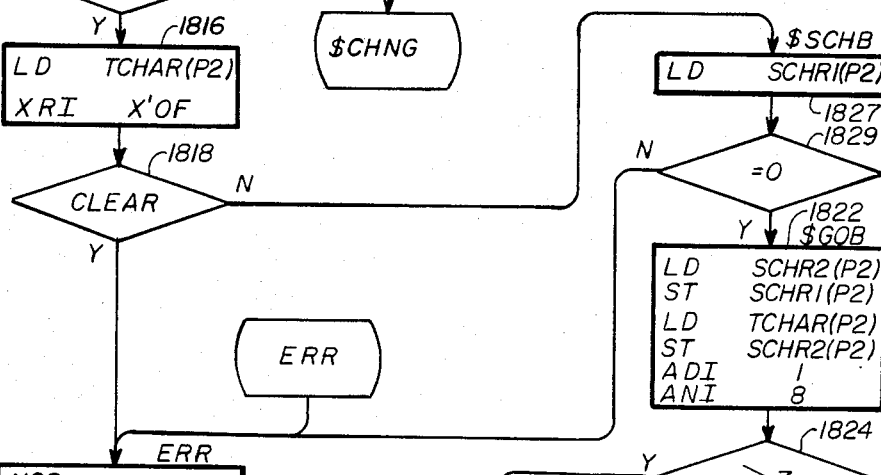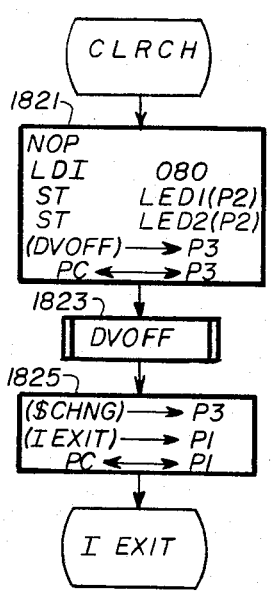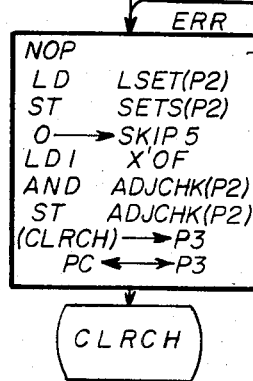
Fig. 18A  Fig. 18B  Fig. 18C

Fig. 20A
Fig. 20B
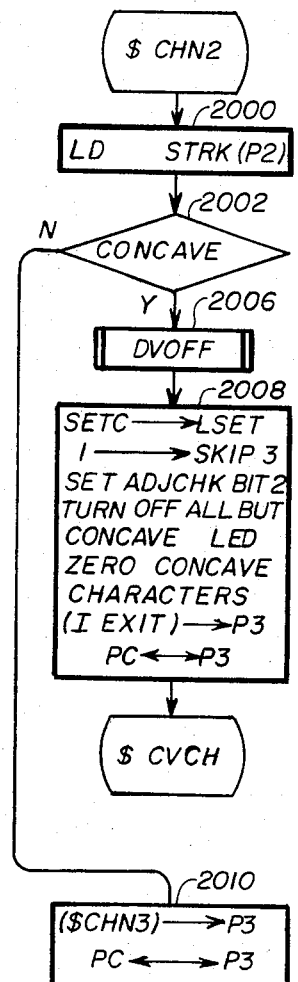
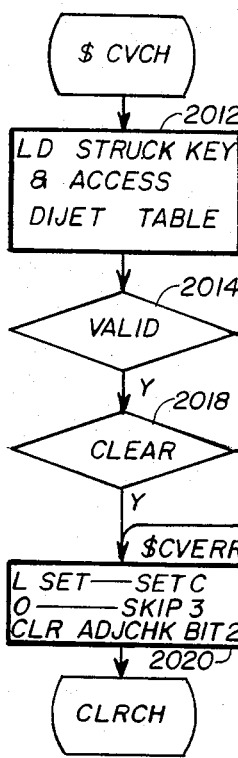
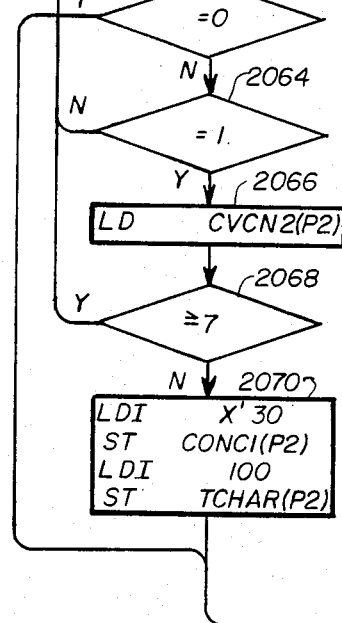
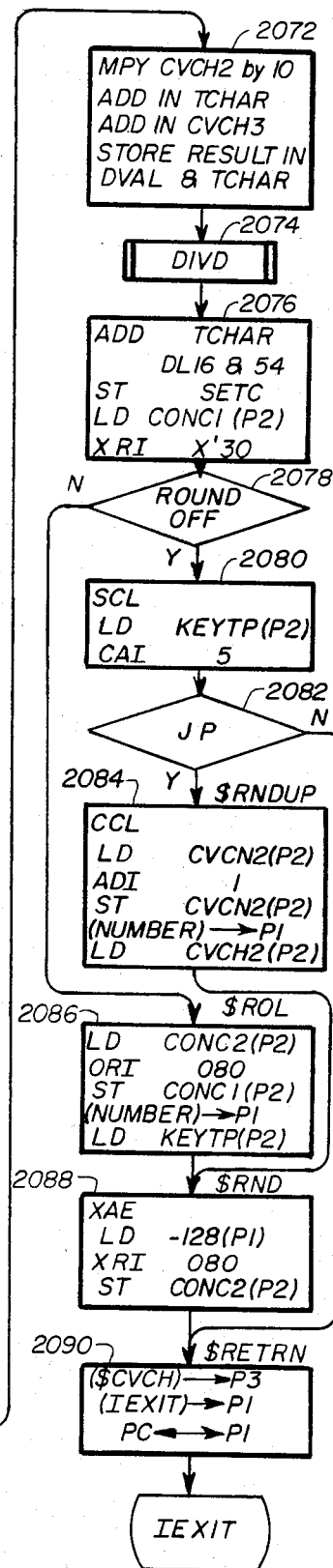

AUTOMATIC COMBINE HARVESTER ADJUSTMENT SYSTEM

BACKGROUND OF THE INVENTION

This invention relates to combine harvester control, and more particularly to a system for automatically adjusting the sieve opening, concave clearance, chaffer opening, rotor speed and fan speed in response to manipulation of a keyboard by a combine operator. The invention is particularly adapted for use in axial flow combine harvesters of the type disclosed in U.S. Pat. No. 3,742,686, but is readily adaptable for use in other types of combines.

In recent years considerable effort has been directed toward making the working conditions of a combine harvester operator more comfortable. The cab or operator's compartment has been glass enclosed to shut out noise and dirt, and to permit the cab to be air conditioned. For the enjoyment of the operator, radios and tape decks are offered as optional equipment. While these improvements have made the work of the operator more comfortable, they interfere with the traditional method of combine harvester adjustment where the operator, by manually operating controls in the cab, adjusted various operating parameters after visually observing and "listening" to the combine harvester operation.

Even where the traditional method of combine harvester adjustment can be employed unhampered, it is at best based on the expertise of the operator who must judge, from what he sees and hears, what parameters require adjustment, and how much adjustment is required. Thus, at any given time it is a matter of guesswork or considerable experience as to whether the cleaning sieve opening, chaffer sieve opening, concave clearance, rotor speed and fan speed are all correctly set for maximum yield for the particular crop being harvested and the crop moisture level.

BRIEF SUMMARY OF THE INVENTION

An object of the present invention is to provide an automatic combine harvester adjustment system, responsive to the manual selection of a crop and a crop moisture level, for automatically adjusting the cleaning sieve opening, chaffer sieve opening, concave clearance, rotor speed and fan speed to retrieve the maximum economic value from the crop.

An object of the present invention is to provide an automatic combine harvester (combine) adjustment system for adjusting various operating parameters of the combine in response to the striking of a device key to select the parameter, and the striking of one or more digit keys defining the value to which the parameter is to be adjusted.

An object of the present invention is to provide a method of automatically adjusting operating parameters of a combine harvester by storing in a table, sets of values representing operating parameters, each set of values including an adjustment value for each of the operating parameters, there being one set of values for each combination of a crop and a moisture level for that crop, and providing means for manually selecting one of the sets of values for application to actuators to adjust the parameters.

In a preferred embodiment, a combine harvester adjustment system constructed in accordance with the principles of the present invention comprises sensing means for sensing the present values of the parameters, analog to digital converter means for converting the analog outputs of the sensing means to digital signals, a keyboard for entering information into the system relative to the parameter or parameters to be adjusted, and a microprocessor system including a memory for storing a table of parameter adjustment values. A single parameter may be adjusted by striking a key on the keyboard identifying the parameter, and entering the value to which the parameter should be adjusted. The microprocessor system responds to the keyboard entry and the output of the analog to digital converter by producing output signals to an actuator which adjusts the selected parameter. Alternatively, all parameters may be adjusted by striking a crop key and a key indicating the crop moisture level. In response thereto, the microprocessor selects a set of adjustment values from the table in memory, compares these with the actual parameter values as provided by the analog to digital converter means, and sends signals to the actuators to adjust the parameters until the actual parameter values as provided by the analog to digital converter equal the values read from the table.

Other objects of the invention and its mode of operation will become apparent upon consideration of the following description and the accompanying drawings.

BRIEF DESCRIPTION OF THE DRAWINGS

FIG. 3 illustrates the operations performed by the microprocessor when power is turned on;

FIG. 7 illustrates the CNVRT subroutine;

FIG. 8 shows a typical digit display and identifies each segment of the display;

FIGS. 9-23 illustrate various subroutines of the Interrupt routine, as follows:

FIG. 9—INTER
FIG. 10—INIT
FIG. 11—IEXIT
FIG. 12—$CROP
FIG. 13—$CRPCH
FIG. 14—$MOYST
FIG. 15—$MOIST
FIG. 16—$MSTIN
FIG. 17—$CHNG
FIG. 18A—$COGO
FIG. 18B—$SCHA
FIG. 18C—CLRCH
FIG. 18D—GRNSV and $CORNSV
FIG. 19A—$CHN1
FIG. 19B—$CHCH
FIG. 19C—GRNCH and $CRNCH
FIG. 20A—$CHN2
FIG. 20B—$CVCH
FIG. 21A—$CHN3
FIG. 21B—$FNCH
FIG. 22A—$CHN4
FIG. 22B—$RTCH
FIG. 23—CLEAR

DETAILED DESCRIPTION OF THE INVENTION

Figure 1A:
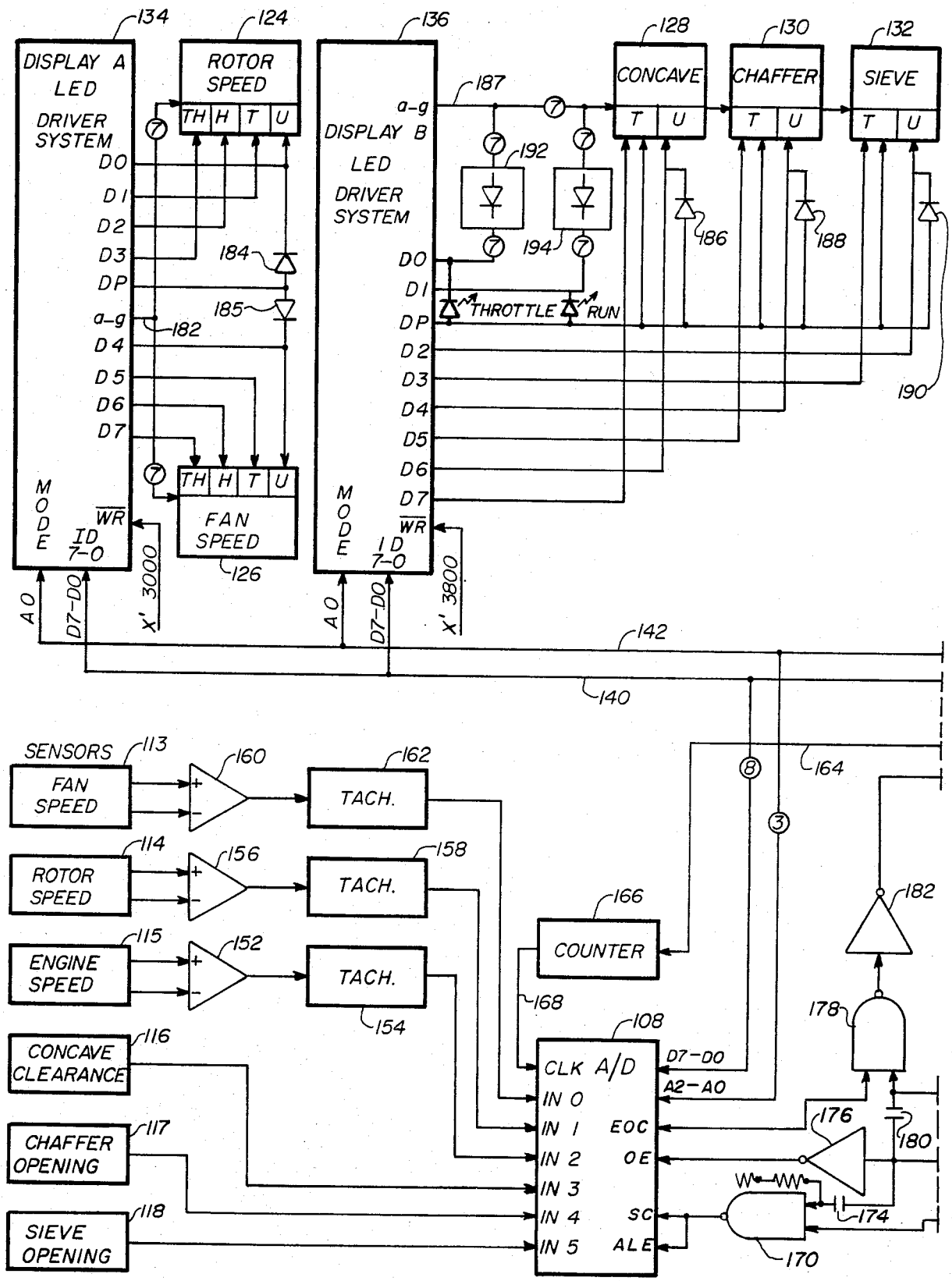
FIGS. 1A and 1B, when arranged as shown in FIG. 1C, comprise a block diagram of an automatic combine harvester adjustment system.
Figures 1B, 1C:
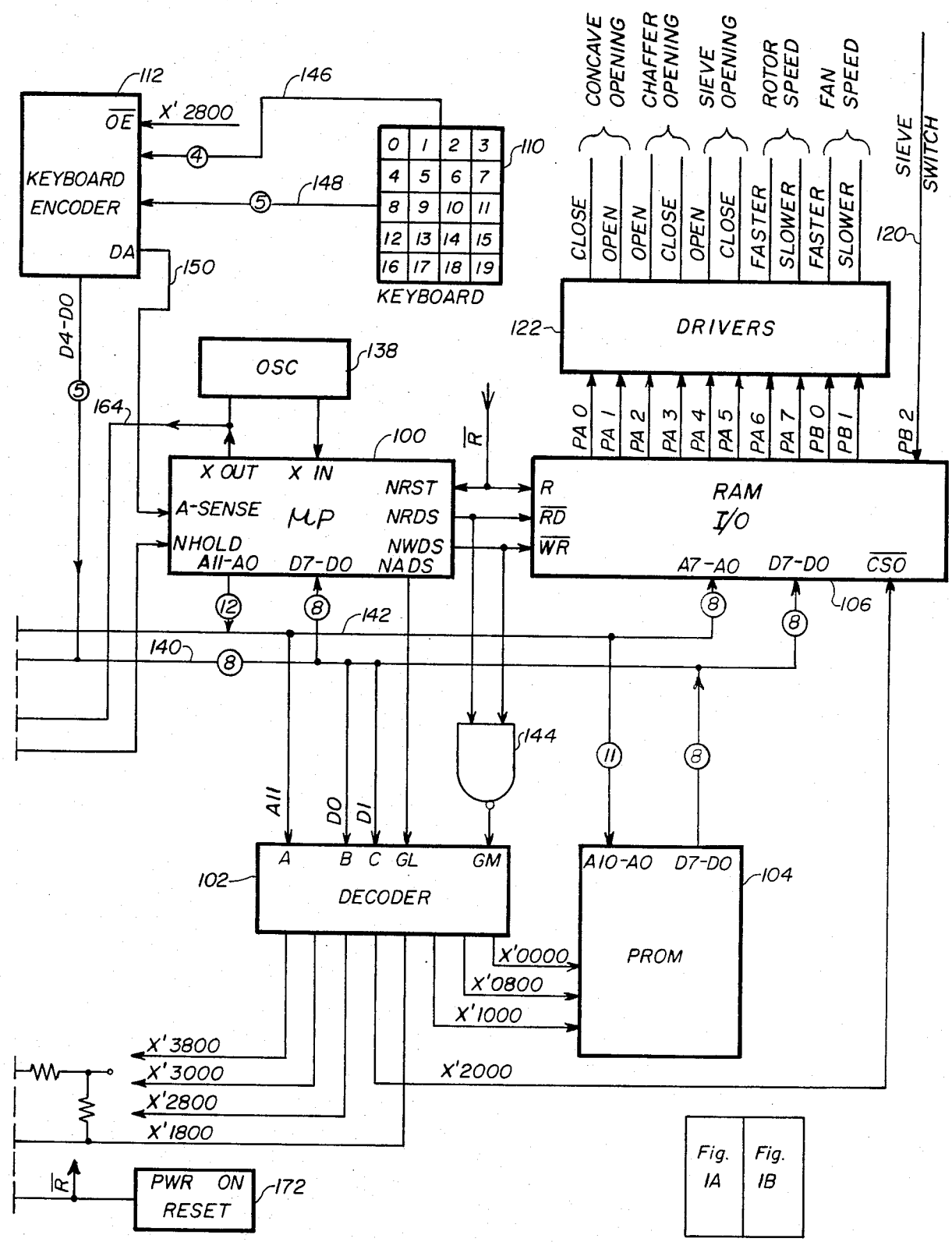

As illustrated in FIGS. 1A and 1B, a combine harvester adjustment system constructed in accordance with the principles of the present invention includes a microprocessor 100, an address decoder 102, a programmable read only memory (PROM) 104, a random access memory and input/output unit (RAM I/O) 106, and an analog to digital converter (ADC) 108. Digital data is manually entered into the system through a keyboard 110 and a keyboard encoder 112. Analog data is entered into the system from a plurality of sensors or transducers 113-118 which sense fan, rotor and engine speed, concave clearance, and, chaffer sieve and cleaning sieve openings or clearance. In addition, a signal indicating the open or closed position of a sieve switch is applied to RAM I/O 106 over a lead 120. Output data is taken from the system at RAM I/O 106 and passes through a set of drivers 122 from whence it is applied to actuators or motors (not shown) of conventional design for adjusting fan and rotor speed, concave clearance, and chaffer sieve and cleaning sieve openings. As used hereinafter, the term sieve denotes the cleaning sieve and the term chaffer denotes the chaffer sieve.

The system is provided with several Light Emitting Diode (LED) digital displays including a four-digit rotor speed display 124, a four-digit fan speed display 126 and three two-digit displays 128, 130 and 132 for displaying values representing the concave clearance, and chaffer and sieve openings. Displays 124 and 126 are driven by an LED display driver system 134 while the displays 128, 130 and 132 are driven by an LED driver system 136.

Figure 2:
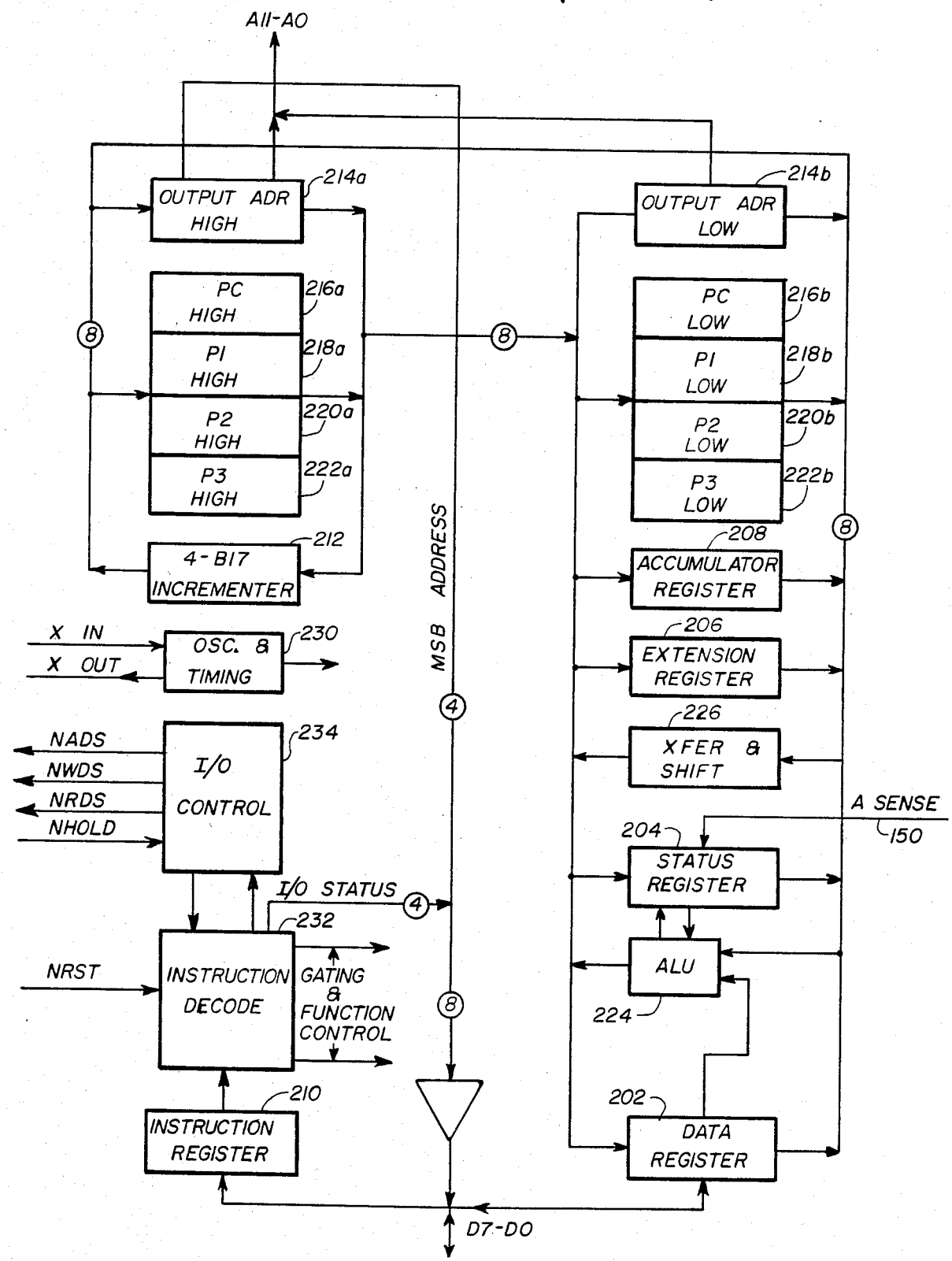
FIG. 2 is a block diagram of a prior art microprocessor suitable for use in the present invention.

The microprocessor 100 may be of the type described in the publication INS 8060 Single-Chip 8-Bit N-Channel Microprocessor (SC/MP Family) published by the National Semiconductor Corp. A block diagram of the microprocessor 100 is shown in FIG. 2 as an aid in understanding the description of the program which is provided below. The microprocessor 100 includes a Data Register 202, a Status Register 204, an Extension (E) Register 206, an Accumulator Register 208, an Instruction Register 210, a 4-bit incrementer 212, an Output Address Register 214a-214b, a Program Counter (PC) 216a-216b, and three ⁴ndex registers 218a-218b, 220a-220b and 222a-222b, the index registers being designated P1, P2 and P3.

The Instruction and Data registers are 8-bit registers which are transparent to the user. The microprocessor has 8 terminals D7-D0 which are connected to external sources by a bidirectional data bus. Data from external sources is routed from terminals D7-D0 to the data register from whence it may be routed through an Arithmetic Logic Unit 224 to the Accumulator Register 208. Data in the accumulator may be transferred to an external source through a Transfer and Shift circuit 226 and the Data Register 202. Instructions received from external sources are routed from terminals D7-D0 directly into Instruction register 210.

PC, P1, P2 and P3 are 16 bits wide for handling 16-bit addresses. The 12 low order bits of an address from any of these sources are made available at a set of terminals A11-A0 from whence they may be applied to an address bus. At the same time, the four high order bits of the same address are gated, together with four status bits, to a data bus by way of terminals D7-D0 with the address bits appearing at terminals D3-D0. The microprocessor is clocked by an externally mounted 4 MHz oscillator 138 (FIG. 1) which controls an internal oscillator and timing circuit 230. A low level signal applied to a reset input terminal NRST of the microprocessor acts through an instruction decoder 232 to reset the microprocessor and set its program counter to address X'0000 where X' indicates a hexadecimal value.

As shown in FIG. 1, microprocessor 100 has its input/output terminals D7-D0 connected to an 8-bit tri-state bi-directional data bus 140, and its addressing output terminals A11-A0 connected to a 12-bit address bus 142. The zero position on a bus is the least significant bit position. An I/O control circuit 234 in the microprocessor produces a low level output signal at a terminal NADS when valid address and status signals are presented to the system buses 140 and 142. During a read cycle the I/O Control Circuit 234 produces a low level signal at microprocessor terminal NRDS and this signal is applied to the $\overline{\text{RD}}$ input of RAM I/O 106 and to one input of a NAND 144. In like manner, during a write cycle the I/O Control Circuit 234 produces a low level signal at terminal NWDS and this signal is applied to the $\overline{\text{WR}}$ input of RAM I/O 106 and a second input of NAND 144. The output of NAND 144 is connected to the GH terminal of decoder 102. Reference may be made to the aforementioned publication for a more complete description of the characteristics of the microprocessor 100.

The decoder 102 is a three line to eight-line decoder and may, for example, be a type 74LS137 as manufactured by Texas Instruments, Inc. The signal from terminal NADS of the microprocessor 100 is connected to the GL terminal of decoder 102. The A, B, and C terminals of decoder 102 receive address signals from bit position 11 of the address bus and bit positions D0 and D1 of the data bus, respectively. When the input at terminal GH is high and the input at terminal GL is low, that is, during a read or write cycle of the microprocessor 100 when a valid address is on the buses, decoder 102 decodes bit position A11 from the address bus and bit positions D0 and D1 from the data bus to generate one of eight low level addressing signals X'0000, X'0800, X'1000, X'1800, X'2000, X'2800, X'3000 and X'3800. Actually, the most significant digit of an address derived from decoder 102 is determined by decoding D0 and D1. The next to the most significant digit is either 0 or 8 depending on whether A11 is false or true. As will be evident from the following description, the output signals from decoder 102 are addressing signals but do not necessarily define a specific address.

The addressing signals X'0000, X'0800 and X'1000 are applied to PROM 104. This PROM may comprise three erasable PROM chips, such as the type 2716 manufactured by National Semiconductor Corp., each capable of storing 2048 words of eight bits each. The addressing signals X'0000, X'0800 and X'1000 are utilized as chip select signals for the three PROM chips. Each chip has addressing terminals A10-A0 which are connected to the address bus 142 and a set of data output terminals D7-D0 connected to the data bus 140. When a chip is enabled by its addressing signal from decoder 102, it reads out onto data bus 140 the data stored at the location specified by the address on address bus 142.

Address X'2000 from decoder 102 is applied to the Chip Select Out (CSO) input terminal of RAM I/O 106. This RAM has addressing inputs A7-A0 for receiving addresses from the microprocessor over bus 142 and data input/output terminals D7-D0 for receiving data from, or applying data to, the data bus 140. RAM I/O 106 is capable of storing 128 words of eight bits each and may, for example, be a type INS-8154 manufactured by National Semiconductor Corp. When the addressing signal X'2000 is true (low) RAM I/O 106 is enabled and selects an address between X'2080 and X'20FF, the two low order digits of the address being specified by the signals on positions A7-A0 of the address bus. If the signal at terminal NRDS is low then the word at the selected address in RAM I/O 106 is read out to the microprocessor over bus 140. On the other hand, if addressing signal X'2000 is true and microprocessor 100 is producing the low level signal NWDS then the data on data bus 140 is stored in RAM I/O 106 at the address selected by addressing signals A7-A0.

RAM I/O 106 has two 8-bit input/output ports designated port A and port B. All positions of port B are not utilized. All signals from port A and the signals from the first two positions of port B are applied to drivers 122 to drive the various actuators or motors which adjust the rotor speed, fan speed, concave clearance, chaffer opening, and sieve opening. Port B, position 2 serves as an input port for receiving signals indicating the condition of a switch associated with the sieve on the combine. The switch output is determined by the type of sieve installed on the combine. If the sieve is the type used for small grain then the switch applies a binary zero to port PB2. If the sieve is of the type used for corn then the switch applies a binary one signal to PB2. The RAM I/O 106, in addition to having 128 storage locations X'2080-X'20FF addressable as described above, includes means for addressing switches at each input of port A or port B. These switches have the addresses X'2000-X'200F. Thus, if the two low order digits of an address are in the range X'00-X'0F and the two high order digits are X'20, then one of the port switches is addressed, either for turning the switch on or turning it off.

Addressing signal X'2800 is applied to the Output Enable (OE) terminal of the keyboard encoder 112. This encoder may, for example, be a National Semiconductor type 74C923 binary keyboard encoder. When a key is depressed on the keyboard 110 the keyboard generates two signals, one signal being on one of four leads in a bus 146 and the other being on one of five leads in a bus 148. The keyboard encoder encodes these two signals as a hexadecimal value and when the encoding is complete encoder 112 produces a Data Available (DA) signal on a lead 150 which is connected to the A-Sense input of microprocessor 100. When an internal interrupt enable flag is set within the microprocessor, the microprocessor may sample the signal on lead 150 prior to the fetch phase of each instruction and if the signal is at a high level then it is treated as an interrupt request. During execution of the ensuing interrupt routine the microprocessor generates address X'2800 (through decoder 102) and this address enables the encoder 112 to output the hexadecimal value onto positions D4-D0 of the data bus 140 from whence it passes to the accumulator register 208 within the microprocessor.

Addressing signal X'1800 from decoder 102 addresses the A/D converter 108. This converter is an eight-channel multiplexing converter and may, for example, be a type ADC-0808 manufactured by National Semiconductor. Only six input channels of the converter are utilized in the present invention. The voltage output signals from the sieve position, chaffer position and concave position sensors 118, 117 and 116 are applied directly to inputs IN5, IN4 and IN3, respectively, of the converter. The output of the engine speed sensor 115 is applied to an amplifier 152 having its output connected to a tachometer circuit 154. The tachometer circuit converts the frequency of an input signal applied thereto to a voltage representing engine speed, and this voltage is applied to input IN2 of the A/D converter. The output of the rotor speed sensor 114 is applied through an amplifier 156 to a tachometer circuit 158 and the output of this tachometer circuit is connected to input terminal IN1 of the A/D converter. The fan speed sensor 113 has its output connected to an amplifier 160 and the output of this amplifier is connected to a tachometer circuit 162 which in turn has its output connected to input terminal IN0 of the A/D converter. The tachometer circuits 154, 158 and 162 may be type 2907 tachometers manufactured by National Semiconductor Corp.

The output of oscillator 138 is applied by way of a lead 164 to a 4-bit binary counter 166 which divides the frequency by 16 and produces an output signal that is applied over a lead 168 to the clocking input of the A/D converter 108.

A/D converter 108 has three input terminals for receiving a 3-bit address from positions A2-A0 of the address bus 142. The converter 108 also has an Address Latch Enable (ALE) terminal which enables the converter to accept an address only when a high level signal is applied to the ALE terminal. The ALE terminal is connected to the output of a NAND 170. This NAND has a first input connected to the output of a Power On Reset circuit 172. The addressing signal X'1800 is applied through a capacitor 174 to the second input of NAND 170. The output of NAND 170 is also applied to the Start Control (SC) input terminal of the converter 108 to start a conversion operation which converts the input voltage at the converter terminal being addressed by A2-A0 into an 8-bit binary value.

The A/D converter 108 has an input terminal designated Output Enable (OE) which, when driven to the high level, partially enables tri-state latches in the converter to permit the converted value to be placed on the data bus 140. However, these latches are conditioned by internal circuitry so that the data is placed on the data bus only after a conversion cycle is completed. After the data has been placed on the data bus the converter 108 produces an End of Conversion signal at terminal EOC and this signal is applied to one input of a NAND 178.

A converted value is obtained from converter 108 by placing a 16-bit address X'18XY on address bus 142, and the low orders of the data bus 140. X is a "don't care" digit and Y has a value between 0 and 5. The two high order digits of the address cause address decoder 102 to produce the addressing signal X'1800 which is applied through an inverter 176 to the OE terminal of the converter, and through a capacitor 180 to one input of NAND 178. At the same time, the Y digit of the address is applied to input terminals A2–A0 of the converter to select which of the inputs IN0–IN5, is to be converted.

The low level addressing signal X'1800 accomplishes several functions. First, it momentarily drives the output of NAND 178 to the high level. The output of NAND 178 is inverted by an inverter 182 and applied to the NHOLD input of microprocessor 100 for the purpose of extending the duration of the instruction cycle. Secondly, addressing signal X'1800 passes through inverter 176 to drive the OE terminal to the high level. This partially enables the output latches of the converter 108.

Thirdly, the addressing signal X'1800 passes through capacitor 174 and NAND 170 to momentarily pulse the ALE and SC inputs of the converter 108. The ALE input loads the address from A2–A0 into the converter to select one of the analog inputs at terminals IN0–IN5 for conversion and the SC input starts the conversion cycle. As the conversion cycle starts, the signal at terminal EOC drops to the low level. This blocks NAND 178 so that the output of inverter 182 is held at the low level. Thus, the NHOLD input of the microprocessor 100 is active and the instruction cycle is held up (NWDS or NRDS held active) until the conversion operation is completed. After the analog signal is converted to a binary value, the signals representing the binary value are presented at converter output terminals D7–D0 after which the signal at terminal EOC returns to the high level. This enables NAND 178 because the other input to the NAND has returned to the high level. When the output of NAND 178 goes true, the input to NHOLD goes false thereby permitting the microprocessor to resume the instruction and accept the binary data from the converter.

Addressing signal X'3000 is applied to the $\overline{WR}$ input of the LED driver system 134. This driver system may be a type ICM 7218B as described at pages 821–823 of the publication IC Master 1980, or at pages 523C–532C of the Datel Intersil Databook. A low level signal at the $\overline{WR}$ input terminal of driver system 134 enables eight input terminals ID7–ID0 to accept either four bits of control information or eight bits of display data depending upon the level of the signal applied to a Mode input terminal. When the Mode input terminal receives a high level signal the driver system 134 loads four bits of control information from input terminals ID7–ID4 but if the level of the signal applied to the Mode input terminal is at the low level then the driver system loads eight bits of display data from terminals ID7–ID0. The Mode input terminal of driver system 134 is connected to position A0 of address bus 142 and the input terminals ID7–ID0 are connected to bit positions D7–D0 of the data bus 140.

As described in the aformentioned publications relating to the driver system 134, it includes a RAM for storing eight 8-bit bytes of binary coded decimal display data, addressing means for cyclically reading out the contents of the RAM, a decoder for decoding the BCD data read from the memory into either hexadecimal or Code B, and a selector for selecting either the output signals from the RAM or those from the decoder for driving the displays. The data signals from the selector are presented at output terminals a–g and DP of the driver system. The displays 124 and 126 are 7-segment, common cathode, LED displays as shown in FIG. 8 and the output signals from terminals a–g are applied over leads 182 to the individual segments in both displays 124 and 126. The particular digit position which is "lighted" at any instant is determined by the outputs D7–D0 and these are cyclically energized at high frequency by circuits within the driver system.

When the Mode input terminal is true (high) the display driver 134 treats the inputs to terminal ID7–ID4 as control information. The displays driven by the driver system 134 may be shut down or placed in a low power consumption mode by a control byte wherein ID4 is a zero. When ID4 receives a one bit then the driver system 134 is turned on. When ID5 receives a zero bit from bus 140 it controls the selector to select the output of the decoder within the driver system 134 for presentation to output terminals a–g and DP and when ID5 receives a one bit it selects the output of the RAM for presentation to terminals a–g. When input terminal ID6 receives a zero bit from the data bus 140 it controls the decoder within the driver system to decode the binary data from the RAM into hexadecimal data and when it receives a one bit it controls the decoder to decode the output of the RAM into Code B. Input terminal ID7 is the data coming/input $\overline{DP}$ control input of the driver system.

When a control word applied to display driver 134 has bit ID5 true, the binary data subsequently read into the RAM in the display driver drives the display directly. The bit-segment assignments are as follows:

| | |
|---|---|
| $\overline{ID7}$ = DP | ID3 = e |
| ID6 = a | ID2 = g |
| ID5 = b | ID1 = f |
| ID4 = c | ID0 = d | where the segments are identified as shown in FIG. 8.

Light emitting diode driver system 136 is identical to the driver system 134 except that the driver system 136 is enabled by the addressing signal X'3800 applied to its $\overline{WR}$ input.

Each key on keyboard 110 has an LED associated with it which is lighted when the key is depressed, provided that operation of the key is "legal" at the time it is depressed. LEDs 184 and 185 are associated with the rotor and fan speed keys, respectively. LED 184 is connected between the D0 and DP output terminals of driver system 134 and is pulsed in unison with the units position of the rotor speed display 124 when the signal at output terminal DP is true. LED 185 is connected between the D1 and DP output terminals of driver system 134 and is pulsed in unison with the units position of the fan speed display 126 when the signal at output terminal DP is true.

The displays 128, 130 and 132 are also 7-segment common cathode displays each capable of displaying two digits. The anode segments of the displays are connected to output terminals a–g of display driver 136 by leads 187 and the cathodes are connected individually to the output terminals D2–D7. The decimal point segment associated with the high orders of the displays 128, 130 and 132 are driven by the DP output of the driver system 136.

Two indicators are provided on the keyboard which are not associated with any key. They are the RUN and THROTTLE indicators. The RUN LED is connected between terminals DP and D1 while the THROTTLE LED is connected between terminals D0 and DP. LEDs 186, 188 and 190 are the LEDs associated with the concave, chaffer and sieve keys on the keyboard. The anodes of these LEDs are connected to output terminal DP of driver system 136 and the cathodes are connected to the D6, D4 and D2 output terminals, respectively.

The LEDs associated with the remaining keys on the keyboard 110 are divided into two groups 192 and 194, each group including seven LEDs. In group 192, the LEDs have their cathodes connected to output terminal D0 of driver system 136 and their anodes individually connected to one of the segment driving leads 187. In group 194, the LEDs have their cathodes connected to output terminal D1 of driver system 136 and their anodes individually connected to one of the segment driving leads 187.

The segment lighting table SEGL (Table I) shows the values for lighting the LEDs associated with the keys. From this table it is seen that the value X'00 is used to light the LEDs associated with the SIEVE, ROTOR, FAN, CONCAVE and CHAFFER keys. The particular LED which is lit is determined by the location in the RAM in the display driver system where the value is stored. For example, if X'00 is stored at the RAM location which is read out when the D6 output of the display driver system is active, then the SIEVE key LED 186 is lighted.

TABLE I

| SEGL | BYTE | X'82 | LIGHT SEG NO 0 |
|---|---|---|---|
| | BYTE | X'00 | LIGHT SEG NO 1 |
| | BYTE | X'20 | LIGHT SEG NO 2 |
| | BYTE | X'81 | LIGHT SEG NO 3 |
| | BYTE | X'08 | LIGHT SEG NO 4 |
| | BYTE | X'02 | LIGHT SEG NO 5 |
| | BYTE | X'90 | LIGHT SEG NO 6 |
| | BYTE | X'84 | LIGHT SEG NO 7 |
| | BYTE | X'10 | LIGHT SEG NO 8 |
| | BYTE | X'01 | LIGHT SEG NO 9 |
| | BYTE | X'C0 | LIGHT SEG NO 10 |
| | BYTE | X'88 | LIGHT SEG NO 11 |
| | BYTE | X'40 | LIGHT SEG NO 12 |
| | BYTE | X'04 | LIGHT SEG NO 13 |
| | BYTE | X'A0 | LIGHT SEG NO 14 |
| | BYTE | X'00 | LIGHT SIEVE |
| | BYTE | X'00 | LIGHT ROTOR |
| | BYTE | X'00 | LIGHT FAN |
| | BYTE | X'00 | LIGHT CONCAVE |
| | BYTE | X'00 | LIGHT CHAFFER |

The keyboard 110 has nineteen keys, some of which serve as a digit entry key and also another function. Table II shows the binary value output by the decoder 112 in response to the striking of each key and the decimal value and/or function of each key.

TABLE II

| Binary Value (in decimal) | Digit Value | Function |
|---|---|---|
| 0 | — | CROP MOISTURE |
| 1 | — | NO KEY |
| 2 | 0 | RICE |
| 3 | — | CROP SELECT |
| 4 | 3 | HIGH MOISTURE |
| 5 | 6 | MAIZE |
| 6 | 9 | OATS |
| 7 | — | CLEAR |
| 8 | 2 | MEDIUM MOISTURE |
| 9 | 5 | SOYBEAN |
| 10 | 8 | BARLEY |
| 11 | — | ADJUST |
| 12 | 1 | LOW MOISTURE |
| 13 | 4 | CORN |
| 14 | 7 | WHEAT |
| 15 | — | SIEVE |
| 16 | — | ROTOR |
| 17 | — | FAN |
| 18 | — | CONCAVE |
| 19 | — | CHAFFER |

TYPICAL OPERATION

Main Routine

Figure 3:
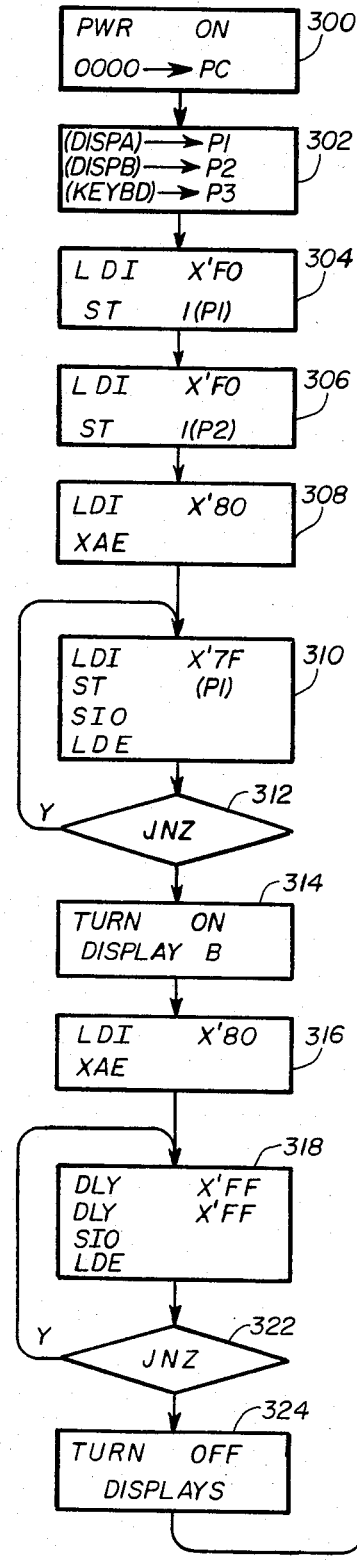

When power is applied to the circuit of FIGS. 1A–1B, the microprocessor 100 automatically executes a sequence of steps as shown in FIG. 3. When the power is turned on the Power On Reset circuit 172 momentarily generates the low level signal $\overline{R}$. This signal passes through NAND 170 to enable the address latches of the A/D converter 108 and also initiate a conversion cycle by the converter. The signal $\overline{R}$ is also applied to RAM I/O 106 to reset it and is further applied to the microprocessor 100. The reset signal causes the address X'0000 to be entered into the program counter PC of the microprocessor. The microprocessor then executes a sequence of steps to load the addresses of Display A (i.e. display driver system 134), Display B (display driver system 136) and the keyboard encoder 112 into the pointer registers P1, P2 and P3 from PROM 104. Next, the LEDs for the displays are turned off. For Display A, this is accomplished by executing a Load Immediate instruction to load the value X'F0 into the accumulator, and then executing a Store instruction utilizing indexed addressing with the P1 register and a displacement value of 1. Since the contents of P1 at this time represent the address of Display A, when this value is placed on the address bus it causes decoder 102 to produce the address signal X'3000 to enable the $\overline{WR}$ input of Display A. The displacement value of 1 appears on lead A0 of the address bus and is applied to Display A to tell the display that the information it is receiving over the data bus is control rather than display information. The value X'F0 from the accumulator is applied over the data bus to inputs ID7–ID0 of Display A where the one bit from position D7 of the data bus tells the display to terminate its outputs because new data is coming. The one bit in position D6 sets up the decoder in Display A to decode the expected incoming data into hexadecimal code. However the one bit in position D5 sets up Display A to select the output of its RAM rather than the output of its decoder for display hence the incoming data will be used directly, i.e. without decoding, for driving the output DP and the segment outputs a–g. The one bit in position D4 places Display A in the active, as opposed to the shutdown mode.

After Display A is turned off by execution of the instructions within block 304, similar instructions within block 306 are executed to turn off Display B using the address of Display B in P2.

The instructions within blocks 308, 310 and 312 are utilized to again turn ON all of the LEDs driven by Display A. The value X'80 is loaded into the accumulator and then transferred to the extension (E) register for use as a count value determining the number of bytes to be transferred in a Serial Input/Output (SIO) operation. The value X'7F is loaded into the accumulator and Display A is addressed using P1. An SIO instruction is then executed which transfers the value X'7F from the accumulator over the data bus 140 to Display A. During execution of the SIO instruction the value in the E register is read out, right shifted one bit position, and read back into the E register. After the SIO instruction is completed the contents of the E register are entered into the accumulator and checked for a zero value. If the value in the accumulator is not zero then the program returns to the first instruction in block 310 in preparation for transferring another byte of data to Display A. After eight bytes of data have been transferred to Display A, or more specifically to the eight locations of the RAM in Display A, the value in the E register will have been shifted to the right until it contains all zeros. Thus, after the eighth byte has been transferred the instruction at step 312 will test the accumulator and find its contents to be zero. The program then proceeds to block 314. At this time all locations in the RAM in Display A contains the value 7F and all digit positions in the rotor and fan speed displays exhibit the numeral 8. The LEDs 184 and 185 are both on. It should be noted that each time the microprocessor 100 addresses Display A, it must provide eight words to the RAM in the display driver.

At block 314, a similar set of instructions is executed to turn on the keyboard LEDs 186, 188 and 190 as well as the RUN and THROTTLE indicators all driven by Display B, and to display the numeral 8 at all positions of the concave, chaffer and sieve displays as well as the decimal points. The combine operator may observe all the displays and indicator LEDs to insure they are properly functioning.

The displays remain in their ON state for approximately 3 seconds. The value X'80 is loaded into the E register at step 316. At step 318 delay instructions are executed, an SIO instruction is executed to decrement the E register, and the decremented value from E is transferred to the accumulator. At step 322 the accumulator is checked for a zero value. If the accumulator is not zero then the instructions in block 318 are repeated.

When the jump instruction at block 322 finds that the accumulator contains a zero value, the program proceeds to block 324 where it turns off Display A and Display B. The instructions for accomplishing this are the same as those illustrated in blocks 304 and 306.

The instructions indicated by blocks 326 and 328 check the position of the sieve switch. The address of the RAM I/O 106 is entered into P1 while the address MALE (X'2080) is entered into P2. A load instruction is then executed using P1 as the index address and the value X'0D as the displacement. This loads into the accumulator of the microprocessor an indication of whether or not the sieve switch is open or closed. The jump instruction at 328 determines if the contents of the accumulator are zero indicating that the sieve and chaffer are set up for small grain, or not zero indicating that the sieve and chaffer are set for corn or soybeans. If the sieve and chaffer are set for small grain, the program jumps to block 330 where a zero value is stored in the RAM I/O 106 at the location (SWITCH) reserved for the value representing the sieve switch position. On the other hand, if the sieve switch is open then after execution of the instruction at block 328 the program proceeds to block 332 where it loads the value X'FF into SWITCH. After the sieve switch setting is stored, the instructions in blocks 334 and 336 are executed to see if the combine operator has removed his finger from the Clear key. The loop of instructions including blocks 334 and 336 is repeated until the operator's finger is removed from the key.

Figure 5A:
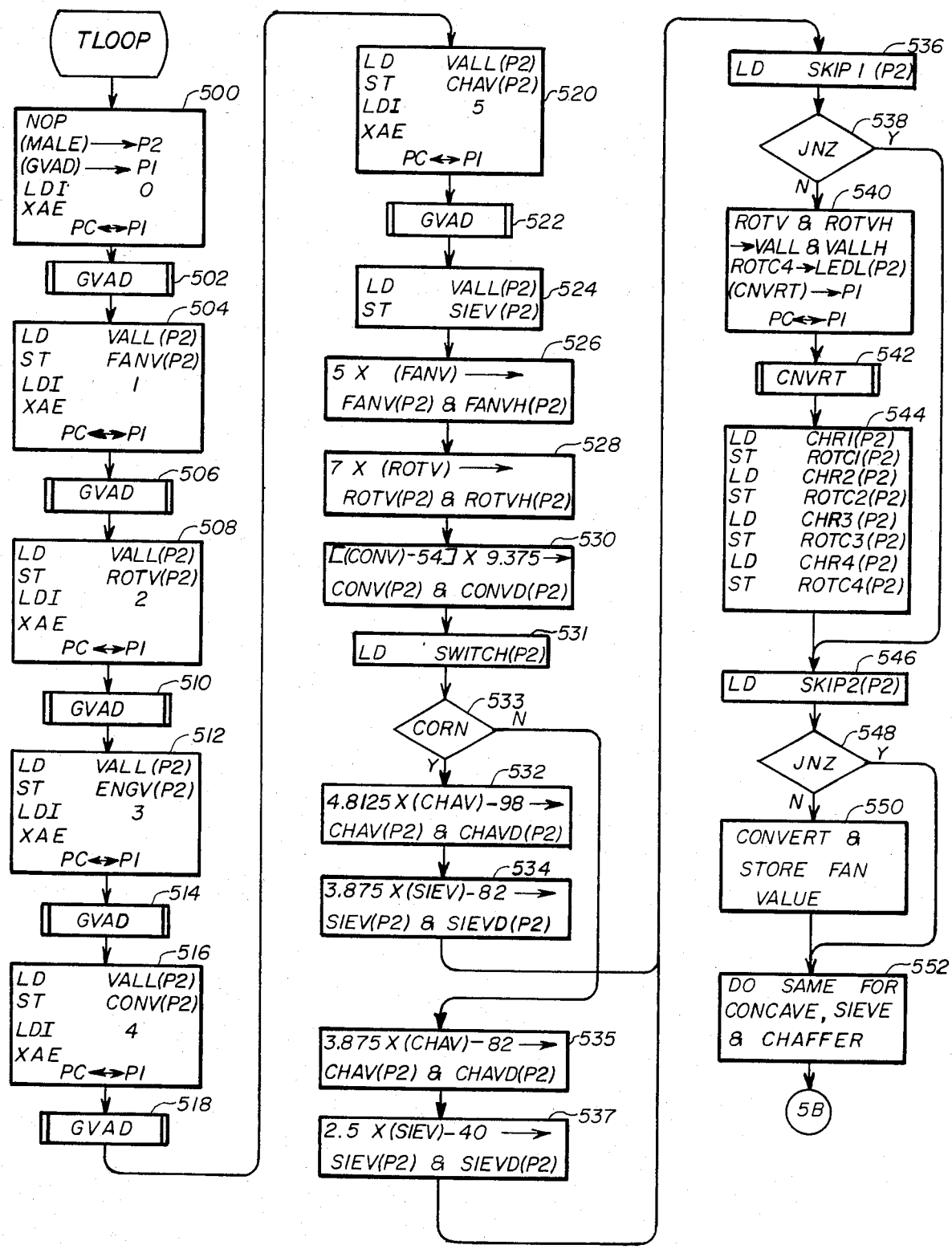
FIGS. 5A and 5B illustrate the main program (TLOOP) of the microprocessor.

From step 330 or 332 the program proceeds to block 338 which loads the value zero into the locations in the RAM I/O 106 reserved for the values SKIP1-SKIP5. As will be evident when FIG. 5A is described, SKIP1-SKIP5 serve as indicators to indicate whether or not some operation should be performed for a given parameter such as rotor speed, fan speed, concave clearance, chaffer opening or sieve opening.

The next instruction loads the value X'80 into the accumulator and the following two instructions in block 340 store X'80 at both locations LED1 and LED2 in RAM I/O 106. These locations are utilized to store indications of whether the RUN and THROTTLE LEDs should be turned on or off. If Display B is addressed with the value X'80 in LED1 and LED2, this value will turn OFF both the LEDs.

Next, the address of the Initial Interrupt Subroutine (INIT) is loaded into the RAM I/O 106 at the locations LP3H and LP3L reserved for a next command address. The address of the DVOFF subroutine is then entered into P3 and the contents of P3 and PC exchanged to branch to the DVOFF subroutine.

Figure 4:
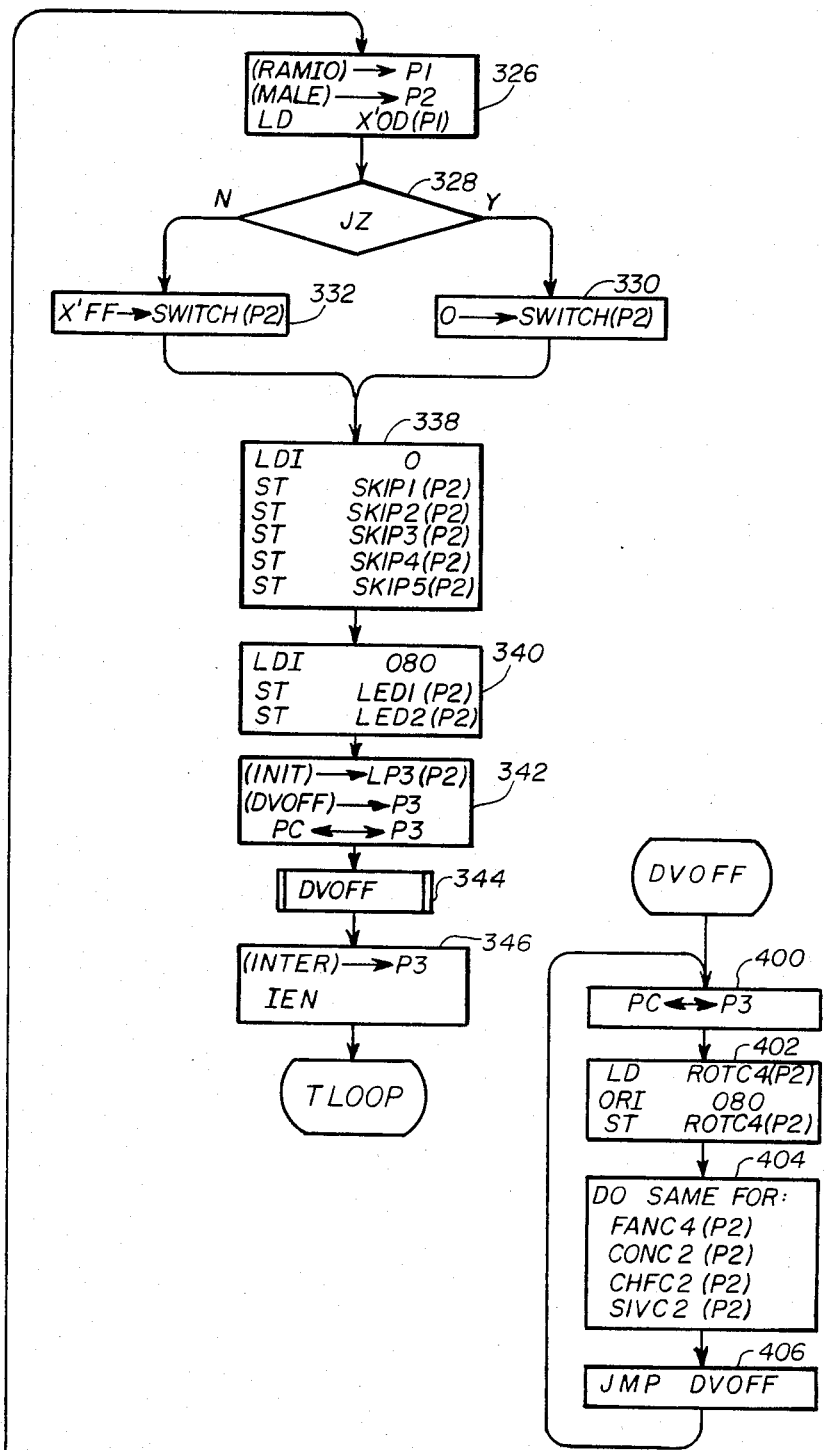
FIG. 4 illustrates the DVOFF subroutine.

The DVOFF subroutine is illustrated in FIG. 4 and is utilized to set indicators in certain locations of the RAM I/O 106, the contents of these locations being subsequently used to turn off the LEDs associated with the fan speed, rotor speed, concave, chaffer and sieve push buttons on the keyboard when the indicator information is sent to Display A and Display B.

It is a characteristic of the microprocessor 100 that when the contents of P3 are exchanged with PC, the value entered into PC is incremented by one before executing the next instruction. Therefore, when the branch is taken to the DVOFF subroutine the first instruction executed is the LOAD instruction in block 402. This instruction loads into the accumulator a value from RAM I/O 106 at the location reserved for ROTC4, the low order character position of the rotor value to be displayed. This value is then OR'd with the value X'80 and the result stored at the location reserved for ROTC4. A similar sequence of three instructions is then executed using locations FANC4, CONC2, CHFC2 and SIVC2, these being the locations in RAM I/O 106 reserved for the low order characters of data to be sent to the fan, concave, chaffer and sieve displays, respectively. The value X'80 sets bit 7 in each location so that when these locations are read out to the display drivers 134 and 136 the DP outputs of the drivers are driven low to turn off the indicator LEDs associated with the rotor, fan, concave, chaffer and sieve keys on the keyboard. The program then executes a jump to DVOFF where it now executes an instruction (block 400) to exchange the contents of P3 and PC. This returns the program to the first instruction in block 346 where the address of the first instruction of an interrupt routine (INTER) is loaded into P3. An instruction is then executed to set the Interrupt Enable Bit in the status register. When the Interrupt Enable Bit is set, it enables the A-Sense input to microprocessor 100 to serve as an interrupt request input by enabling the microprocessor to sample the A-Sense input prior to the fetch phase of each instruction. This completes the initial set up operations and the program proceeds to TLOOP.

Figure 5B:
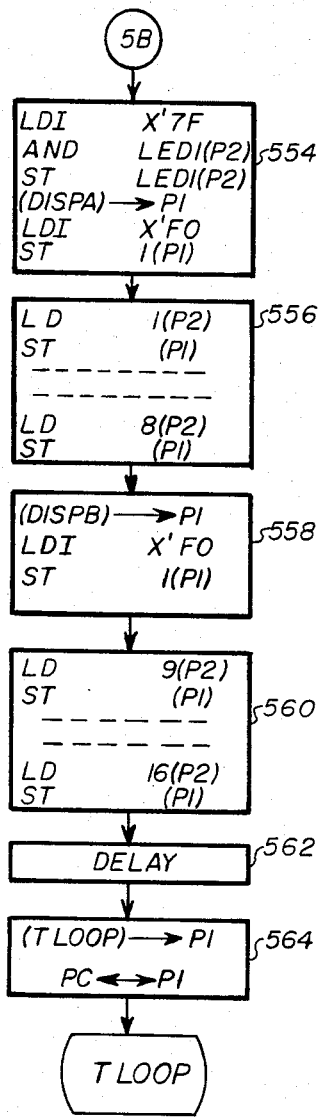

TLOOP is illustrated in FIGS. 5A and 5B and comprises the main program which is an infinite loop ended only by turning the system off. This loop causes the microprocessor 100 to sequentially sample the present values of engine, rotor and fan speed, concave clearance, and chaffer and sieve openigs by sequentially addressing the inputs to ADC 108, the values of all except the engine speed being scaled and displayed at the displays 124, 126, 128, 130 and 132.

TLOOP begins by loading into P2 the address MALE. This address has the value 2080 and is the base address for addressing storage locations in RAM I/O 106. Next, the starting address of the subroutine GVAD is loaded into P1 in preparation for getting a value from the ADC 108. The E register is cleared and the contents of PC exchanged with P1 so that the program branches to the GVAD subroutine.

Figure 6:
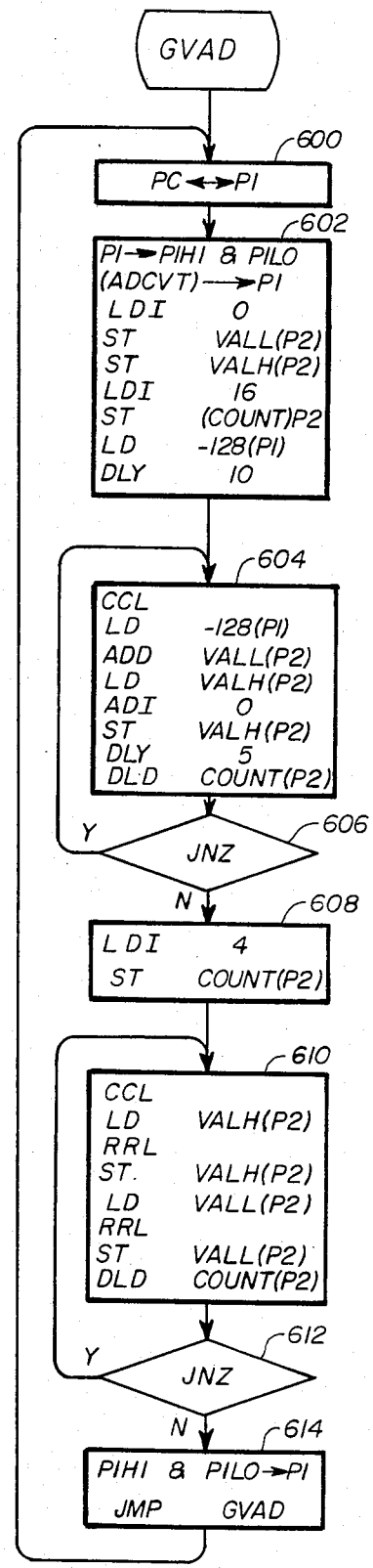
FIG. 6 illustrates the GVAD subroutine.

The GVAD subroutine is illustrated in FIG. 6. When TLOOP branches to GVAD the first instruction executed is a Load Immediate (LDI) instruction in block 602. This instruction loads into the accumulator the eight high order bits of the address ADCVT (X'1800). The contents of the accumulator are then exchanged with the eight high order bits of P1 and the high order bits of P1, now in the accumulator, are stored in RAM I/O 106 at the address P1HI. Next, the eight low order bits of ADCVT are loaded into P1 and the low order bits of P1 are stored in RAM I/O 106 at location P1LO.

The next three instructions in block 602 load a zero value into the accumulator and then transfer this value to two storage locations in RAM I/O 106 designated VALL and VALH. These locations are reserved for receiving the output of A/D converter 108. Next, the binary value 16 is loaded into the accumulator and then stored in RAM I/O 106 at the location (COUNT) reserved for iteration counts.

A Load instruction is then executed using the contents of P1 as the base address and having −128 as the displacement value. When the displacement value is −128, the contents of the E register are used as the displacement value which is added to P1 to obtain the effective address. Since the E register was loaded with a zero value at block 500 and the address ADCVT was loaded into P1 by earlier instructions in block 602, the microprocessor addresses the A/D converter 108 and further addresses the fan speed input IN0. Although a value is transferred from the A/D converter 108 to the accumulator of the microprocessor at this time, the value is not utilized. The microprocessor executes a delay instruction and proceeds to block 604 where it again addresses the converter and the fan speed input thereto. The converted fan speed value is loaded into the accumulator replacing the value previously held therein. The contents of VALL (now zero) are added to the contents of the accumulator and the result stored at VALL in RAM I/O 106. VALH is loaded into the accumulator and then an Add Immediate (ADI) instruction is executed with the data field of the instruction being zero. This adds in any carry which may have resulted from the previous add operation. The result in the accumulator is then stored at VALH. The microprocessor executes a Delay instruction and then executes a Decrement and Load instruction which decrements the iteration count stored at location COUNT and returns the decremented value to COUNT. This instruction also places the decremented count in the accumulator. The instruction at block 606 tests the value in the accumulator to see if it is zero. If it is not the microprocessor returns to the first instruction in block 604, addresses the A/D converter 108 to obtain a binary value which is loaded into the accumulator, and then adds the previously accumulated value in VALH and VALL to the contents of the accumulator.

After eight iterations of the instructions in block 604, VALL and VALH contain the sum of eight samplings of the fan speed. When the instruction in block 606 is executed it finds the iteration count in the accumulator to be zero and thus proceeds to block 608.

The instructions in block 608 set up an iteration count for dividing the sum in VALL and VALH by 8. The division by 8 is accomplished by the instructions in block 610 which divide the value in VALH and VALL by 2. After each division by 2 a Decrement and Load instruction is executed to reduce the iteration count and the accumulator is tested by instruction 612 to see if the count has been reduced to zero. If it has not, a jump is taken back to the first instruction in block 610. After four right shifts, the instruction at block 612 finds the value in the accumulator to be zero and the program proceeds to block 614.

At the time the GVAD subroutine began (block 602) the contents of P1 were stored in the RAM I/O 106 at locations P1HI and P1LO. The contents of P1 at that time were the contents of PC, having been placed there by the last instruction in block 500. The instructions in block 614 retrieve the value from P1HI and P1LO and place it in P1 again. A jump instruction is then executed to the beginning of the GVAD subroutine. After the jump, the instruction in block 600 is executed to exchange the contents of P1 and PC. This causes the program to return to the first instruction in block 504.

The first instruction in block 504 loads the accumulator with the binary fan speed value calculated by GVAD and stored in VALL. The fan speed value is then stored in RAM I/O 106 at location FANV. The microprocessor then prepares for executing the GVAD subroutine again, this time for the purpose of obtaining the rotor speed value. The value 1 is loaded into the accumulator and transferred to the E register after which the contents of PC and P1 are exchanged causing the program to branch again to the GVAD subroutine. The subroutine is executed as previously described with one exception. The E register contains the value 1 hence each time an LD instruction is executed with the displacement value of −128, the effective address is P1+1. This causes input IN1 of A/D converter 108 to be addressed so that the analog value representing rotor speed may be converted to a binary value. Upon return from the GVAD subroutine the rotor speed value is stored at ROTV and the value 2 is loaded into the E register in preparation for again executing the GVAD subroutine, this time to obtain engine speed. The instructions in block 512 store the engine speed value at ENGV and prepare the microprocessor to again execute GVAD, this time to obtain a value representing the concave clearance.

The instructions in block 516 store the value representing the concave clearance at location CONV and prepare the microprocessor for again executing GVAD this time to obtain the chaffer value.

After GVAD computes the value of the present chaffer setting the instructions in block 520 store this value at location CHAV and again prepare the microprocessor to execute the GVAD subroutine. This time the subroutine obtains a binary value representing the sieve opening and the instructions in block 524 store this value at location SIEV in RAM I/O 106.

The values obtained by the GVAD subroutine are relative binary values and must be scaled or converted to true binary values. The specific conversion factor varies according to which parameter, i.e. fan speed, concave opening, etc. is being converted. Furthermore, it should be understood that the conversion factor for any given parameter will vary for different combine harvesters. Therefore, the specific conversion operations which follow merely describe exemplary conversions which must be adjusted according to the characteristics of the combine harvester which is being controlled.

In a specific preferred embodiment, the true fan speed in revolutions per minute is five times the binary indication of fan speed obtained from the A/D converter. Therefore, at block 526 the microprocessor calculates five times the A/D converter indication of fan speed and stores the result at FANV and FANVH, the latter being the higher order bits. At block 528 the microprocessor multiplies the rotor speed indication by 7 and stores the binary indication of true rotor speed in revolutions per minute at ROTV and ROTVH.

The binary value from the A/D converter representing the concave clearance is scaled by subtracting 54 and multiplying the remainder by 9.375. These calculations are made at block 530 and the result, which is the concave clearance in thousandths of an inch, is stored at CONV and CONVD.

At block 531 the value of the sieve switch location is read and at block 533 it is checked to see if the harvester is set up for harvesting corn or soybeans or for harvesting small grain. If the test at block 533 indicates that the harvester is set up to harvest corn or soybeans the program proceeds to blocks 532 and 534 where calculations are made for a 1.62 inch corn-soybean chaffer and a 1.12 inch sieve. The binary value obtained from the A/D converter and representing the corn chaffer opening is scaled by multiplying it by 4.8125 and subtracting 98. The sequence of instructions indicated at block 532 performs these calculations and the result, which is the corn chaffer setting in thousandths of an inch, is stored at CHAV and CHAVD.

Finally, the binary value obtained from the A/D converter and representing the corn sieve setting is scaled by multiplying it by 3.875 and subtracting 82 from the product. This is accomplished by instructions indicated generally at 534. The result, which is the sieve opening in thousandths of an inch, is stored at SIEV and SIEVD.

If the test at block 533 indicates that the harvester is set up to harvest grain, the program proceeds to blocks 535 and 537 where calculations are made for a 1.12 inch grain chaffer and a 0.81 inch sieve. The grain chaffer setting is scaled by multiplying the A/D converter value by 3.875 and subtracting 82. The grain sieve value is scaled by multiplying the A/D converter value by 2.5 and subtracting 40.

Once the binary values from the A/D converter have been scaled, they are converted to a code for directly driving the segments of a display. This is accomplished by first converting the binary value to a binary coded decimal value which is then used to address a translation table which stores the codes used to drive the displays.

At locations SKIP1-SKIP5 the RAM I/O 106 stores indicator values indicating whether or not a conversion is required prior to displaying a calculated binary value. If SKIP1 is a zero it means that the calculated binary value for rotor speed must be converted before it is displayed. SKIP2-SKIP5 provide corresponding indications for the calculated values of fan speed, concave clearance, chaffer opening and sieve opening. During initial start up, at block 338, the program clears SKIP1-SKIP5 to indicate that all scaled values must be converted at least during the first cycle through TLOOP.

After the last instruction in block 534 or 537 is executed, the instruction at block 536 loads SKIP1 into the accumulator where it is tested for a non-zero value. Since zero values were loaded into SKIP1-SKIP5 at block 338, the jump on non-zero test at block 538 indicates a zero value and the program proceeds to block 540 where the rotor speed value is read from ROTV and ROTVH and placed in VALL and VALLH. The value in ROTC4, placed therein at block 402 to indicate that the rotor speed LED should be turned OFF, is saved by transferring it to address LEDL2 in the RAM I/O. The address of the Convert subroutine CNVRT is transferred to P1 and the contents of PC and P1 exchanged to branch to CNVRT.

The Convert subroutine is illustrated in FIG. 7. When the program branches to this subroutine the first instruction executed (block 702) clears the accumulator and transfers the zero value to CHR1 to clear the location in memory reserved for the high order (thousands digit) of a converted value. In order to convert a binary value to a binary coded decimal value, the binary equivalent of 1000 is successively subtracted from the binary value to be converted and after each successful subtraction the value in CHR1 is incremented. There can be only one successful subtraction. The left-most digit of a fan or rotor display may be either 1 or blank since, in the embodiment described, the maximum speed is less than 2000 RPM. The high order digit of the display value is developed by subtracting 1000, shifting right with carry (SRL) and testing the high order bit at step 706 to see if the subtraction was successful or unsuccessful. If the jump positive test at step 706 proves false the program proceeds to step 708 where it increments CHR1 and transfers the remainder from the subtraction to VALH and VALL. The program then loops back to block 704 for another subtraction. When the test at decision point 706 indicates a positive result (this should occur on the second test if it did not occur on the first) the program jumps to block 710 to develop the hundreds digit.

Steps 710, 712, 714 and 716 derive the hundreds digit hence at step 712 the binary equivalent of one hundred is subtracted from the remainder resulting from the previous operation. For each successful subtraction of one hundred the value in location CHR2 is incremented by 1 at step 716 and the program loops back to step 712.

After the hundreds digit is derived, a similar operation is performed to derive the tens digit by successive subtractions of the value 10 and incrementing location CHR3 after each successful subtraction. After the tens digit is derived, any remainder represents the units digit and this remainder is entered into location CHR4. The development of the tens and unit digits is represented by the block 718.

After the binary value representing rotor speed has been converted to a binary coded decimal value the program prepares to access a table (NUMBR) to obtain a word which, when applied to Display A or Display B, causes the display to display the decimal digit corresponding to the binary coded decimal value. Table III gives the values stored in the NUMBR table.

TABLE III

| NUMBR: | .BYTE | X'FB,X'B0 | ;NUMBERS 0 and 1 |
|---|---|---|---|
|  | .BYTE | X'ED,X'F5 | ;NUMBERS 2 and 3 |
|  | .BYTE | X'B6,X'D7 | ;NUMBERS 4 and 5 |

TABLE III-continued

| .BYTE | X'DF,X'F0 | ;NUMBERS 6 and 7 |
| .BYTE | X'FF,X'F6 | ;NUMBERS 8 and 9 |

At block 720, P1 is saved at P1HI and P1LO and the base address of NUMBR is loaded into P1. The high order character CHR1 is loaded into the accumulator and transferred to the E Register. A load instruction is executed using P1 with a displacement of −128 so that the actual address accessed is the base address of NUMBR plus the value taken from CHR1. The two digit hexadecimal code read from the NUMBR table is then stored at CHR1.

The conversion values for CHR2, CHR3 and CHR4 are then obtained from the NUMBR table in a similar manner as indicated at block 722.

Storage location LEDL is read into the accumulator and ANDed with X'80 to see if the bit is set indicating that the indicator LED associated with the rotor speed key should be on. If it is, the program jumps from decision point 726 to block 730. If it is not, the program proceeds to block 728 where it Exclusive-ORs the contents of CHR4 with the value X'80. Since CHR4 contains the value from the numbers table, and since all values of the numbers table have a "one" bit in position 7 the operations in block 728 turn off the indicator LED associated with the rotor key.

At block 540 the contents of PC were exchanged with P1 to branch to the Convert routine, and at block 720 the program count was stored in P1HI and P1LO. At block 730 the program count is returned to P1 after which a jump is taken to a location where the instruction specifies a jump to the Convert routine. The program thus proceeds to block 700 where the contents of P1 and PC are again exchanged, thereby placing the program count back in PC. The program thus returns to TLOOP at block 544. The instructions in this block transfer the four-digit rotor speed value from CHR1-CHR4 to ROTC1-ROTC4. The rotor speed value is now ready for display The program executes a sequence of instructions similar to those in blocks 536–544 to develop the converted value for displaying fan speed. This is indicated generally by block 550 and the fan speed value is stored at FANC1-FANC4. Similar sequences are executed at block 552 to develop the display values for the concave clearance, chaffer opening and sieve opening which are stored at CONC1-CONC2, CHFC1-CHFC2 and SIVC1-SIVC2, respectively.

The converted values are now ready for display. The program proceeds in FIG. 5B where X'7F is ANDed with LED1 and the result returned to LED1. This sets the indication that the RUN LED should be lighted. Next, the address of Display A is loaded into P1 and the value X'F0 is loaded into the accumulator. The last instruction in block 554 sends the value X'F0 to Display A as a control word thereby telling the display that data is coming and that the data should not be decoded before driving the displays.

The instructions in block 556 transfer 8 data words from the RAM I/O 106, through the accumulator in the microprocessor 100, to eight storage locations in the RAM contained within display driver system 134. These data words are obtained from locations 1-8 of the RAM I/O using P1 as the base address. These locations store the converted values ROTC1-ROTC4 and FANC1-FANC4. Therefore the rotor speed and fan speed values are loaded into the RAM in display driver system 134 where they are cyclically sampled to drive the digit displays 124 and 126.

The instructions in block 558 set up the display driver system 136 in the same manner as display driver system 134 was set up. The instructions in block 560 transfer eight data words from locations 9-16 of the RAM I/O 106 to the RAM in display driver system 136. These locations contain the converted values of the concave clearance (CONC1-CONC2), the chaffer opening (CHFC1-CHFC2) and the sieve opening (SIVC-1-SIVC2) as well as the indicators LED1 and LED2. After tranfer of these values to the RAM in display driver system 136, they are repetitively sampled to drive the two-digit displays 128, 130 and 132. The values from LED1 and LED2 control the RUN and THROTTLE indicators and since bit 7 of LED1 was reset at block 554 and bit 7 of LED2 was set at block 340 the RUN LED is turned on and the THROTTLE LED turned off when LED1 and LED2 are loaded into the RAM in display driver system 136.

After the converted values have been transferred to Display A and Display B, the program executes a delay instruction (block 562), loads the address of TLOOP into P1 (block 564) and exchanges the contents of PC and P1. This causes the program to branch back to the first instruction of TLOOP (block 500) where it proceeds to again sample the analog inputs to converter 108, convert the sample values to display values, and display the converted values on displays 124, 126, 128, 130 and 132. The TLOOP is repetitively executed until the machine is turned off or until it is interrupted by the operator depressing a key on the keyboard 110.

The TLOOP described above merely reads the analog input values representing the present values of the various monitored parameters and displays these values in digital form at Display A and Display B. In normal operation of the combine, the operator must exercise certain manual control over the combine through the use of keyboard 110. Before starting a harvesting operation it is necessary for the operator to select the type of crop to be harvested and the relative moisture level of the crop if he wishes to have all the operating parameters adjusted automatically in accordance with values stored in the PROM 104. The operator may also adjust the various parameters individually by striking a key corresponding to the parameter to be changed and then keying in the value to which he wishes the parameter to be adjusted.

Interrupt Routine

The Interrupt routine is utilized to develop the adjusting values for adjusting the various parameters in accordance with the information keyed in by the combine operator. This routine merely develops the adjusting values which are then used by the Adjust routine (subsequently described) to carry out the adjustment of the operating parameters. The main program (TLOOP) branches to the Interrupt routine whenever a key is struck on the keyboard 110 if the internal interrupt (IE) flag is set. The microprocessor 100 samples the signal on lead 150 from the keyboard prior to the fetch phase of each instruction and if the signal is true and the internal interrupt flag is set, the microprocessor exchanges the contents of PC and P3 (the starting address of the Interrupt routine), PC is incremented, the IE flag in the status register is reset to prevent further interrupts, and the program branches to the Interrupt routine. After the interrupt is processed, the IE flag is set again and the program returns to TLOOP at the point where it was interrupted. FIGS. 9–23 illustrate the various subroutines of the Interrupt routine. All of these subroutines are not executed each time a key is struck, the particular subroutines executed being determined by the struck key and previously struck keys.

In FIG. 9, the Interrupt routine always begins by saving the contents of the accumulator, E register, Status register, P1 and P3. Next the address of the keyboard is loaded into P1 and the base address of the segment lighting table (SEGL) is loaded into P3. The signals representing the struck key are read into the microprocessor from the keyboard and then stored in RAM I/O 106 at location STRK. The value of the struck key is entered in the E register and used with P3 to address SEGL. As previously explained, SEGL stores coded lighting values (Table I) which, when later applied to one of the display driver systems 134 and 136, cause the lighting of the indicator light associated with a struck key. The lighting value read from the lighting table is temporarily stored at location SLIT and the program proceeds to the next command, the address of which is stored at LP3L and LP3H.

The next command address stored at LP3L and L3PH at the time the first interrupt occurs is the address of the Initial Interrupt (INIT) subroutine which was stored therein at block 342 of the Power On routine (FIG. 3).

The INIT subroutine is shown in FIG. 10. It begins by clearing memory location ADJCHK. Bits 0–4 of this location are reserved for storing indicator bits relating to the parameters rotor speed, fan speed, concave opening, chaffer opening and sieve opening, respectively. The ADJCHK bits are individually selectively set during the interrupt routine as the operator keys information into the keyboard. Subsequently, when the adjustment routine is entered, the bits of ADJCHK are checked one at a time to determine if its corresponding parameter requires adjustment.

After ADJCHK is cleared, the value of the struck key is loaded into the accumulator of microprocessor 100 and successively tested at 1002, 1004 and 1006 to see if the struck key was the CROP SELECT or SIEVE key, or a key having a value over 15 i.e. the CHAFFER, CONCAVE, FAN or ROTOR key. If the struck key is none of these it is illegal and is ignored. The address of the INIT subroutine is loaded into P3 and a jump is made to the IEXIT subroutine (FIG. 11) where P3 is loaded into LP3L and LP3H. This insures that the INIT subroutine is again executed when the next key is struck.

The program executes instructions to copy status from the status register into the accumulator and at 1102 checks status to see if the struck key has been released. After the key is released the user's parameters are returned to P1, P3, the E register, the status register and the accumulator. The internal interrupt flag is enabled and the program returns to the main program (TLOOP) routine at the point where the main program was interrupted.

Figure 12:
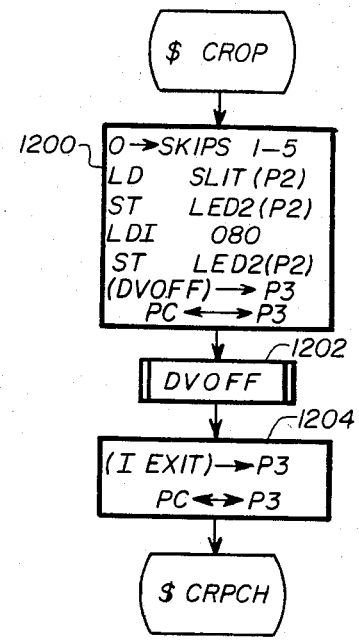
Figure 16:
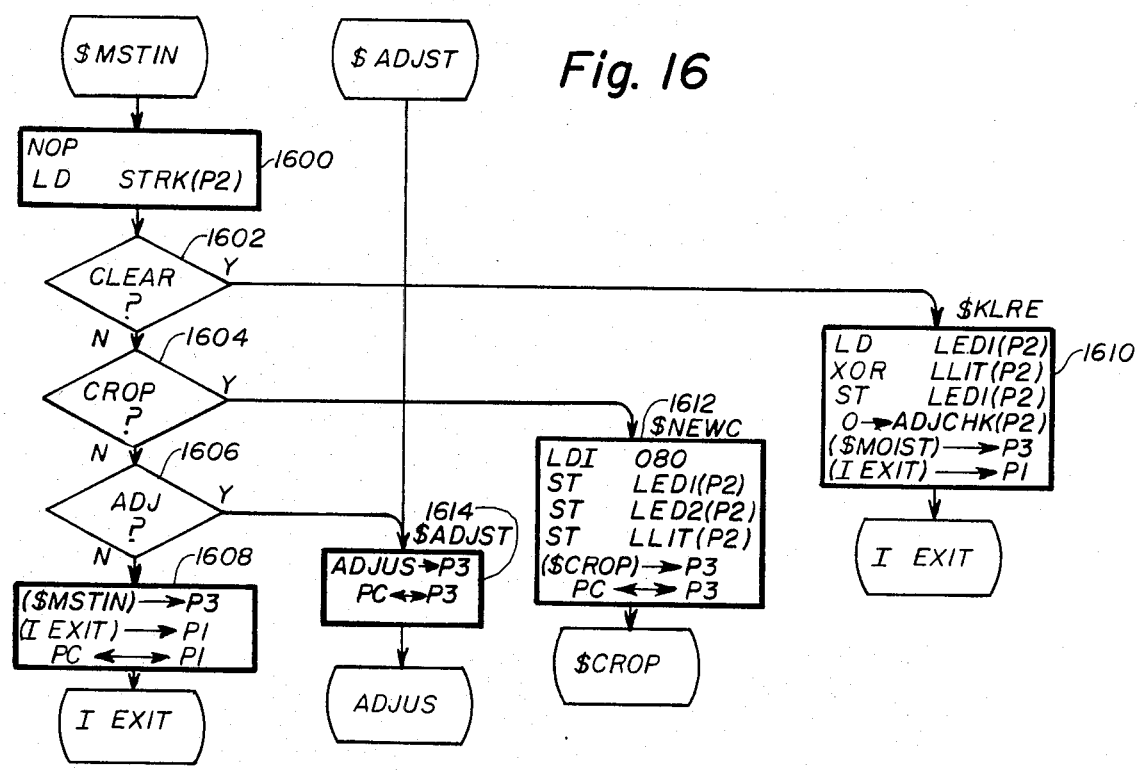

If the first struck key is the CROP SELECT key then at decision point 1002 a jump is taken to the $CROP subroutine illustrated in FIG. 12. Locations SKIP1–SKIP5 are cleared, the lighting value obtained from SEGL at block 900 is transferred from SLIT to LED2 and the value X'80 is loaded into LED1 to turn off the RUN LED. The DVOFF subroutine (FIG. 4) is then executed to set the values for turning off the rotor, fan, concave, chaffer and sieve indicator LEDs. After DVOFF is executed the $CROP subroutine loads the address of IEXIT into P3 and executes an XPPC instruction to exchange the contents of PC and P3. This places the address of the next instruction following the XPPC instruction in P3. This address is the location of the Crop Change subroutine $CRPCH.

When XPPC is executed the program branches to IEXIT and the address of $CRPCH is saved in the next command locations LP3L and LP3H (block 1100) for use when the next key is struck to cause another interrupt. The IEXIT subroutine is completed as previously explained and a return is taken to the main program.

Returning for the moment to the interrupt which occurred in response to depression of the CROP SELECT key, the CROP SELECT key returns the value "3" from the keyboard. Therefore, at block 900 the value X'81 was loaded into SLIT in accordance with the segment lighting table SEGL. At block 1200 this value was transferred to LED2 while X'80 was loaded into LED1. Therefore, on return to the main program, the main program, at block 560, turns off the RUN and THROTTLE indicator LEDs and lights the indicator LED associated with the CROP SELECT key. The main program is then repeated until the next key is struck.

Figure 13:
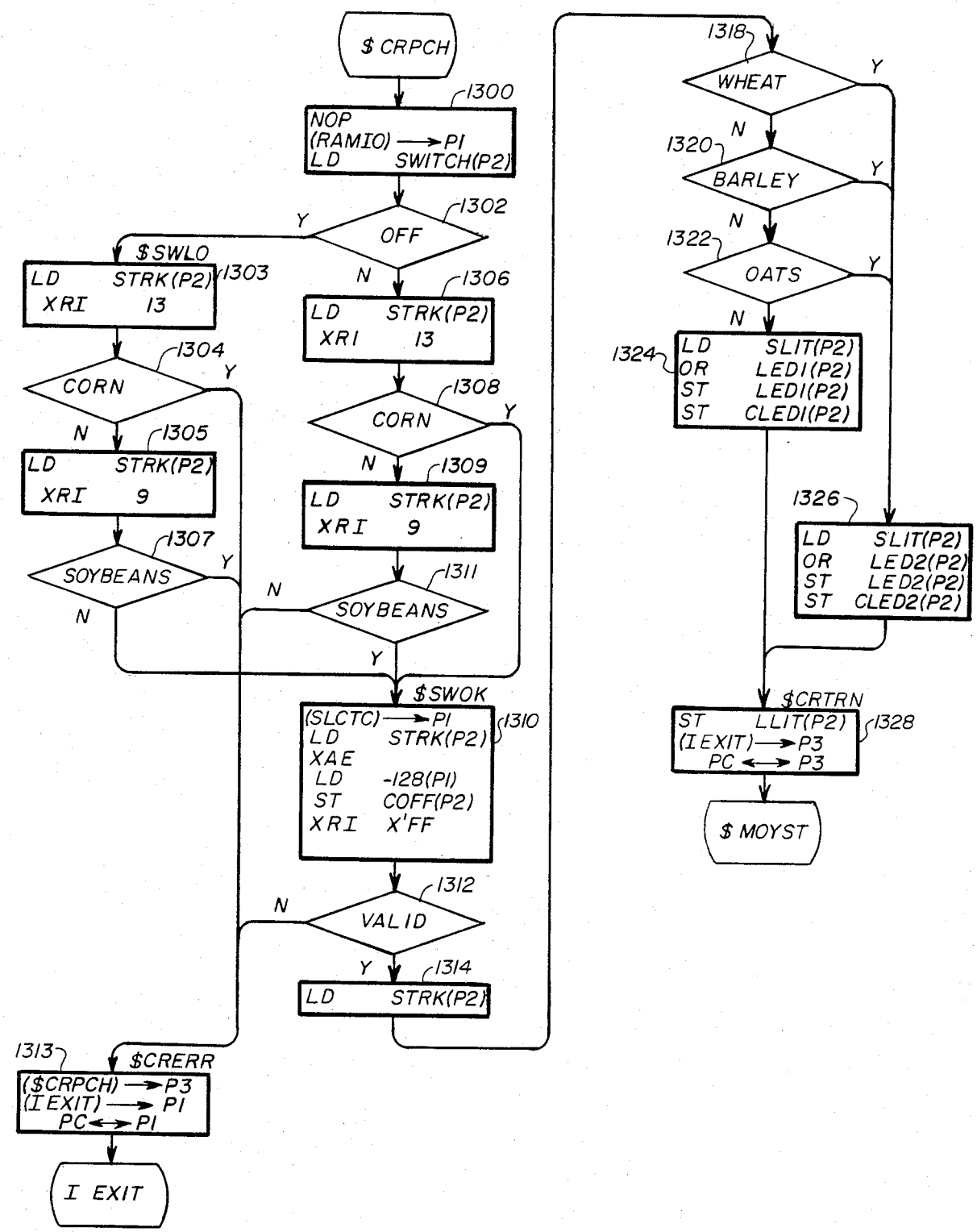
Figure 15:
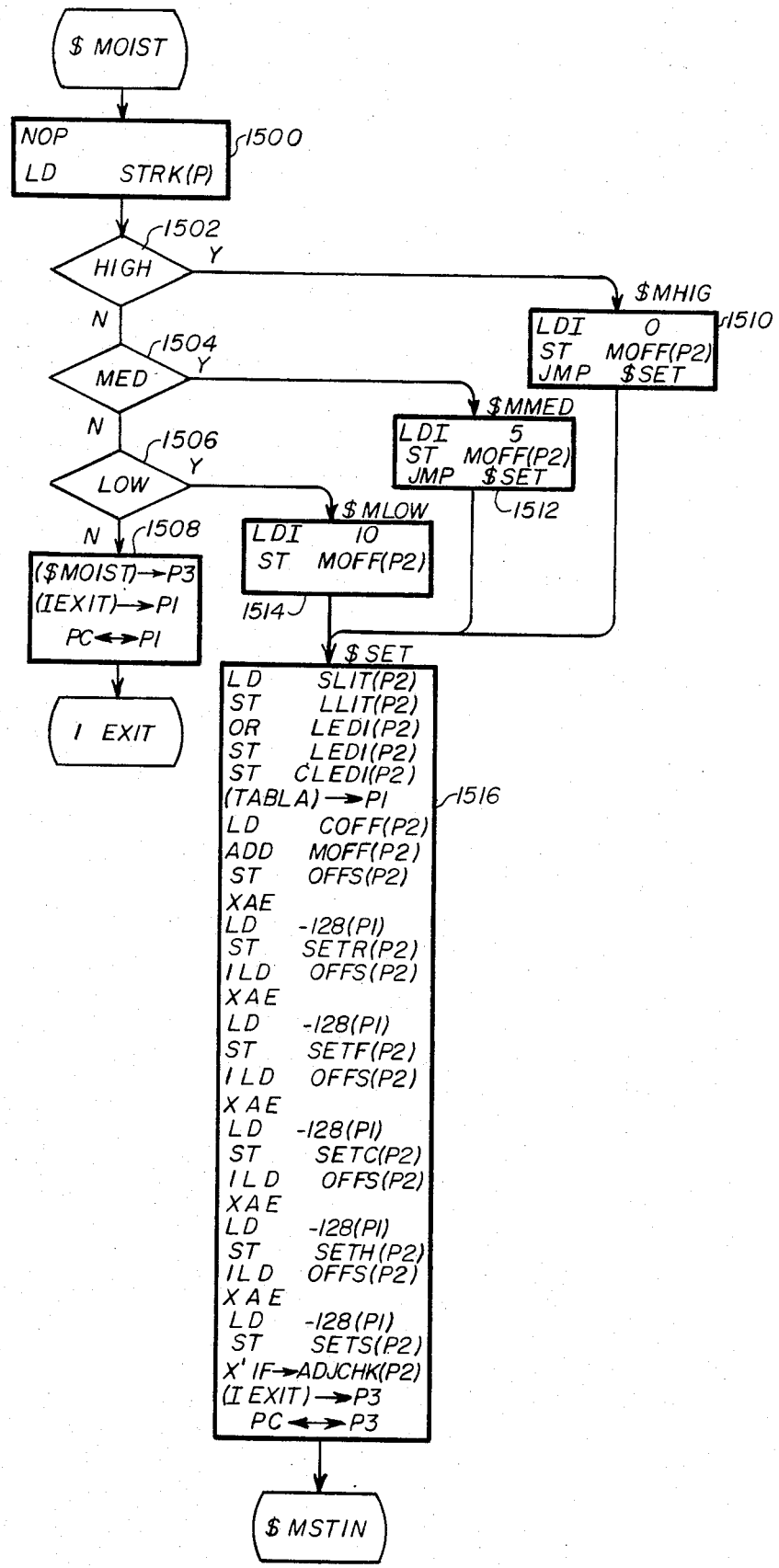

After the CROP SELECT key is struck, the only valid key which may be struck is one of the crop keys RICE, MAIZE, OATS, SOYBEANS, BARLEY, CORN or WHEAT. When the key is struck, the Interrupt routine is entered in FIG. 9. When the last instruction in block 900 is executed, the program branches to the subroutine $CRPCH (FIG. 13). This subroutine first samples the setting of the sieve switch (block 1300) and tests at block 1302 to see if it is off (i.e. the sieve and chaffer are set up for small grain) or on (set for corn or soybeans). If the switch is off, the value of the struck key is tested at block 1304 to see if it was the CORN key and if it is not a further test is made at 1307 to see if it was the soybean key. If it was the CORN key or the SOYBEAN key then an error condition exists because the sieve and chaffer installed on the combine are not for use with corn or soybeans. The program proceeds to block 1313 where the address of $CRPCH is loaded into P3 and a branch is taken to IEXIT where $CRPCH is loaded in LP3L and LP3H as the next command address for the next interrupt.

If the test at 1302 indicates that the sieve and chaffer are set up for corn the value of the struck key is tested at 1308 to see if corn was selected and if it was not then a further test is made at step 1311 to see if soybeans were selected. If neither corn nor soybeans were selected the program jumps to block 1313 and proceeds as before.

If the sieve switch indicates that the sieve is set up for corn or soybeans and corn or soybeans is the selected crop the program proceeds from decision point 1308 or decision point 1311 to block 1310 and if the sieve switch indicates that the sieve is set up for small grain and the selected crop is not corn or soybeans the program proceeds from decision point 1307 to block 1310.

TABLE IV

| SLCTC: | .BYTE | X'FF | ;INVALID - 0 |
|---|---|---|---|
|  | .BYTE | X'FF | ;INVALID - 1 |
|  | .BYTE | X'00 | ;RICE - 2 |
|  | .BYTE | X'FF | ;INVALID - 3 |
|  | .BYTE | X'FF | ;INVALID - 4 |
|  | .BYTE | X'0F | ;MAIZE - 5 |

TABLE IV-continued

| | | |
|---|---|---|
| .BYTE | X'1E | ;OATS - 6 |
| .BYTE | X'FF | ;INVALID - 7 |
| .BYTE | X'FF | ;INVALID - 8 |
| .BYTE | X'2D | ;SOYBEAN - 9 |
| .BYTE | X'3C | ;BARLEY - 10 |
| .BYTE | X'FF | ;INVALID - 11 |
| .BYTE | X'FF | ;INVALID - 12 |
| .BYTE | X'FF | ;CORN - 13 |
| .BYTE | X'FF | ;WHEAT - 14 |
| .BYTE | X'FF | ;INVALID - 15 |
| .BYTE | X'FF | ;INVALID - 16 |
| .BYTE | X'FF | ;INVALID - 17 |
| .BYTE | X'FF | ;INVALID - 18 |
| .BYTE | X'FF | ;INVALID - 19 |

The instructions in block 1310 load the base address of the crop select table SLCTC (Table IV) into P1 and index into the table using the value of the struck key. The value read from the table is stored at COFF and also XORed at 1310 with X'FF. If the struck key was an invalid key, then the value X'FF was read from the crop select table. If the test at decision point 1312 indicates that an invalid key was struck the program jumps to block 1306 and proceeds as described above.

If the test at 1312 indicates a valid key was struck then the value of the struck key is loaded into the accumulator at 1314 and successive tests are made at 1318, 1320 and 1322 to see if the struck key was the WHEAT, BARLEY or OATS key. If the struck key was the WHEAT, BARLEY or OATS key the saved lighting value SLIT is ORed with LED2 (block 1326) and the result stored at LED2 and CLED2. If the struck key was not the WHEAT, BARLEY or OATS key it must have been the CORN, RICE, MAIZE or SOYBEAN key and the lighting value SLIT is ORed with LED1 (block 1324) and the result stored at LED1 and CLED1. The reason for this is that LED1 is used for lighting the LEDs 194 (FIG. 1A) whereas LED2 is used for lighting the LEDs 192, and the WHEAT, BARLEY and OATS keys are associated with the group of LEDs designated 192.

From block 1324 or 1326 the program proceeds to block 1328 where the same value entered into LED1 or LED2 is also stored at the last lit location LLIT. A branch is then taken to the IEXIT subroutine previously described. The $MOYST subroutine is stored in memory at the locations following the last instruction in block 1328. Therefore when P3 is stored in LP3L and LP3H during IEXIT, the starting address of $MOYST is saved as the next command address to be used during the next interrupt.

Figure 14:
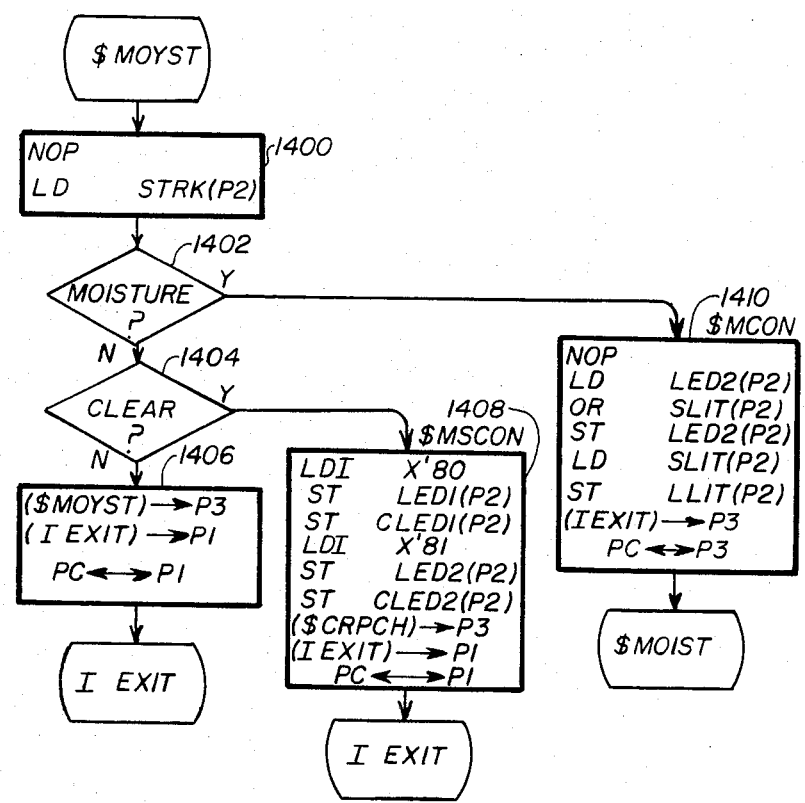

After a crop has been selected the only keys which may be validly struck are the CLEAR key and the CROP MOISTURE key. When a key is struck the Interrupt routine steps of FIG. 9 are executed and the program branches to the next command address which now is the starting address of $MOYST. In FIG. 14, the value of the struck key is tested at 1402 to see if it is the MOISTURE key. Assuming for the moment that it is not, the value is then tested at 1404 to see if the CLEAR key was struck. Assuming it was not the CLEAR key either, then the struck key is ignored and the program prepares to wait for another key to be struck. At block 1406 the starting address of $MOYST is loaded into P3 for storage at LP3L and LP3H when IEXIT is executed. A branch is then made to IEXIT and after completion of IEXIT the program returns to the TLOOP at the point of interruption and proceeds from there.

Assuming that the CLEAR key was struck, then at decision point 1404 the program jumps to block 1408 where it stores X'80 into LED1 and CLED1. The loading of LED1 will turn off the CROP and RUN LEDs when the main program is resumed. The value X'81 is stored in LED2 and CLED2 with this value turning OFF the THROTTLE and turning ON the CROP SELECT LEDs when the main program is resumed. The address of $CRPCH is loaded into P3 and a branch is taken to IEXIT where $CRPCH is stored at the next command locations LP3H and LP3L. Thus, on the next interrupt the program proceeds to FIG. 13 after executing the instruction in FIG. 9. This means that if the test at decision point 1404 indicates that the CLEAR key has been depressed then the operator must again depress one of the keys designating a selected crop.

Returning to the $MOYST subroutine of FIG. 14, assume now that the struck key was the MOISTURE key. A jump is made from decision point 1402 to block 1410 where the saved lighting value in SLIT is updated by ORing it with the present lighting value in LED2. The value in SLIT is transferred to LLIT and the program branches to IEXIT. The starting address of subroutine $MOIST is stored in memory at locations following the last instruction in block 1410 and it is the first instruction address of $MOIST that is saved at LP3L and LP3H during IEXIT as the next command address. Therefore, when the next key is struck the Interrupt routine steps of FIG. 9 are executed and the program branches to $MOIST in FIG. 15.

The $MOIST subroutine first checks the value of the struck key to see if the HIGH, MEDIUM, or LOW moisture key was struck. These checks are performed at decision points 1502, 1504 and 1506, respectively. If none of the moisture keys has been struck then the struck key is illegal. At block 1508 the starting address of $MOIST is loaded into P3, and a branch is taken to IEXIT where the starting address of $MOIST is loaded into the next command address locations LP3L and LP3H. This insures that on the next interrupt the program will again proceed to $MOIST to again check for activation of a moisture key.

If the test at decision point 1502 indicates that the HIGH moisture key was struck the program jumps to block 1510 where a zero value is stored in the moisture offset location MOFF. In like manner, if the test at decision point 1504 or 1506 indicates that the MEDIUM or LOW moisture key, respectively, was struck then the program jumps to block 1512 or 1514 where the value 5 or the value 10, respectively, is stored in MOFF. After the moisture offset value 0, 5 or 10 is stored in MOFF the program proceeds to block 1516 where the saved lighting value SLIT is stored at LLIT. SLIT is also ORed with LED1 and the result stored at LED1 and CLED1.

TABLE V

| | | ADJUST VALUE | DEVICE | CROP | MOIS- TURE |
|---|---|---|---|---|---|
| TABLA: | .BYTE | 169 | ;ROT | RICE | HIGH |
| | .BYTE | 185 | ;FAN | RICE | HIGH |
| | .BYTE | 61 | ;CON | RICE | HIGH |
| | .BYTE | 215 | ;CHA | RICE | HIGH |
| | .BYTE | 172 | ;SIV | RICE | HIGH |
| | .BYTE | 160 | ;ROT | RICE | MEDIUM |
| | .BYTE | 170 | ;FAN | RICE | MEDIUM |
| | .BYTE | 61 | ;CON | RICE | MEDIUM |
| | .BYTE | 215 | ;CHA | RICE | MEDIUM |
| | .BYTE | 172 | ;SIV | RICE | MEDIUM |
| | .BYTE | 150 | ;ROT | RICE | LOW |

TABLE V-continued

| ADJUST VALUE | DEVICE | CROP | MOISTURE |
|---|---|---|---|
| .BYTE 160 | ;FAN | RICE | LOW |
| .BYTE 64 | ;CON | RICE | LOW |
| .BYTE 215 | ;CHA | RICE | LOW |
| .BYTE 172 | ;SIV | RICE | LOW |
| .BYTE 160 | ;ROT | MAIZE | HIGH |
| .BYTE 188 | ;FAN | MAIZE | HIGH |
| .BYTE 56 | ;CON | MAIZE | HIGH |
| .BYTE 86 | ;CHA | MAIZE | HIGH |
| .BYTE 56 | ;SIV | MAIZE | HIGH |
| .BYTE 140 | ;ROT | MAIZE | MEDIUM |
| .BYTE 160 | ;FAN | MAIZE | MEDIUM |
| .BYTE 62 | ;CON | MAIZE | MEDIUM |
| .BYTE 101 | ;CHA | MAIZE | MEDIUM |
| .BYTE 72 | ;SIV | MAIZE | MEDIUM |
| .BYTE 121 | ;ROT | MAIZE | LOW |
| .BYTE 150 | ;FAN | MAIZE | LOW |
| .BYTE 61 | ;CON | MAIZE | LOW |
| .BYTE 124 | ;CHA | MAIZE | LOW |
| .BYTE 72 | ;SIV | MAIZE | LOW |
| .BYTE 166 | ;ROT | OATS | HIGH |
| .BYTE 160 | ;FAN | OATS | HIGH |
| .BYTE 55 | ;CON | OATS | HIGH |
| .BYTE 202 | ;CHA | OATS | HIGH |
| .BYTE 96 | ;SIV | OATS | HIGH |
| .BYTE 134 | ;ROT | OATS | MEDIUM |
| .BYTE 138 | ;FAN | OATS | MEDIUM |
| .BYTE 57 | ;CON | OATS | MEDIUM |
| .BYTE 165 | ;CHA | OATS | MEDIUM |
| .BYTE 44 | ;SIV | OATS | MEDIUM |
| .BYTE 114 | ;ROT | OATS | LOW |
| .BYTE 130 | ;FAN | OATS | LOW |
| .BYTE 59 | ;CON | OATS | LOW |
| .BYTE 230 | ;CHA | OATS | LOW |
| .BYTE 120 | ;SIV | OATS | LOW |
| .BYTE 96 | ;ROT | SOYBEAN | HIGH |
| .BYTE 178 | ;FAN | SOYBEAN | HIGH |
| .BYTE 64 | ;CON | SOYBEAN | HIGH |
| .BYTE 76 | ;CHA | SOYBEAN | HIGH |
| .BYTE 181 | ;SIV | SOYBEAN | HIGH |
| .BYTE 103 | ;ROT | SOYBEAN | MEDIUM |
| .BYTE 166 | ;FAN | SOYBEAN | MEDIUM |
| .BYTE 64 | ;CON | SOYBEAN | MEDIUM |
| .BYTE 76 | ;CHA | SOYBEAN | MEDIUM |
| .BYTE 150 | ;SIV | SOYBEAN | MEDIUM |
| .BYTE 90 | ;ROT | SOYBEAN | LOW |
| .BYTE 156 | ;FAN | SOYBEAN | LOW |
| .BYTE 65 | ;CON | SOYBEAN | LOW |
| .BYTE 76 | ;CHA | SOYBEAN | LOW |
| .BYTE 119 | ;SIV | SOYBEAN | LOW |
| .BYTE 186 | ;ROT | BARLEY | HIGH |
| .BYTE 190 | ;FAN | BARLEY | HIGH |
| .BYTE 54 | ;CON | BARLEY | HIGH |
| .BYTE 248 | ;CHA | BARLEY | HIGH |
| .BYTE 148 | ;SIV | BARLEY | HIGH |
| .BYTE 173 | ;ROT | BARLEY | MEDIUM |
| .BYTE 180 | ;FAN | BARLEY | MEDIUM |
| .BYTE 55 | ;CON | BARLEY | MEDIUM |
| .BYTE 215 | ;CHA | BARLEY | MEDIUM |
| .BYTE 120 | ;SIV | BARLEY | MEDIUM |
| .BYTE 153 | ;ROT | BARLEY | LOW |
| .BYTE 165 | ;FAN | BARLEY | LOW |
| .BYTE 57 | ;CON | BARLEY | LOW |
| .BYTE 248 | ;CHA | BARLEY | LOW |
| .BYTE 172 | ;SIV | BARLEY | LOW |
| .BYTE 99 | ;ROT | CORN | HIGH |
| .BYTE 214 | ;FAN | CORN | HIGH |
| .BYTE 69 | ;CON | CORN | HIGH |
| .BYTE 76 | ;CHA | CORN | HIGH |
| .BYTE 181 | ;SIV | CORN | HIGH |
| .BYTE 99 | ;ROT | CORN | MEDIUM |
| .BYTE 200 | ;FAN | CORN | MEDIUM |
| .BYTE 65 | ;CON | CORN | MEDIUM |
| .BYTE 76 | ;CHA | CORN | MEDIUM |
| .BYTE 181 | ;SIV | CORN | MEDIUM |
| .BYTE 77 | ;ROT | CORN | LOW |
| .BYTE 185 | ;FAN | CORN | LOW |
| .BYTE 71 | ;CON | CORN | LOW |
| .BYTE 76 | ;CHA | CORN | LOW |
| .BYTE 181 | ;SIV | CORN | LOW |
| .BYTE 191 | ;ROT | WHEAT | HIGH |
| .BYTE 160 | ;FAN | WHEAT | HIGH |
| .BYTE 53 | ;CON | WHEAT | HIGH |
| .BYTE 150 | ;CHA | WHEAT | HIGH |
| .BYTE 56 | ;SIV | WHEAT | HIGH |
| .BYTE 186 | ;ROT | WHEAT | MEDIUM |
| .BYTE 160 | ;FAN | WHEAT | MEDIUM |
| .BYTE 55 | ;CON | WHEAT | MEDIUM |
| .BYTE 150 | ;CHA | WHEAT | MEDIUM |
| .BYTE 56 | ;SIV | WHEAT | MEDIUM |
| .BYTE 147 | ;ROT | WHEAT | LOW |
| .BYTE 160 | ;FAN | WHEAT | LOW |
| .BYTE 61 | ;CON | WHEAT | LOW |
| .BYTE 215 | ;CHA | WHEAT | LOW |
| .BYTE 120 | ;SIV | WHEAT | LOW |

Next, preparations are made for obtaining values from TABLA for setting the operating parameters rotor speed, fan speed, concave clearance, chaffer opening and sieve opening. The values in TABLA are given in Table V. This table stores sets of adjusting values, there being one set for each possible combination of a crop and a moisture level for that crop. Each set of adjusting values includes a value corresponding to each operating parameter. The address of TABLA is loaded into P1 and the crop and moisture offsets COFF and MOFF added together to get the total offset which is stored at OFFS. OFFS is also entered into the E register and a Load instruction with an offset of −128 is executed. This reads from TABLA the value stored at the address which is the sum of the table base address and OFFS. Assume for example that the selected crop is maize and the selected moisture level of the grain is medium. At block 1310 the value X'0F was read from SLCTC and stored at COFF, and at block 1512 the value 5 was stored in MOFF. The sum of these values is OFFS=X'14 or 20 in binary. Therefore, the value 140 is read from TABLA as the rotor speed value. It is stored at SETR.

Next, an increment and load (ILD) instruction is executed using OFFS as the offset. Under the assumed conditions (maize with medium moisture) the ILD instruction addresses offset location 21 in TABLA and reads the fan speed value 160 therefrom. This value is stored at location SETF. The subsequent ILD instructions in block 1516 read the concave, chaffer and sieve setting values from successive locations in TABLA and these values are stored at SETC, SETH and SETS, respectively.

After the setting values have been stored, the value X'1F is loaded into the accumulator and stored at ADJCHK. ADJCHK is used to control the adjustment routine subsequently described. Five bits of ADJCHK correspond to the five parameters which may be adjusted and during the adjustment routine a given parameter is adjusted only if its corresponding bit in ADJCHK is set. Entry into the adjustment routine by way of CROP SELECT requires that all five parameters be adjusted hence X'1F sets all five bits in ADJCHK. Entry into the adjusting routine by way of an individual parameter key will cause only one parameter to be set and in this case only one bit of ADJCHK is set prior to entering the adjusting routine.

After ADJCHK is set the program branches to IEXIT. The first instruction of subroutine $MSTIN is stored in memory at the next location following the last instruction of block 1516. Therefore, during IEXIT the starting address of $MSTIN is loaded into LP3L and LP3H as the address of the next command for use during the next interrupt. After the IEXIT subroutine is completed the program returns to the main program (TLOOP) at the point where the interrupt occurred and repeatedly cycles through TLOOP until another key is struck. The values read from TABLA are not sent to the display driver systems 134 and 136 but are held in the RAM I/O 106.

At this point the operator has three choices. He may strike the ADJUST key to adjust the system parameters such as rotor speed, concave clearance, etc. in accordance with the values read from TABLA, he may strike the CROP SELECT key to begin selection of a new crop, or he may strike the CLEAR key in preparation for selecting a new moisture value. All other keys are ignored.

When the key is struck the program branches to the Interrupt subroutine and executes the instructions in FIG. 9. The starting address of $MSTIN is stored at the next command location so the program branches to $MSTIN (FIG. 16) where it successively tests the struck key value at decision points 1602, 1604 and 1606 to see if the struck key was the CLEAR, CROP SELECT or ADJUST key, respectively. Assuming the struck key is none of these, it is invalid and is ignored. The program proceeds to block 1608 where the starting address of $MSTIN is loaded into P3 and a branch is made to IEXIT where this address is stored at LP3L and LP3H as the next command address. This insures that the Interrupt subroutine returns to $MSTIN when the next key is struck.

If the test at decision point 1602 indicates that the CLEAR key was struck, a jump is made to block 1610 where LED1 is XORed with LLIT and the result stored at LED1 to turn off the last lit indication. All bits in ADJCHK are cleared, the starting address of $MOIST is loaded into P3, and a branch made to IEXIT from whence the program returns to TLOOP with $MOIST stored at LP3L and LP3H. Therefore, on the next interrupt, after the instructions in FIG. 9 are executed, the program branches to $MOIST (FIG. 15) to see if a moisture level key was struck.

If the test at decision point 1604 indicates that the CROP SELECT key was struck, a jump is made to block 1612 where the value X'80 is stored in LED1, LED2 and LLIT. This will turn off all the lit indicator LEDs when a return is made to the main program. The starting address of $CROP is loaded into P3 and a branch taken to IEXIT where the address of $CROP is stored at LP3L and LP3H as the next command address to be used during the next interrupt. After IEXIT is completed the program returns to TLOOP at the point where it was interrupted and repeatedly cycles through TLOOP until another key is struck. After the next key is struck the program branches to the Interrupt routine, executes the instructions in FIG. 9, and then branches to $CROP (FIG. 12). From this point the program proceeds as previously described.

Figure 24A:
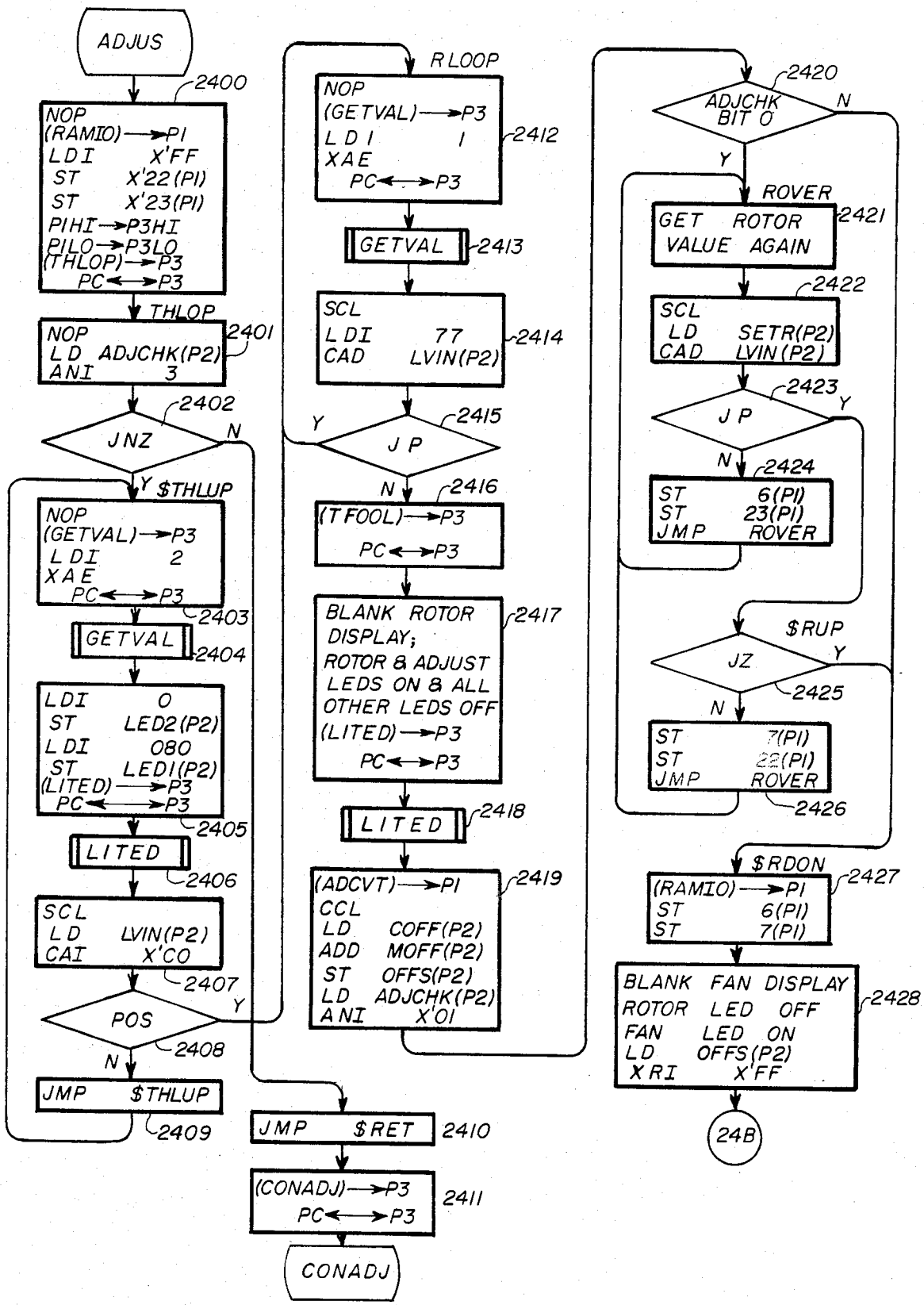
FIGS. 24A-24B and 25A-25C illustrate the Adjust routine; and, FIGS. 26-28 illustrate subroutines utilized in the adjustment routine, the subroutines being identified as follows.

If the test at decision point 1606 indicates that the ADJUST key has been struck a jump is made to block 1614 where the starting address ADJUS of the Adjust routine is placed in P3. The contents of P3 and PC are then exchanged to branch to the Adjust routine (FIG. 24A). This routine is explained below and is utilized to send signals out through drivers 122 to adjust the system parameters rotor speed, fan speed, concave clearance, chaffer opening and/or the sieve opening. However, before explaining the Adjust routine, the remainder of the Interrupt routine will be explained. It should be noted however, that in response to operator selection of a particular crop and the moisture level of that crop, the present system has generated values for setting the rotor speed, fan speed, concave clearance, chaffer opening and sieve opening.

Although operator selection of a crop and a crop moisture results in the generation of setting values for setting the rotor speed, fan speed, concave opening, chaffer opening and sieve opening as described above, it may at times be necessary for the operator to adjust certain of these parameters individually to "fine tune" the system or to account for other considerations. For example, a sloping field will change the rate of crop flow through the combine and the operator may wish to adjust the chaffer or sieve to compensate for this. There are other numerous reasons why it may be desirable to adjust an individual parameter such as when harvesting an extremely light crop, for example, a light crop resulting from frost or drought. To adjust an individual parameter, the operator strikes a key to select the parameter to be adjusted and keys in the value to which the parameter should be adjusted The microprocessor 100 then develops signals for adjusting the parameter to the desired setting. In addition, the keyed values are displayed on the visual displays while indicator LEDs are selectively lit to inform the operator of his progress in keying in a value. The Interrupt routine is utilized to display the keyed values and develop from them the actual values used for adjusting the parameters.

As previously explained, the only legal keys which may be struck after power is turned on and the program enters TLOOP are the CROP SELECT, SIEVE, ROTOR, FAN, CONCAVE and CHAFFER keys. The Interrupt routine executed when the CROP SELECT key is the first key struck has already been explained. If any other one of the other legal keys is struck the program proceeds as follows.

When the key is struck it causes an interrupt in TLOOP and a branch to the Interrupt routine where the operations shown in FIG. 9 are executed. The next command address stored in LP3H and LP3L is the starting address of INIT. Therefore, from FIG. 9 the program branches to FIG. 10 where the value of the struck key is loaded into the accumulator and tested to see if it represents a legal key. At decision point 1004, if the test indicates that the SIEVE key was struck a jump is made to block 1010. At decision point 1006, if the test indicates that the ROTOR, FAN, CONCAVE or CHAFFER key was struck (i.e. a key over value 15) a jump is made to block 1010. Except for the CROP SELECT key, all keys having a value below 15 are invalid. The instructions in block 1010 cause a branch to the subroutine $CHNG (FIG. 17) where X'80 is stored in CLED1 and CLED2 to clear these locations of any lighting values.

Next, the value of the struck key is tested at 1702 to see if the ADJUST key has been struck. The reason for this test is that the Adjust routine is entered through the $CHNG subroutine after an adjustment value has been keyed into the keyboard as subsequently described. Assuming for the moment that the ADJUST key has been struck, the program jumps to $ADJST (FIG. 16), executes the instructions in block 1614, and branches to the ADJUS routine (FIG. 24A) which will be described later.

If the test at decision point 1702 indicates that the struck key was not the ADJUST key the program proceeds to block 1704 where MOFF is cleared and the value X'FF stored in COFF. At decision point 1706 a test is made to see if the SIEVE key was struck. Assuming that it was, a jump is made to the subroutine $COGO (FIG. 18A) where preparations are made at block 1800 to execute the DVOFF subroutine (FIG. 4), which clears the memory locations for lighting the LEDs associated with the ROTOR, FAN, CONCAVE, CHAFFER and SIEVE keys. Upon return from DVOFF the instructions in block 1804 set SKIP5, set ADJCHK bit 4, clear the sieve character and indicator light locations in memory, and transfer SETS to LSET. At block 1808 a branch is taken to IEXIT with P3 containing the address of the subroutine $SCHA. During execution of IEXIT the address of $SCHA is saved at LP3H and LP3L for use when the next key is struck.

When the next key is struck, it should be a digit key. The striking of the key causes an interrupt, the steps of FIG. 9 are executed, and the program branches to $SCHA (FIG. 18B). At block 1812 the base address DIJET of a table is entered into P1 and the value of the struck key is entered into the E register and utilized to index into the table. The value read from the table is stored at TCHAR and KEYTP.

TABLE VI

| DIJET: | .BYTE | X'FF | ;CROP MOISTURE |
|---|---|---|---|
|  | .BYTE | X'FF | ;NO KEY |
|  | .BYTE | X'00 | ;0 - RICE |
|  | .BYTE | X'FF | ;CROP SELECT |
|  | .BYTE | X'03 | ;3 - HIGH |
|  | .BYTE | X'06 | ;6 - MAIZE |
|  | .BYTE | X'09 | ;9 - OATS |
|  | .BYTE | X'0F | ;CLEAR |
|  | .BYTE | X'02 | ;2 - MEDIUM |
|  | .BYTE | X'05 | ;5 - SOYBEAN |
|  | .BYTE | X'08 | ;8 - BARLEY |
|  | .BYTE | X'FF | ;ADJUST |
|  | .BYTE | X'01 | ;1 - LOW |
|  | .BYTE | X'04 | ;4 - CORN |
|  | .BYTE | X'07 | ;7 - WHEAT |
|  | .BYTE | X'FF | ;SIEVE |
|  | .BYTE | X'FF | ;ROTOR |
|  | .BYTE | X'FF | ;FAN |
|  | .BYTE | X'FF | ;CONCAVE |
|  | .BYTE | X'FF | ;CHAFFER |

Inspection of Table VI shows that DIJET stores the value X'FF at the locations accessed when an invalid key value is used as the offset from the table base address. This value is XORed with X'FF and at decision point 1814 the result is tested to find out if a valid key was struck. Assuming that a valid key was struck the program proceeds to block 1816 where TCHAR is XORed with X'0F to see if the CLEAR key was struck. Assuming that the CLEAR key was struck the program proceeds to block 1820 where LSET is returned to SETS, Skip 5 is cleared, and the sieve adjust indicator bit in ADJCHK is turned off. The program then branches to CLRCH (FIG. 18C) where LED1 and LED2 are loaded with the value 080 to turn off the keypad LEDs, the LEDs actually being turned off when DVOFF is executed at step 1823. The address of the $CHNG subroutine is loaded into P3 at step 1825 for use as the next command when the next interrupt occurs and the program returns to TLOOP through IEXIT in the manner previously described. The operations in blocks 1820-1825 effectively clear any indication that the sieve key was struck hence the operator may begin selection of a parameter for adjustment by depressing the appropriate key, i.e. sieve, chaffer, concave, etc.

Returning to step 1818, if the test shows that the CLEAR key was not struck the program jumps to block 1827 where the high order digit position SCHR1 is loaded into the accumulator. The value of SCHR1 should be zero. If it is not, it means that the operator is trying to enter a third digit. The sieve opening value can have a maximum of only two digits therefor an error condition exists if the test at step 1829 shows SCHR1 is not zero. A jump is made to block 1829 and the program proceeds as described in the preceding paragraph.

If the test at step 1829 shows that SCHR1 is zero then SCHR2 is shifted into SCHR1 and the value of the struck key is entered in SCHR2 from TCHAR. If the struck digit key has a value less than 7 its LED is lighted via LED1 and if the value is 7 or more its LED is lighted via LED2. The last two instructions in block 1822 and the instructions in blocks 1824 and 1826 or 1828 accomplish the storage of the lighting value in LED1 or LED2.

At this point the microprocessor 100 is prepared to convert the value keyed into the keyboard 110 into a value for setting the sieve. However, at this point only one digit of the keyed value has been entered and there is no way for the microprocessor to know if this is the only digit of the value being entered or only the first of two digits. The microprocessor assumes that the keyed digit is the only digit which will be keyed in and converts or scales this keyed value to a value for setting the sieve. If another digit is later entered then the microprocessor recomputes the scaled value for setting the sieve.

As previously explained, the digital values obtained from ADC 108 must be scaled (i.e. to decimal inches or RPM) before they are displayed. When adjusting values are keyed into the system and displayed, they must be scaled back before being used to control the motors or actuators which actually set the rotor speed, fan speed, concave clearance, chaffer opening or sieve opening. The value for setting the sieve opening is calculated according to one of two equations depending upon whether the combine is set up for harvesting corn or soybeans or set up for harvesting grain. For corn or soybeans (1.12 inch sieve) the conversion equation is:

Sieve Adjustment $=(L\times2.58)+21$, where L is the desired sieve setting in inches times 100. The times 100 is implied since the operator does not enter the decimal point. For grain (0.81 inch sieve) the conversion equation is:

Sieve Adjustment $=(L\times4)+16$

At step 1830 the value representing the sieve switch setting is loaded into the accumulator and at step 1832 this value is tested to see if a grain sieve or corn/soybean sieve is in place. If a corn sieve is in place a jump is made to $CORNSV where SCHR1 is loaded into the accumulator and tested at step 1838 to see if it is a zero value. This will occur the first time $CORNSV is entered or if the operator desires a small sieve clearance. If SCHR1=0 then the program proceeds to step 1840 where SCHR2 is transferred to DVALL. At step 1852, SCHR2 is transferred to TCHAR and steps are taken to prepare for branching to the divide subroutine.

At step 1848 the divide routine is performed to divide the value in DVALL and DVALLH by 2,4 ... 256 and store the fractional values at DL2,DL4 ... DL256.

The steps in block 1856 sum TCHAR with TCHAR and add in the fractional values in DL2, DL16 and DL64 to thus obtain 2.58L. The value 21 is then added in to obtain the sieve adjustment value which is stored as SETS. The computation is now complete and preparations are made for returning to TLOOP.

At block 1858 $SCHA is entered into P3 and NUMBR, the base address of the NUMBR table is entered into P1. SIVC2 is ORed with 080 to turn off the position which lights the decimal point and the result is stored at SIVC1. Next, the value of the struck key is moved from KEYTP to the E register and used as an index value into the NUMBR table to obtain the lighting value of the struck key. This value is ORed with 080 to turn off the position which lights the LED and the result is stored at SIVC2.

The program then branches to IEXIT with $SCHA in P3, and during execution of the IEXIT subroutine $SCHA is stored at the next command address location LP3H and LP3L. The program proceeds through the IEXIT subroutine as previously described and returns to TLOOP where the value of the struck key is displayed in the units position of the sieve display 132.

The next key to be struck should be the units digit of the sieve opening value. When the key is depressed the program branches to INTER (FIG. 9) and after execution of the instructions in block 900 branches again to $SCHA (FIG. 18B) and proceeds as before to step 1822.

At this time the value of the first digit key struck is in SCHR2. It is transferred to SCHR1 at block 1822 and the value of the second digit key struck is stored in SCHR1. The lighting values are stored at steps 1826 or 1828 as described above for the tens digit. The switch value is loaded into the accumulator at step 1830 and tested at step 1832. Under the assumption made before, the switch is not on so $CORNSV is entered. SCHR1 is loaded at step 1836 and tested at step 1838. SCHR1 is not zero so it is tested by steps 1842 and 1844 to see if it is a nine. The maximum corn sieve opening is 0.89 inches so if the test at step 1842 proves true a branch is taken to the error subroutine of block 1820 (FIG. 18B) and proceeds as previously described.

If the test at step 1844 indicates that SCHR1 is not a nine, the steps at block 1846 prepare for a multiply subroutine using the digit as an iteration count and the digit is multiplied by 10 at step 1848. SCHR2 is added to the result at step 1850 to obtain the total 2-digit entry which is stored at DVALL and TCHAR. The operations at step 1852 prepare to divide the entry and the division is carried out at step 1854. The steps in blocks 1856 and 1858 are then carried out as described above and the program returns to TLOOP through IEXIT.

Figure 18D:
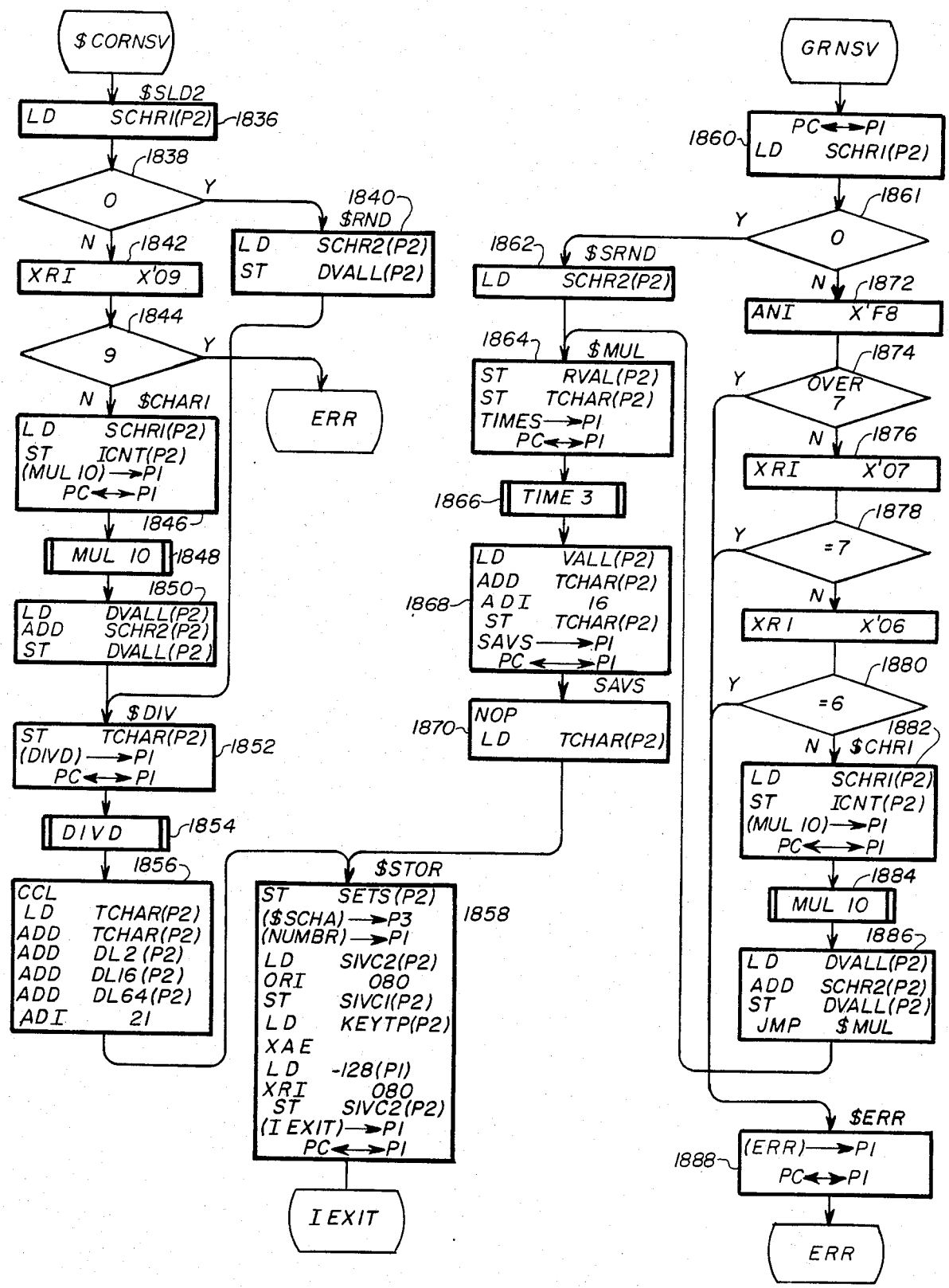

If a grain sieve rather than a corn/soybean sieve is in place in the combine, the test at step 1832 (FIG. 18B) will prove false and at block 1834 preparations are made to branch to the GRNSV routine of FIG. 18D. At step 1861 SCHR1 is tested for a zero value. It will be zero for the first digit entry so a jump is made to step 1862 which loads SCHR2 (it contains the struck key value) into the accumulator. At step 1864 SCHR2 is entered into TCHAR and RVAL and a branch taken to a subroutine (block 1866) which multiples the struck key value by 3 and places the result in VALL. The value of the struck key in TCHAR is added to the multiplication result to obtain four times the struck key value and then 16 is added in to thus obtain LX4+16 which is stored at TCHAR. TCHAR is then transferred to SETS (block 1858) and the program proceeds from that point as previously described.

When the second digit is entered the test at step 1861 will prove false so the program proceeds to step 1872. The maximum grain sieve setting value is 0.59. Steps 1872–1880 test to see if the value keyed in is greater than 0.59 or, more specifically, tests to see if the first digit entered is 6 or greater. If it is, the program jumps to block 1880 where it branches to the ERR routine (FIG. 18B) and proceeds as previously described. If the first digit entered is less than 6, the program proceeds to step 1882 where the first digit is used as an iteration count in a MUL 10 subroutine which multiples the digit value by 10 (step 1884). The second digit value, present in SCHR2, is added to the multiplication result to obtain the total value for the 2-digit entry. The program then jumps to block 1864 and proceeds to develop LX4+16 as previously described.

After the SIEVE key and two digit keys have been struck, the combine operator may observe on display 132 the value he has entered. If it is correct, he normally strikes the ADJUST key so that the system will adjust the sieve opening in accordance with the value of the digit keys he has struck. The striking of the ADJUST key causes an interrupt and the operations of FIG. 9 are executed. The starting address of $SCHA is held in LP3H and LP3L so a branch is taken to FIG. 18B. After the value of the struck key is obtained from the table DIJET it is tested at 1814 to see if it is a valid digit key. Since it is not, a jump is taken to $CHNG (FIG. 17) where 080 is stored at CLED1 and CLED2. The struck key value (not the value from DIJET) is XORed with the value 11 to see if the ADJUST key was struck. Assuming that it was, a jump is made from test point 1702 to $ADJST (FIG. 16) where a branch is then taken to the ADJUS routine subsequently described.

Figure 19A:
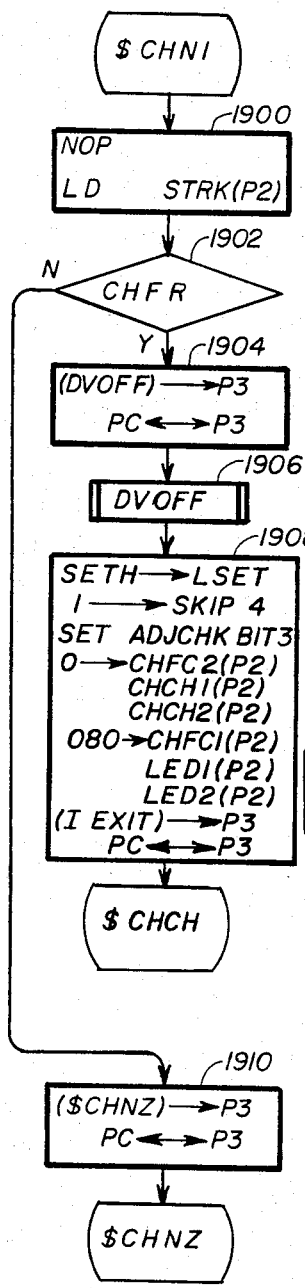

If the initial key struck by the operator when he begins to key in a sequence of adjusting values is either the ROTOR, FAN, CONCAVE or CHAFFER key, an interrupt occurs, the instructions of FIG. 9 are executed, a branch is taken INIT (FIG. 10) and the test at 1006 proves true so a branch is taken to $CHNG where the program proceeds to decision point 1708. At this point a jump is made to block 1710 where a branch is taken to $CHN1 (FIG. 19A).

In $CHN1, the value of the struck key is tested at step 1902 to see if it was the CHAFFER key. Assuming that it was, DVOFF is executed to turn off the device LEDs. At block 1908, the chaffer setting value SETH is transferred to the last set location LSET, SKIP4 is set, ADJCHK bit 3 corresponding to the chaffer is set, the chaffer locations CHFC2 and CHCH2 are cleared and 080 is entered into CHFC1, LED1 and LED2 to set the positions for turning off the decimal point and the device LEDs. A branch is then taken to IEXIT with P3 holding the next following address which is the starting address of the subroutine $CHCH. As IEXIT is executed $CHCH is stored in LP3H and LP3L as the next command address. At the conclusion of IEXIT the program returns to TLOOP where the device LEDs are actually turned off.

Figure 19B:
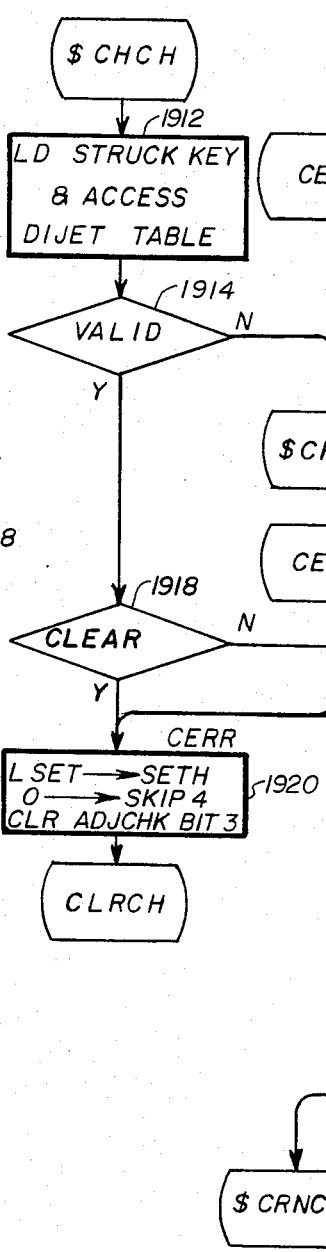

After the CHAFFER key is struck, the next key struck should be a digit key. When the key is struck an interrupt occurs, INTER (FIG. 9) is executed, and a branch is made to $CHCH (FIG. 19B). $CHCH is the chaffer change subroutine and is substantially the same as the sieve change subroutine $SCHA hence $CHCH is not illustrated in detail. The value of the struck key is used to access DIJET and the value read from DIJET is tested at 1914 and 1918 to see if it is valid and not the CLEAR key. If an invalid key is struck the program jumps from decision point 1914 to the $CHNG subroutine and proceeds as described above with reference to a sieve entry. If the CLEAR key is struck the program proceeds to step 1920 where it restores SETH, SKIP4 and ADJCHK to the values they held before the CHAFFER key was struck. After step 1920 the program proceeds to CLRCH (FIG. 18C) and from there to TLOOP through IEXIT in the same manner as described with respect to an error in a sieve entry. If a digit key has been struck the program jumps to step 1929 to see if the digit is the third digit of an entry. If it is, an error condition exists because only two digits are permitted and the program moves to step 1920.

If the test at step 1920 proves false then at step 1922 the concave characters are shifted left one denomination, (i.e. CHCH2 to CHCH1), and TCHAR is loaded into CHCH2. SLIT is then ORed with LED1 or LED2 depending upon the value of the digit.

Next, the sieve switch value is tested at step 1932 to see if the combine is set up for small grain or corn/soybeans. If the combine is set up for corn/soybeans then the keyed value is converted to a setting value according to the equation:

1.62" Corn Chaffer Adjustment = (keyed value) × 2.0625 + 22

Figure 19C:
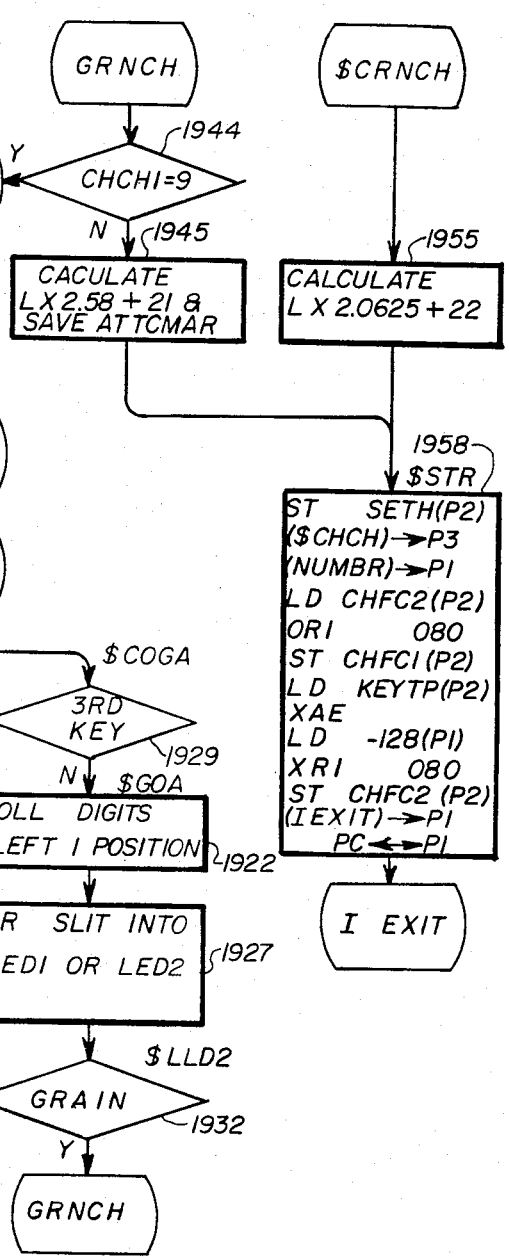

The conversion calculation is illustrated at step 1955 of FIG. 19C. On the other hand, if the test at step 1932 indicates that the combine is set up for small grain then the adjusting value is calculated according to the equation:

Grain Chaffer Adjustment = (keyed value) × 2.58 + 21

This calculation is illustrated at step 1945 of FIG. 19C. However, before the calculation is made, the high order digit CHCH1 is tested to see if it is a nine. If it is, the program proceeds to CERR since the maximum value which may be keyed in to adjust a grain chaffer is 0.89.

After the chaffer adjustment is calculated at either step 1945 or 1955 it is stored at SETH, CHFC2 is ORed with 080 to turn off the decimal point, and the result stored at CHFC1. Next KEYTP is used to index into the NUMBR table to obtain the lighting value which is loaded into CHFC2. The program then branches to IEXIT with the address of $CHCH in P3. During the execution of IEXIT the address of $CHCH is stored at LP3L and LP3H to be used as the next command address at the end of INTER after the next key is struck. Meanwhile, after IEXIT the program returns to TLOOP at the point of interruption and during execution of TLOOP the chaffer display 130 is updated.

After one or two digit keys have been struck to enter the value for setting the chaffer, the operator normally strikes the ADJUST key to cause the system to adjust the chaffer in accordance with the calculated adjustment value stored at SETH. When the ADJUST key is struck an interrupt occurs, INTER (FIG. 9) executed, and a branch made to $CHCH (FIG. 19B) where the test at 1914 indicates that a digit key was not struck. A jump is made to $CHNG (FIG. 17) where, at 1702, a jump is made to $ADJST (FIG. 16) and from there a branch is taken to the Adjust routine ADJUS (FIG. 24A).

From the foregoing detailed explanation of the sieve and chaffer adjustment calculation subroutines it should be evident that the subroutines are closely parallel to each other. In like manner, the rotor, fan and concave adjustment calculation subroutines closely parallel the sieve and chaffer adjustment calculation subroutines. Therefore, to avoid undue repetition only the major differences of the rotor, fan and concave subroutines vis a vis the sieve and chaffer subroutines will be discussed.

Figure 21A:
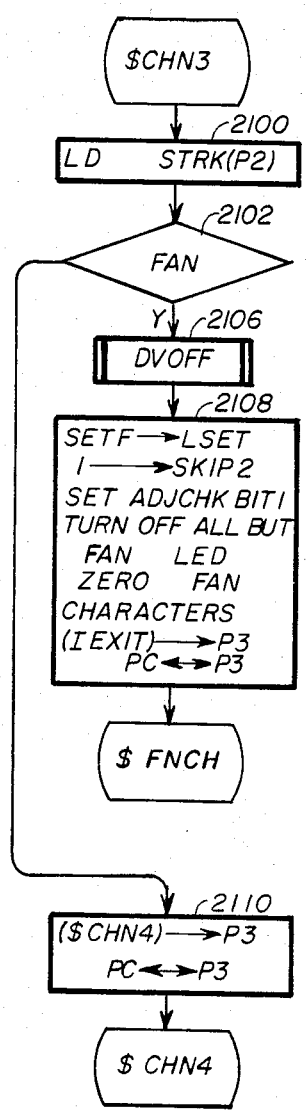

First, it should be noted that tests are made in sequence to determine if the first struck key of an entry is the SIEVE, CHAFFER, CONCAVE, FAN or ROTOR key (i.e. a device key). The striking of one of these keys causes an interrupt, INTER (FIG. 9) is entered, and the program proceeds to INIT (FIG. 10). If a device key was struck the program branches to $CHNG where it jumps to $COGO (FIG. 18A) if the test at 1706 indicates the SIEVE key was struck. If the SIEVE key was not struck, a branch is taken from block 1710 to $CHN1 (FIG. 19A) where a test is made at 1902 to see if it was the CHAFFER key which was struck. If the test indicates that the struck key was not the CHAFFER key then at 1910 the program prepares for a branch to $CHN2 (FIG. 20A). At 2002 a test is made to see if the CONCAVE key was struck. If it was not, then at 2010 the program prepares for a branch to $CHN3 (FIG. 21A). At 2102 a test is made to see if the FAN key was struck. If it was not, then at 2110 the program prepares to branch to $CHN4 (FIG. 22A) where a test is made at 2202 to see if the FAN key was struck.

If any of the device key tests proves true, then the program proceeds to a sequence of steps specific to the device with which the key is associated. For the SIEVE key the program jumps from decision point 1706 to $COGO where, at 1802 and 1804, it turns off all the device LEDs except the sieve LED, sets SKIP5 and ADJCHK bit 4, and zeros the sieve character locations. For the CHAFFER key the program proceeds from decision point 1902 to 1904 to turn off all the device LEDs except the chaffer LED, set SKIP4 and ADJCHK bit 3 and zero the chaffer character. For the CONCAVE key, the program proceeds from decision point 2002 to 2008 where it turns off all device LEDs except the concave LED, sets SKIP3 and ADJCHK bit 2 and zeros the concave characters. For the FAN key, the program proceeds from decision point 2102 to 2108 where it turns off all device LEDs except the fan LED, sets SKIP2 and ADJCHK bit 1 and zeros the fan characters. Finally, for the ROTOR key the program proceeds from decision point 2202 to 2208 where it resets all device LEDs except the rotor LED, sets SKIP1 and ADJCHK bit 0, and zeros all of the rotor characters.

As previously explained, when the SIEVE key is validly struck, and after the instructions in block 1804 are executed, the program branches to IEXIT with the address of $SCHA in P3 so that when the next key (a digit key) is struck the program will branch to $SCHA after INTER is executed so that the struck key may be tested to see if it is a digit key and, if it is, compute the sieve adjusting value. In like manner when the CHAFFER, CONCAVE, FAN or ROTOR key is struck provision is made for a branch to subroutine $CHCH, $CVCH, $FNCH or $RTCH, respectively to check for a struck digit key and compute the chaffer, concave, fan or rotor adjusting value.

Referring to FIG. 20B the concave adjustment calculation subroutine $CVCH is almost identical to the chaffer adjustment calculation subroutine $CHCH. Again, to avoid repetition individual instructions are not all shown in the drawing but should be evident from the routines previously described. The concave adjustment calculation subroutine $CVCH differs from the chaffer subroutine $CHCH in the following respects. First, it calculates the concave adjustment value according to the equation:

Concave setting = (keyed value) × 1.0625 + 54

Secondly, up to three digits may be keyed in at the keyboard for adjusting the concave, the maximum adjusting value which may be validly keyed in being 1.69. Thirdly, since the concave display 128 may display only two characters it is necessary to drop the last digit entered and round off the next to the last digit if three digits (i.e. over 1.00 inch) are keyed in as an adjusting value.

A test is made at 2062 to see if CVCH1 = 0. It will be for the first two digits entered and the program jumps to step 2072.

After the CONCAVE key is depressed, up to three digits may be entered as an adjusting value. Each key depression causes the program to proceed to $CVCH as previously described. The value of the struck key is used to access the DIJET table and the value read from the table is tested to see if the key is valid (step 2014) and not the CLEAR key (step 2018). At step 2022 the contents of CVCH2 and CVCH3 are shifted left into CVCH1 and CVCH2 and the struck key value is entered into the low order position CVCH3. At step 2027 SLIT is ORed into LED1 or LED2 to turn on the LED on the digit key when a return is made to TLOOP.

The high order position CVCH1 is tested at step 2062 to see if it is a zero. It will be zero as the first two digits are entered and the program proceeds to step 2072. If the correction value being entered is greater than 1.00 inch, then after striking the third (lowest order zero) digit the test at 2062 proves false and the program moves to step 2064.

The maximum value which may be validly entered for a concave adjustment is 1.69". Step 2064 checks CVCH1 to be sure the high order digit of the entered value is equal to one. If it is, then at step 2068 CVCH2 is checked to be sure it is not equal to or greater than 7. If CVCH1 is greater than one or CVCH2 is equal to or greater than seven then the program branches to the CLRCH routine (FIG. 18C) after executing the instructions in block 2020.

If the entered value is between 1.00" and 1.69" the program moves from step 2068 to step 2070 where it stores in CONC1 a value for lighting a "1.". The value 100 is saved in TCHAR for the conversion calculation which follows.

Step 2072 produces a sum representing the value of all digits entered. The DIVD subroutine is executed to obtain the fractional values of this sum and at step 2076 the sum is added to 0.0625 times it value and the constant 54 is then added. The result is stored in SETC for adjusting the concave setting when the ADJUST key is struck.

If the value keyed in is greater than 0.99" then the last digit must be rounded off since only the two high order digits may be displayed. Step 2078 tests CVCH1 to see if it holds the value "1.0". If it does, rounding is required and 5 is complement added to the value of the last key struck. The result is tested at 2082 and if it is positive then the last key struck had a value greater than 5. In this case the digit value in CVCH2 is incremented by one at step 2084 and preparations are made for accessing the NUMBR table to get the lighting value for the incremented digit. The table is accessed at 2088 and the lighting value entered in CONC2 together with an indication to turn the decimal point on. Preparations are then made at step 2090 for returning to TLOOP through IEXIT with the address of $CVCH in P3 as the address for branching to on the next interrupt. The decimal point and rounded concave setting value are displayed when TLOOP is executed.

If the test at step 2078 shows that no round off test is necessary, the program goes to step 2086 where it shifts CONC2 into CONC1 and prepares to access the NUMBR table with the value of the last digit entered. The table is accessed at step 2088, the lighting value is entered into CONC2 and an exit taken as before.

If the test at step 2082 indicates that the last digit entered is not greater than 5 then the preceding digit does not have to be corrected. The program jumps to step 2090 and prepares to exit the routine.

Figure 21B:
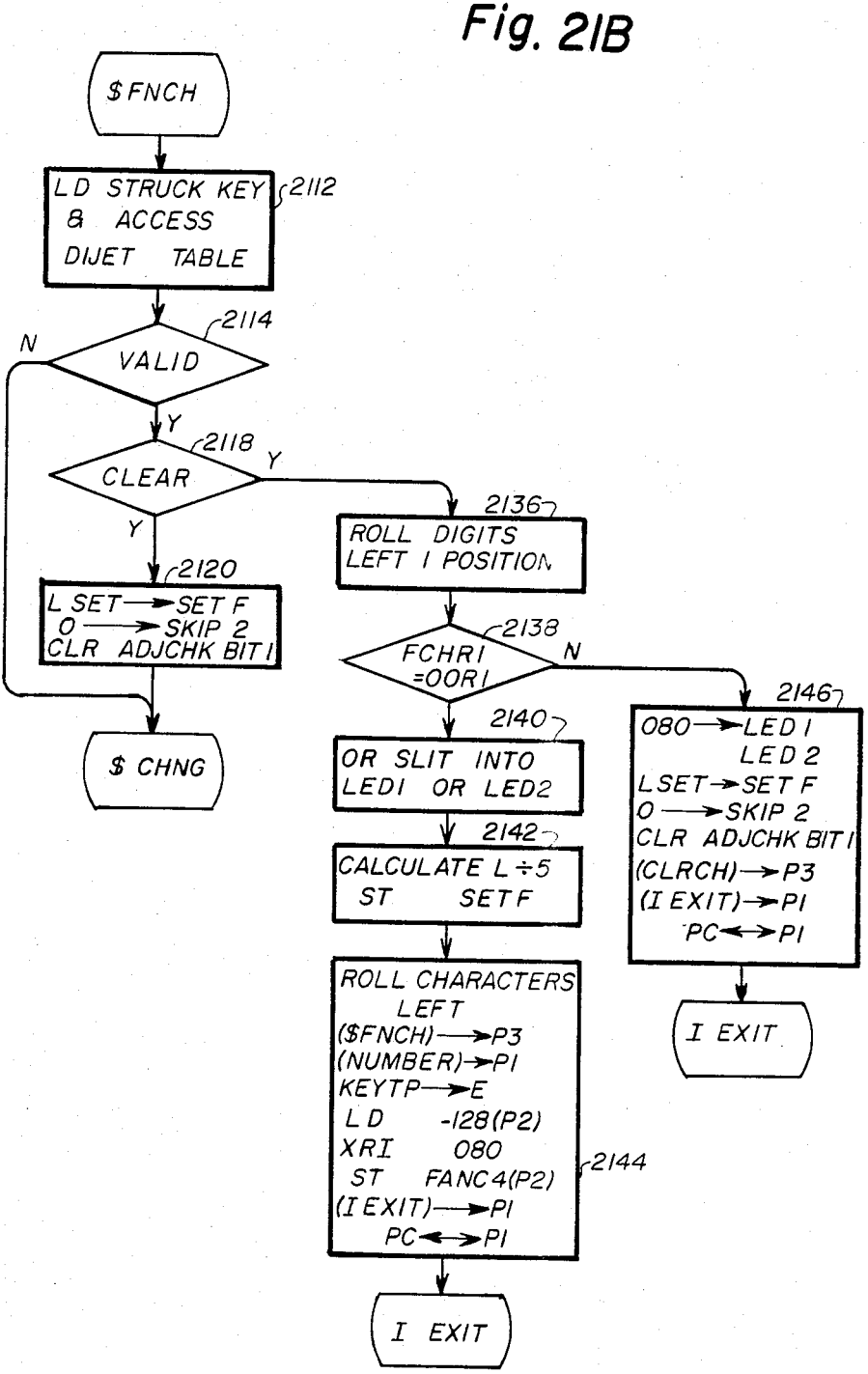

The subroutine $FNCH for calculating the fan speed adjustment value is illustrated in FIG. 21B. The first key struck after the FAN key is struck causes an interrupt and a branch to $FNCH. The key value is used to access the DIJET table and the value read from the table is checked to see if the struck key is valid or is the CLEAR key. If the struck key is invalid the program branches from decision point 2114 to the $CHNG subroutine. If the struck key is the CLEAR key then LSET is returned to SETF, SKIP2 is cleared and the fan indicator bit in ADJCHK is cleared before the program branches to $CHNG.

If a digit key is struck then at step 2136 the fan speed characters FCHR2–FCHR4 are shifted left and the value of the struck key entered in FCHR4. At step 2138 FCHR1 is checked to see if it is a zero or a one since the maximum fan speed must be less than 2000 RPM. If FCHR1 is zero or one then step 2140 sets the LED1 or LED2 indicator to light the LED associated with the last struck key. At step 2142 the fan speed adjustment value is calculated according to the equation:

$$\text{fan speed setting} = \frac{\text{keyed value}}{5}$$

and the result is stored at SETF.

At step 2144 the fan speed display positions FANC-2-4 are shifted left, the NUMBR table accessed to obtain the lighting value for the last digit struck, and the value from the table is entered into FANC4. The program returns to TLOOP through IEXIT with the address of $FNCH in P3 so that when the next key is struck the program returns to step 2112.

If the test at step 2138 shows that FCHR1 is not a zero or a one then the operator has entered an excessively large fan speed value. The program jumps to block 2146 where the indicators in LED1 and LED2 are cleared, LSET is moved to SETF, the fan indicator bit in ADJCHK is reset, and SKIP2 is cleared. These operations will result in the LEDs being turned off and the display of a converted fan speed (obtained from ADC 108) when TLOOP is resumed. The program returns to TLOOP through IEXIT with the address of CLRCH in P3 as the next command address. Therefore, when the next key is struck the program executes INTER (FIG. 9) and branches to CLRCH (FIG. 18C) where DVOFF is executed. The program then returns to TLOOP through IEXIT with $CHNG in P3 as the address of the next command. Since the last key struck by the operator did not produce the desired result, he recognizes that an error has been made. He can again begin entry of the fan speed value.

Figure 22A:
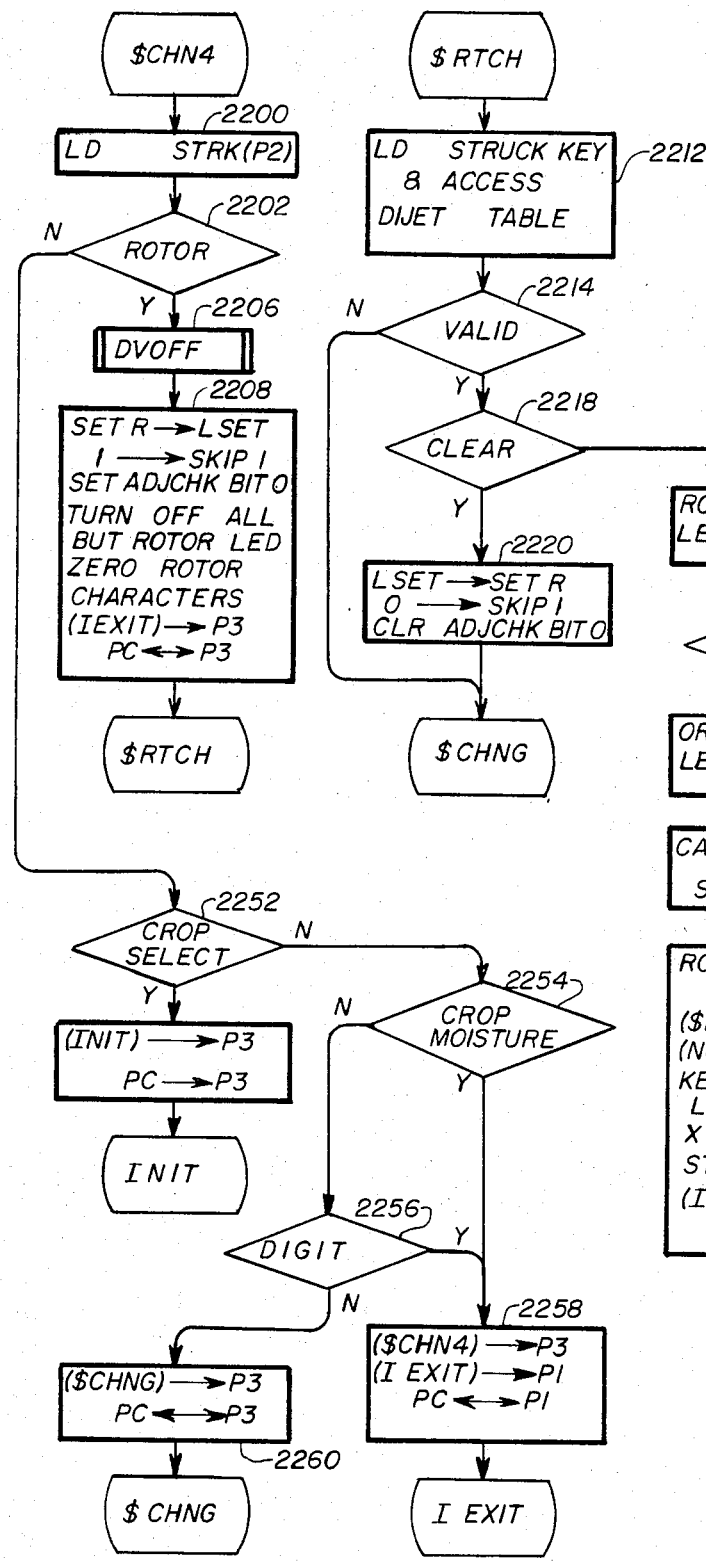
Figure 22B:
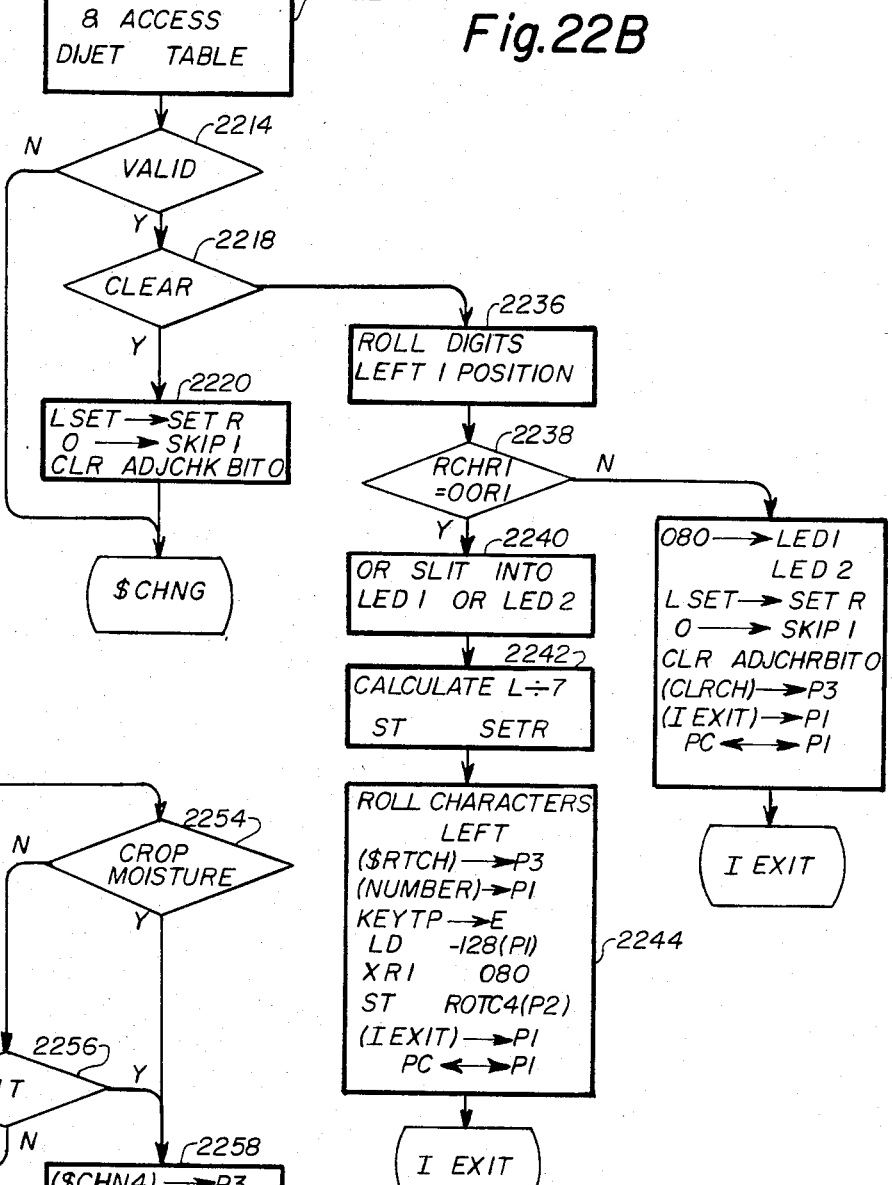

Comparing FIGS. 21B and 22B it is seen that the subroutine $RTCH for calculating the rotor speed adjustment value is similar to the subroutine which calculates the fan speed adjustment value. The primary difference is that $RTCH calculates the rotor speed setting according to the equation:

$$\text{rotor speed setting} = \frac{\text{keyed value}}{7}$$

In the foregoing explanation, reference has been made to "legal keys" or keys which may be validly struck at given times. This explanation has, for purposes of simplification, partially ignored the CLEAR key which is legal at any time after a device key has been struck. The actual striking of the CLEAR key may occur after the device key is struck, or later after one or more of the digit keys has been struck.

Assume for purposes of illustration that the combine operator inadvertently strikes the SIEVE key when he intended to strike one of the other device keys. As a result of striking the SIEVE key, the system executed an interrupt, carried out the INTER subroutine of FIG. 9, branched to the INIT subroutine of FIG. 10, then to the $CHNG subroutine of FIG. 17 and the $COGO subroutine of FIG. 18A before returning to TLOOP through IEXIT with $SCHA in LP3H and LP3L. When the CLEAR key is struck the program branches to INTER (FIG. 9) and then proceeds to $SCHA (FIG. 18B). At decision point 1818 the test indicates that the CLEAR key has been struck so the program proceeds to block 1820 where SKIP5 is cleared and the sieve bit in ADJCHK is reset. A jump is made to $CHNG (FIG. 17) where 080 is stored in CLED1 and CLED2 at 1700. The tests at 1702 and 1706 prove false and at 1708 the test of the struck key value indicates that the CLEAR key was struck. The address of the CLEAR subroutine is entered into P3 and a branch is taken to the Clear subroutine (FIG. 23) where 080 is loaded into LED1 and LED2. The DVOFF subroutine is executed to set the indicator values for turning off the device LEDs. Upon the return from DVOFF the starting address of INIT is loaded into P3 and a branch taken to IEXIT (FIG. 11) where INIT is stored in the next address location LP3H and L3PL. After completion of IEXIT the program returns to TLOOP where the indicator LEDs are turned off. The operator may now strike the correct device key.

An entry for the chaffer, concave, fan or rotor is cleared in substantially the same manner as a sieve entry with the detection of the striking of the CLEAR key occurring at 1918 (FIG. 19B), 2018 (FIG. 20B), 2118 (FIG. 21B) or 2218 (FIG. 22B), respectively.

If the operator has struck the wrong device key, it is not necessary for him to strike the CLEAR key before striking the correct key. For example, if the operator inadvertently strikes the SIEVE key (assuming the strike is legal) he may cancel his entry by striking the correct key if the correct key is anything other than a digit or the CROP MOISTURE key. The operations are the same as described above when the SIEVE and CLEAR keys were struck in that sequence except that upon entering $SCHA (FIG. 18B) after the striking of the correct key, the test at decision point 1814 indicates an invalid key. The program jumps to $CHNG, checks at 1702 to see if the struck key was the ADJUST key and checks at 1706 and 1708 to see if it was the SIEVE or CLEAR key. If any of these checks proves true the program proceeds from the test point as previously described. If all checks prove false then a branch is taken to $CHN1 where a test is made at 1902 to see if the struck key is the CHAFFER key. If not, then branches are taken successively to $CHN2, $CHN3 and $CHN4 where tests are made at 2002, 2102 and 2202 to see if the struck key is the CONCAVE, FAN or ROTOR key. Of course if any of these tests proves true, then, as previously described, the program prepares for receiving the digit values which should follow. If all of these tests prove false, then from decision point 2202 the program moves to 2252 where a test is made to see if the struck key is the CROP SELECT key. If it is, a branch is taken to INIT (FIG. 10) where the test at 1002 proves true. The program jumps to $CROP and proceeds as if the CROP SELECT key were the first key struck.

In FIG. 22A, if the test at 2252 indicates that the struck key was not the CROP SELECT key then a test is made at 2254 to see if it was the CROP MOISTURE key. Assuming it was not, a test is made at 2256 to see if it was a digit key.

If the test at 2254 or 2256 proves true, the struck key is still wrong and is ignored. $CHN4 is loaded into P3 and a branch taken to IEXIT where $CHN4 is stored in LP3H and LP3L as the address of the next command. The program returns to TLOOP upon completion of IEXIT. When another key is struck INTER (FIG. 9) is executed and the program branches to $CHN4 (FIG. 22A) where it begins testing to determine which key was struck. If the test at 2256 shows that the struck key is not a digit key then the program branches to $CHNG (FIG. 17).

Adjustment Routine

The purpose of the Adjustment routine is to adjust either a particular device parameter i.e. sieve opening, concave clearance, chaffer opening, rotor speed or fan speed, or to adjust all of these parameters. All of the parameters are adjusted from values stored in the memory if the operator strikes the CROP SELECT key, the MOISTURE key, one of the moisture level keys HIGH, LOW or MEDIUM, and the ADJUST key in that order. One only of the parameters is adjusted from values keyed into the keyboard if the operator strikes the SIEVE, CONCAVE, CHAFFER, FAN or ROTOR key, then one or more digit values, and then the ADJUST key. The derivation of the adjustment values has been explained above in connection with the Interrupt routine. It is the purpose of the Adjust routine to use these values to activate the actuators which adjust the parameters.

The Adjust routine is entered in FIG. 24A, where the selection address of RAM I/O 106 is loaded into P1 and X'FF stored at locations 22 and 23. This sets ports A and B of RAM I/O 106 for output. Steps 2401 and 2402 test ADJCHK to see if either the fan speed and/or rotor speed is to be adjusted. If not, the program jumps at step 2410 to step 2411 where it branches to CONADJ (FIG.

24B). This bypasses the fan and rotor speed adjustment sections of ADJUS. It also bypasses an engine speed (full throttle) test since the engine must be operating at full throttle for the fan or rotor speed adjustments only.

Figure 28:
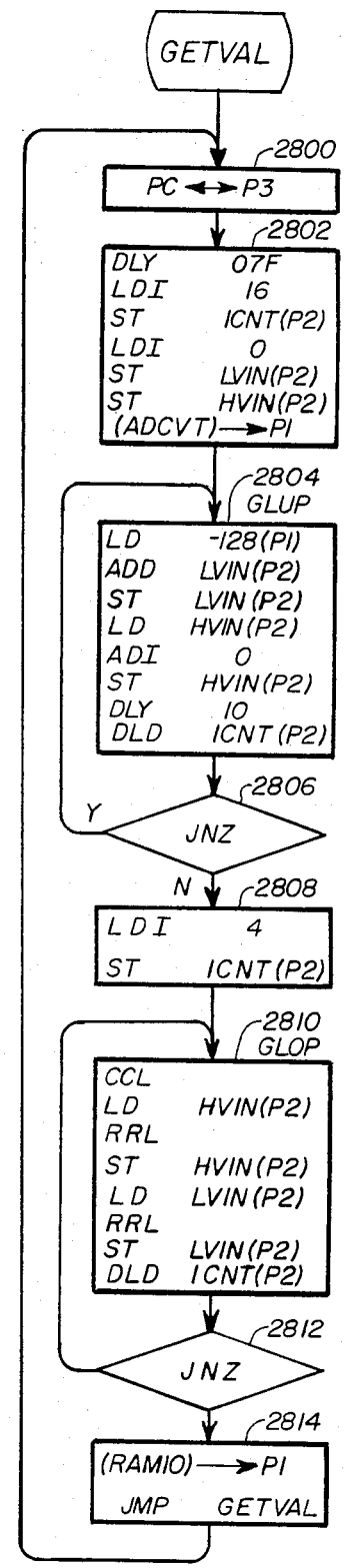

If the test at step 2402 indicates that either the rotor or fan speed is to be adjusted then at step 2403 the starting address of a subroutine GETVAL is loaded into P3 and the value 2 loaded into the E register. The program then branches to GETVAL (FIG. 28). GETVAL is a subroutine which reads 8 values from the same addressed input of ADC 108, sums these 8 values, and divides by 8 to obtain an average value. A comparison of FIG. 28 with FIG. 6 shows the similarity between GETVAL and the previously described GVAD subroutine hence a further description of GETVAL is unnecessary.

When the branch was taken to GETVAL, the index value 2 in the E register caused the engine speed input to ADC 108 to be sampled. The average value is in LVIN when the return is made from GETVAL and TFULL is subtracted at 2407 from the value LVIN. TFULL is a value (X'C0) representing the full throttle condition. A test is made at 2408 to see if the actual engine speed exceeds TFULL. If it does not, the program loops back to 2403 and repeats steps 2403–2408 until the combine operator increases the throttle. The instructions in block 2405 set LED2=0, LED1=080 and prepare for a branch to the subroutine LITED to light the THROTTLE LED and turn off the RUN LED.

Figure 26:
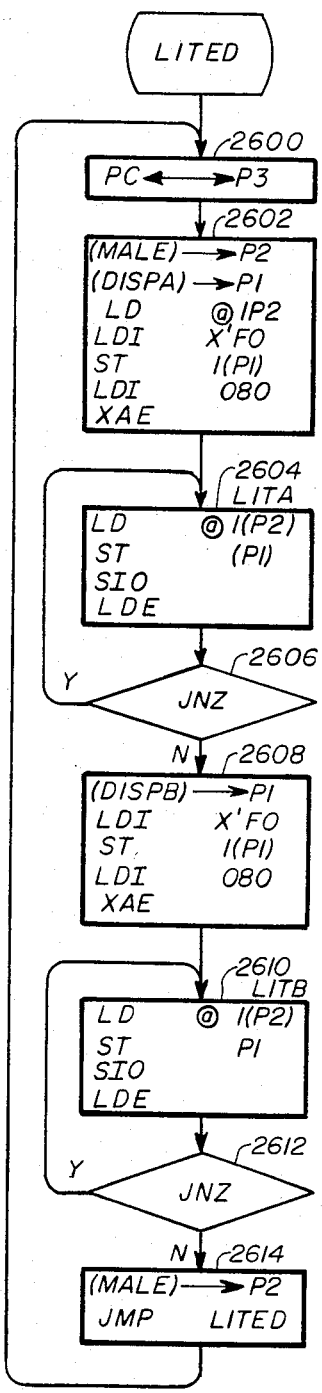
FIG. 26—LITED
FIG. 27—CONVR
FIG. 28—GETVAL.

LITED is shown in FIG. 26 and is a lighting routine for the displays. Upon entering the subroutine, the first instructions load the selection addresses MALE and DISPA into P2 and P1, respectively. A dummy read cycle is executed after which a control word X'F0 is sent to Display A (driver system 134). Next, the value 080 is loaded into the E register as a cycle count. The instructions in blocks 2604 and 2606 cause eight words (ROTC1–ROTC4 and FANC1–FANC4) to be read from locations 1–8 in RAM I/O 106 and stored in the RAM within driver system 134. After eight words are transferred the test at 2606 proves false and the program proceeds to block 2608 where preparations are made for transferring eight more words, this time to the RAM within driver system 136. Because of the auto-indexing feature of the microprocessor 100, these eight words are read from locations 9–16 of RAM I/O 106. Locations 9–14 store the lighting values for the concave, chaffer and sieve displays while locations 15 and 16 store LED1 and LED2. Therefore, the LITED routine executed at 2406 turns off the RUN LED on the keyboard, turns on the THROTTLE LED, and lights the displays in accordance with the values read from RAM I/O 106. This provides a visual indication to the operator that he should adjust the throttle to increase the engine RPM, and further provides a visual indication of the operating parameters.

When the operator has adjusted the throttle so that the engine speed equals or exceeds TFULL, the test at 2408 will prove false. The program proceeds to the first step 2412 of a loop comprising steps 2412–2415. This loop samples the rotor speed and compares it with a fixed value (77) representing rotor idle speed. The loop is repeated if the rotors are not turning as fast as the idle speed. This prevents damage to the rotor or fan speed adjusting systems. If the sampled rotor speed is greater than the rotor idle speed then at step 2417 values are loaded into the associated storage locations in RAM I/O 106 for blanking the rotor display, turning off the RUN, THROTTLE, FAN, CONCAVE, SIEVE and CHAFFER LEDs and turning on the ROTOR and ADJUST key LEDs. The subroutine LITED is executed at 2418 to send the values to the display drivers 134 and 136 to control the LEDs and displays.

The instructions in block 2419 place the address of the ADC 108 in P1, compute the sum of the crop and moisture offsets, store the total offset value at OFFS and prepare to check ADJCK to see if the rotor is to be adjusted Bit 0 of ADJCHK is tested at step 2420 and if it shows that the rotor is to be adjusted the program enters a loop comprising blocks 2421–2423. At block 2421 the rotor value is again sampled by executing instructions as indicated at steps 2412 and 2413 with the sampled value of the actual rotor speed being placed in LVIN. The desired rotor speed is in SETR, and the actual rotor speed is subtracted therefrom. The result is tested at 2423 and if the actual speed is greater than the desired speed the instructions in block 2424 are executed to set indications to clear the faster bit (RAM I/O address 6) and set the slower bit (RAM I/O address 23). The program then jumps back to block 2421 to again obtain from ADC 108 an indication of the actual rotor speed.

Meanwhile, the setting of the "slower bit" in the RAM I/O 106 produces a signal through one of the drivers 122 which drives a slower rotor speed output lead. This lead is connected to an actuator for the rotor speed control which then slows down the rotor speed. The loop of instructions is repeated until the actual rotor speed is no longer greater than the desired rotor speed at which time a jump is taken from decision point 2423 to decision point 2425.

If on the first execution of the loop 2421–2424 the test at 2423 indicates that the actual speed is not greater than the desired speed, a jump is made to 2425 where a test is made to see if the two speeds are equal. If they are not, the program moves to 2426 where indications are set in 7(P1) and 22(P1) to clear the slower bit and set the faster bit. This causes one of drivers 122 to output a signal which, when applied to a rotor speed actuator, causes an increase in rotor speed.

The program loops back to 2421 and continues executing the instructions in blocks 2421–2423, 2425 and 2426 until, at 2425, the test indicates that the actual rotor speed is equal to the desired rotor speed. The program then jumps to 2427. If the test at step 2420 indicates that the rotor speed is not to be adjusted, the program jumps directly to block 2427 which clears the indicators for both the faster and slower bits. This completes the adjustment of the rotor speed but the rotor display must still be updated.

At block 2428 the rotor LED is turned off, the fan LED is turned on, and the fan characters are blanked. The display is not updated at this time; only the indicator values in memory are set, the actual changing of the lights taking place when LITED is executed at 2438 in FIG. 24B.

If the adjustment routine being executed is the result of keying in some desired adjustment value, there is no need to derive converted values before lighting the display. In this case, the value X'FF was loaded into COFF at 1704 during execution of the $CHNG subroutine and at 2419 (FIG. 24A) this value was stored at OFFS. At 2428 OFFS is XORed with X'FF and the result tested at 2429. If the result is zero a jump is taken to 2433 to load SKIP1 into the accumulator. At 2434

SKIP1 is tested to see if it is set. If it is not set, then the keyed-in adjustment being made does not involve the rotor so a jump is made to 2437 to execute LITED which actually light the displays in accordance with the data stored in RAM I/O 106.

Figure 24B:
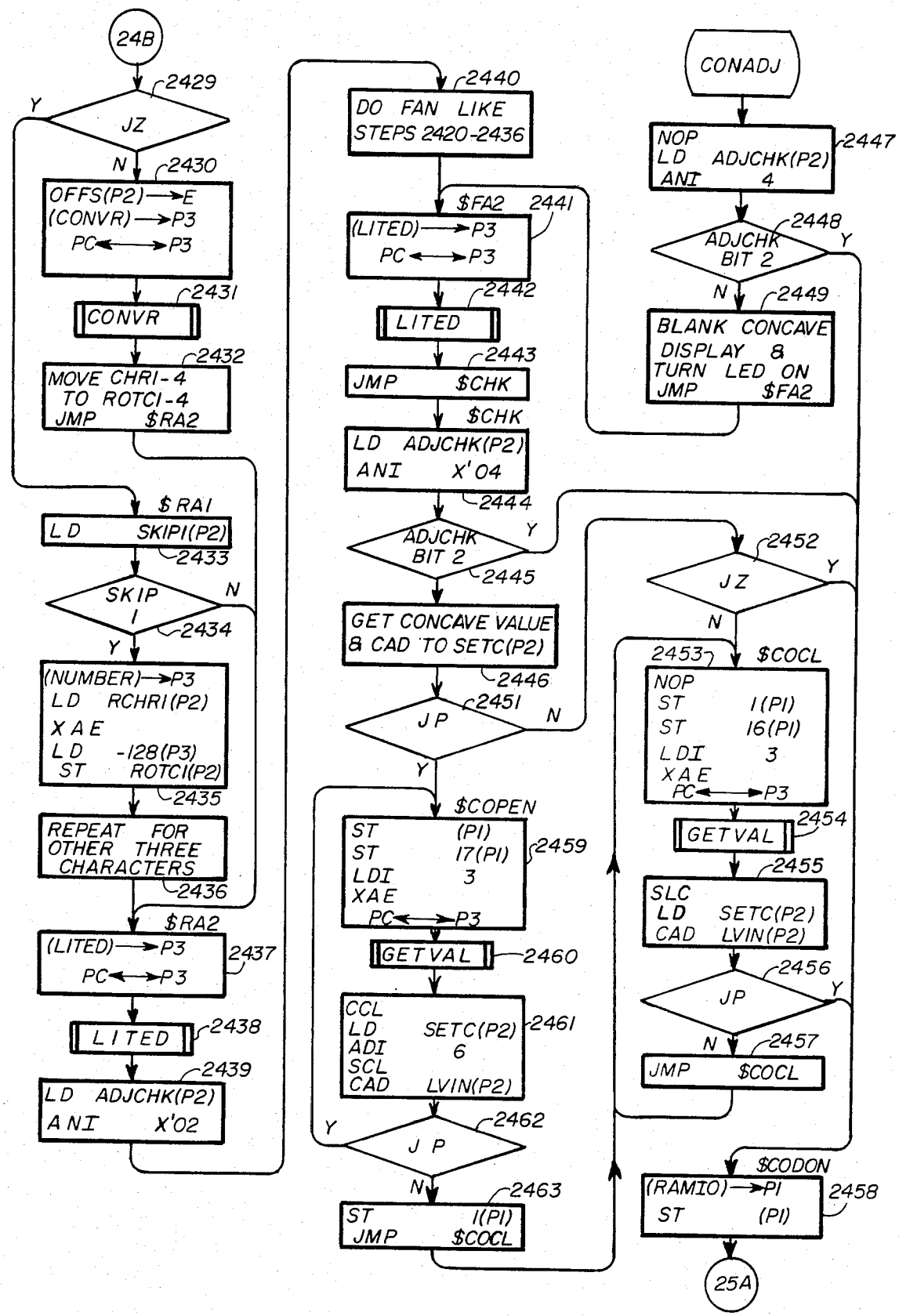

If the adjustment routine being executed has resulted from a keyed entry in which the ROTOR, digit key(s) and ADJUST key were struck in sequence, the lighting values must be obtained from the NUMBR table for updating the rotor speed digit display 124. During keying of the rotor speed entry, or more specifically after the ROTOR key is struck, a "1" is set in SKIP1 at 2208 (FIG. 22A). In FIG. 24B, the presence of the "1" in SKIP1 is detected at 2434 and the program moves to block 2435 where it obtains the NUMBR table lighting value for the high order digit of the rotor display and stores it at ROTC1. At block 2436 the NUMBR table is accessed three more times using RCHR2-RCHR4 to obtain the lighting values for the three lower order digits of the rotor display which are then stored at ROTC2-ROTC4. When LITED is executed at 2438, the contents of ROTC1-ROTC4 (locations 1-4 in RAM I/O 106) are sent to the display driver system 134 along with the other lighting values to update the displays.

If the Adjust routine is being executed as the result of striking the CROP SELECT key, one of the crop keys, the MOISTURE key, one of the moisture level keys, and the ADJUST key, then the rotor speed value loaded into SETR at 1516 must be converted to a lighting value. Rather than calculate the display value from SETR, a table look-up procedure is used. At 2429 the test yields a non-zero value and the program proceeds to block 2430 where OFFS is loaded into the E register and a branch is made to a conversion routine CONVR.

Figure 27:
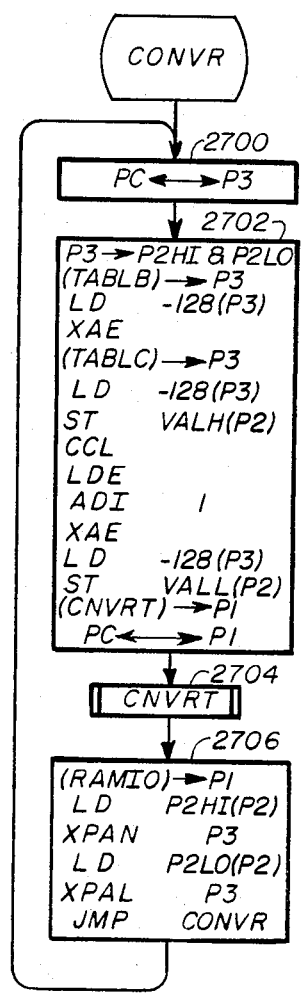

CONVR is illustrated in FIG. 27 and is the table look-up routine. Actually, this routine accesses one table (TABLB) to obtain the offset into a second table (TABLC). The purpose of this procedure is to reduce the table size. TABLC contains hexadecimal values representing speeds in the range of, for example 540 to 1340 RPM, and values representing distances in the range of, for example, 0.09 to 1.0 inch. The speed values may be accessed for either rotor or fan speed display while the distances may be accessed for displaying the concave clearance, sieve opening or chaffer opening. The values in TABLB and TABLC may vary from one model combine to another as will be evident to those skilled in the art hence specific table values are not set forth herein. However, it should be noted that TABLB contains one set of values for each possible combination of crop and a moisture level, each set of values comprising 5 offset values for accessing rotor speed, fan speed, concave clearance, sieve opening and chaffer opening values in TABLC.

CONVR begins by saving P3 at P2HI and P2LO. The base address of TABLB is loaded into P3 and TABLB accessed using OFFS as the offset. This reads from TABLB the offset into TABLC for the particular crop and moisture level selected. This offset value is loaded into the E register and the base address of TABLC is then loaded into P3 to index into TABLC at the location specified by the value read from TABLB. This location stores the two high order hexadecimal digits of the rotor speed value and they are stored at VALH. The E register is then incremented by one and TABLC accessed again, this time to read the two low order digits of the rotor speed value. These digits are stored at VALL and the program branches to the CNVRT (FIG. 7) which converts the hexadecimal representation of the rotor speed in VALH and VALL into a decimal representation. Upon return to CONVR from CNVRT, the operations in block 2706 return the saved value in P2HI and P2LO to P3 and a jump is made to 2700 where PC and P3 are exchanged. This returns the program to block 2432 (FIG. 24B). The CNVRT subroutine placed the decimal representation of the rotor speed in CHR1-CHR4. The contents of these locations are transferred to ROTC1-ROTC4 and a jump is taken to block 2437 to prepare for entering the LITED subroutine at 2438. The LITED subroutine sends the rotor speed value to display driver 134 where it lights the digits of the rotor speed display 124. The LITED subroutine also sends to the display drivers 134 and 136 the values stored in locations 5-16 of the RAM I/O 106 to light the fan, concave, chaffer and sieve displays 126, 128, 130 and 132.

After execution of the LITED subroutine at 2438, the operations relating to the rotor speed are completed and the program proceeds to the adjustment of the fan speed. The fan speed is adjusted in the same manner as the rotor speed hence the routine is not illustrated in detail. Block 2440 schematically represents the fan speed adjustment steps corresponding to rotor speed adjustment steps 2420-2436.

There are, however, three minor exceptions. ADJCHK bit 1 is tested and the fan speed adjustment process is bypassed if the bit is not set. Next, if OFFS=X'FF, it is SKIP2 which is tested to see if lighting values must be obtained from the NUMBR table. The other exception is that at a step corresponding to step 2430 OFFS+1 rather than OFFS is used to access TABLB. This causes TABLB to be accessed at the location next to the location accessed when preparing to display the rotor speed. This location stores the indexing value into TABLC for the fan speed for the same crop and moisture level as for the rotor speed which was derived at blocks 2430-2432.

After the fan speed is adjusted the display is updated by executing steps 2441 and 2442. At this point the program is ready to adjust the concave. Steps 2444 and 2445 check the concave bit in ADJCHK to see if the concave requires adjustment. If it does the program proceeds to the concave adjustment routine at step 2446. If the concave does not require adjustment a jump is made to step 2458.

Digressing for a moment, it was previously explained that the rotor and fan speed adjustements may be bypassed if neither requires adjustment. In this case the program branches to CONADJ in FIG. 24D where it tests at step 2448 to see if the concave requires adjustment. If it does not, a jump is made to step 2458. If it does, the concave display locations are blanked at step 2449 and the program jumps to step 2441 to update the display.

The concave adjustment begins at block 2446 by addressing the ADC 108 and obtaining the value of the actual concave setting which is then stored at LVIN. The actual concave setting is then subtracted from the desired concave setting SETC and the result tested at 2451. If the actual concave setting is greater than the desired setting the program proceeds from decision points 2451 and 2452 to block 2453 where it turns "off" the "open" motor and turns "on" the "close" motor. Actually, this is accomplished by loading locations 1 and 16 of the I/O portion of RAM I/O 106, the loading of these locations terminating the output PA1 and turning on the output PA0 from RAM I/O 106. It is these outputs which drive the actuators which move the concave in one direction or the other.

As the concave setting is changing, the instructions in the loop 2453-2457 are executed to read new actual values of the concave setting from ADC 108 and compare them with the desired concave setting. This continues until the actual concave setting is equal to the desired concave setting. This condition is detected at 2456 and a jump is made to 2458 where the "close" motor or actuator for the concave is turned off.

If the actual concave setting is equal to the desired concave setting, no adjustment is necessary. The equality is detected at 2452 and the program jumps to 2458.

If the actual concave setting is less than the desired concave setting, the concave must be opened. From decision point 2451 the program moves to block 2459 where the concave open actuator is turned on and the concave close actuator is turned off. The ADC 108 is addressed to get the actual concave setting which is stored in LVIN at step 2460. Next, a fixed value is added to the desired concave setting. The reason for this is to accommodate backlash and the inherent inaccuracies in positioning mechanical linkages. The addition of the fixed value insures that the desired concave setting will always be approached in the same direction, that is, with the concave moving in the direction to close the concave clearance with the rotor. The actual concave setting is subtracted from the modified desired concave setting at step 2461 and the result tested at 2462. As long as the modified desired concave setting is greater than the actual concave setting, the program jumps from 2462 to 2459 and repeats the "open concave" sequence. During this interval the RAM I/O is outputting a signal through one of the drivers 122 to the actuator which drives the concave in the opening direction.

Eventually, the test at 2462 will show that the actual concave setting and the modified desired concave setting are equal. At this point the concave has been adjusted too far from the rotor. The concave open actuator is turned off at 2463 and a jump is made to the concave close loop beginning at 2453. The program then proceeds to control the concave actuator motors to close the concave to the desired setting as previously described.

Figure 25A:
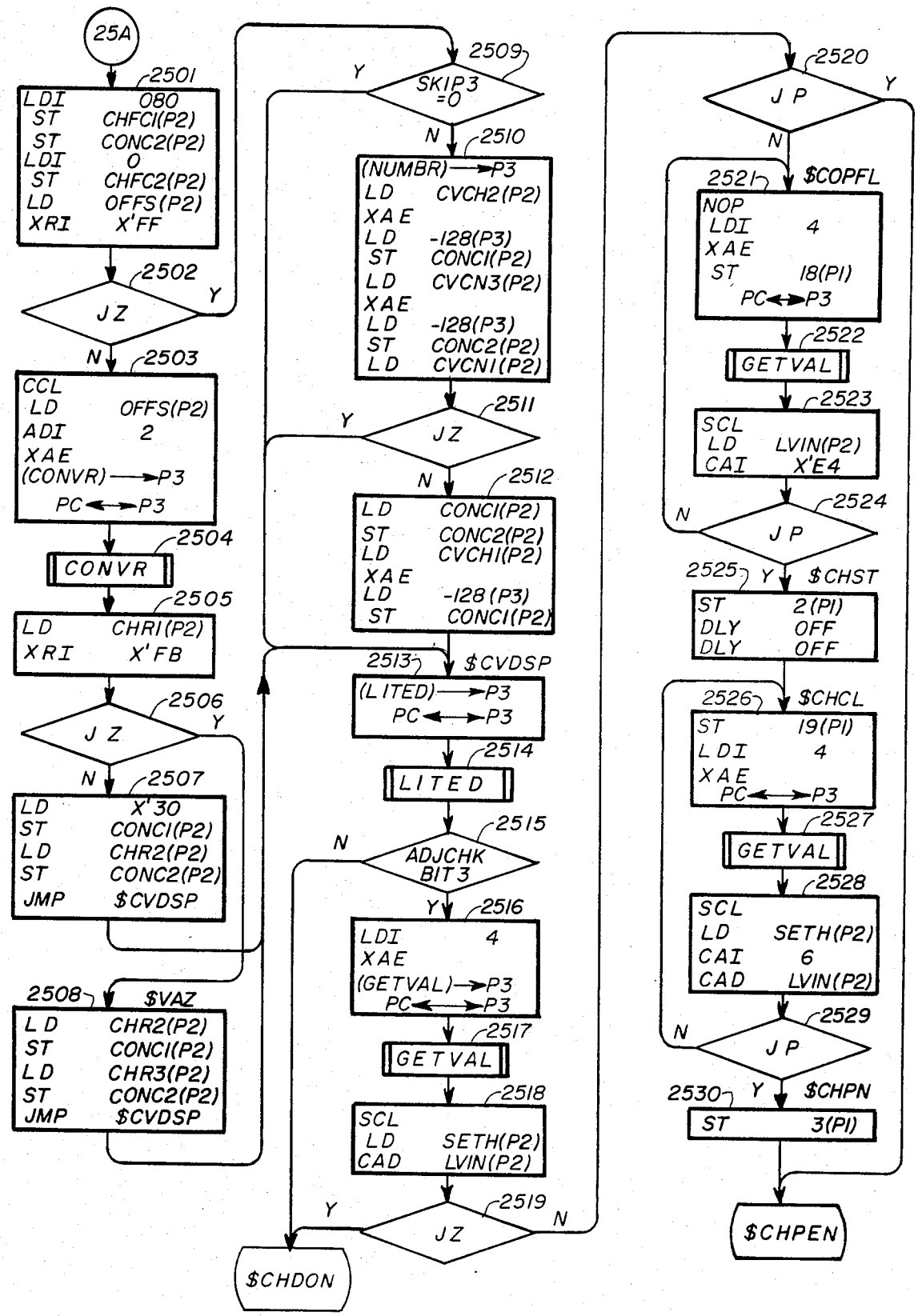

When the last instruction in FIG. 24B has been executed, the adjustment of the concave is completed but the concave display must be updated. In FIG. 25A, the concave LED is turned off at 2501. In addition, since the chaffer is the next device to be adjusted, the chaffer display 130 is blanked and the chaffer LED 188 turned on. The total offset OFFS is tested at 2502 to see if the adjustment routine was entered by selecting a crop and a moisture level in which case the table of stored values must be accessed to obtain the concave display lighting values. Assuming this is the case, the operations in blocks 2503 and 2504 are executed to obtain the concave display value which is stored in CHR1-CHR4. These operations are similar to the operations for obtaining the fan display values as described above with reference to blocks 2430 and 2431 (FIG. 24B).

At 2505 CHR1 is XORed with X'FB and at 2506 the result is tested to see if CHR1 is a zero. If it is a jump is made to 2508 where CHR2 and CHR3 are loaded into CONC1 and CONC2, respectively. A jump is made to block 2513 where preparations are made for lighting the display by executing the lighting subroutine at 2514.

If the test at 2506 indicates that CHR1 is not a zero the instructions in block 2507 load "1." into CONC1 and transfer CHR2 to CONC2, after which a jump is made to block 2513 to set up the lighting subroutine.

Returning to decision point 2502, if the test proves true it means that the adjustment routine was entered after striking a device key and a setting value for that device. A jump is made to 2509 where SKIP3 is tested to see if the struck device key was the CONCAVE key. If it was not, the concave lighting value does not require updating so a jump is made to 2513 where preparations are made for executing the lighting subroutine at 2514.

If the test at decision point 2509 indicates that the CONCAVE key was the last device key struck before entering the Adjust routine then the digit values keyed in between the striking of the CONCAVE and ADJUST keys must be converted to lighting values before the concave display is lighted. The accessing of the NUMBR table with CVCH2 and CVCH3 is accomplished at 2510 and the lighting values are stored at CONC1 and CONC2 (note the shift left). CVCH1 is tested at 2511 and if it is a zero a jump is made to 2513 in preparation for lighting the display.

If CVCH1 is not zero, the instructions in block 2512 are executed to shift CONC1 right into CONC2, access the NUMBR table with CVCH1 to obtain its lighting value, and store the lighting value in CONC1. The program then proceeds to 2513 which prepares for a branch to the lighting subroutine which is executed at 2514.

Figure 25B:
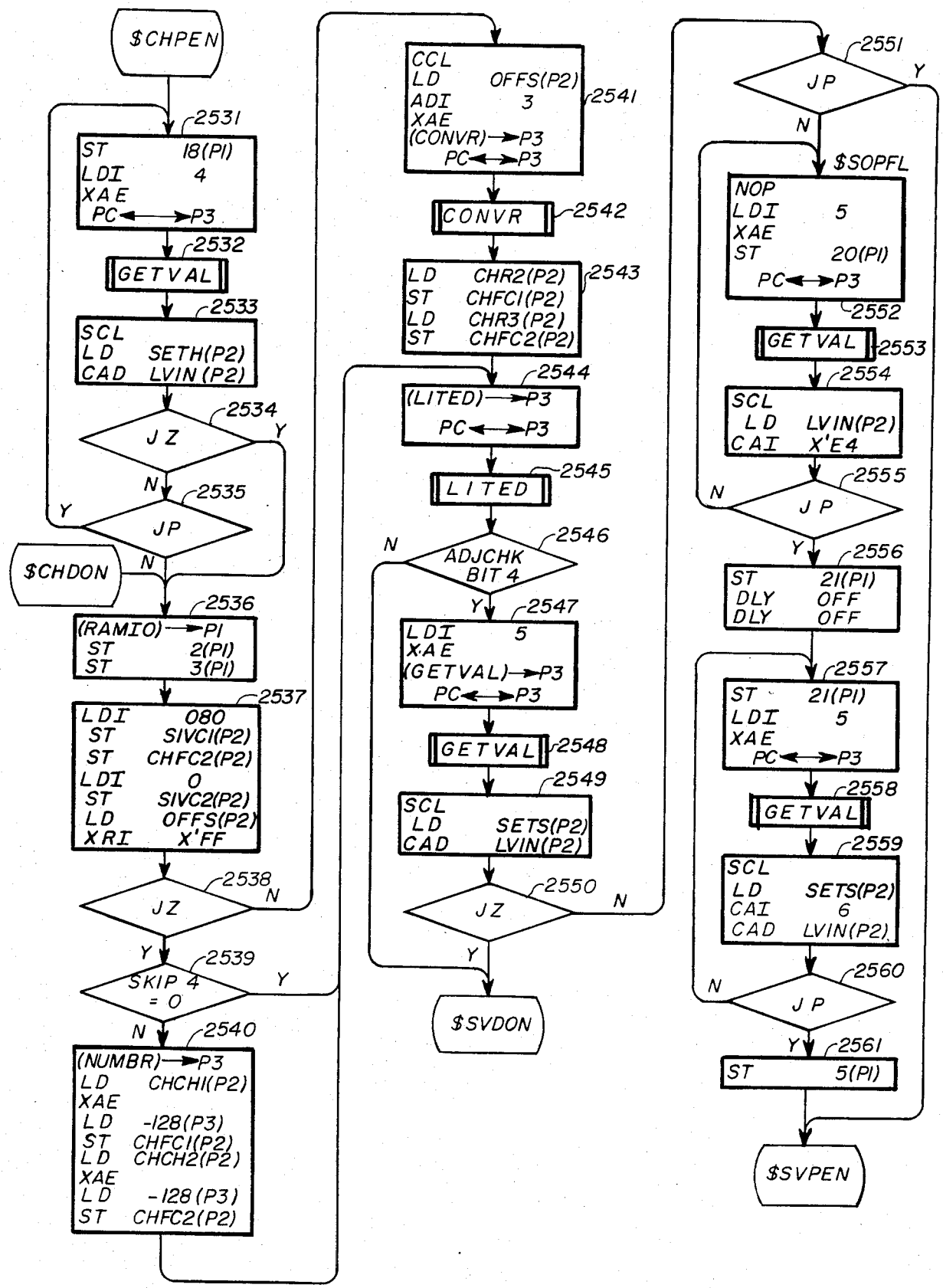
Figure 25C:
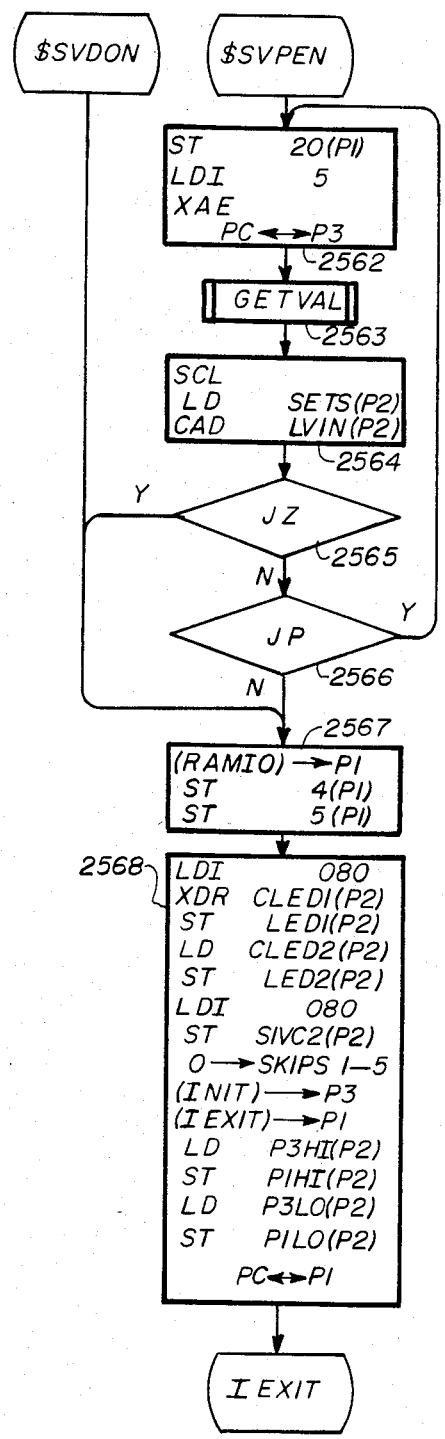

After the lighting subroutine at 2514 is executed, the lighting of the concave display is complete and the program is ready to adjust the chaffer opening. At 2515 the chaffer bit in ADJCHK is checked to see if the chaffer requires adjustment. If it does not, a jump is made to $CHDON (FIG. 25B). If the chaffer must be adjusted, the instructions in blocks 2516 and 2517 address the ADC 108 to obtain the actual chaffer setting. After the actual setting is obtained, it is subtracted from the desired chaffer setting in SETH (block 2518) and the result tested at 2519. If the result is zero, the chaffer is already at the desired setting and a jump is made to $CHDON.

If the test at 2519 proves false, then a test is made at 2520 to see if the desired chaffer setting is greater than the actual chaffer setting. If it is, the chaffer must be opened. A jump is made from 2520 to $CHPEN (FIG. 25B). A comparison of blocks 2531-2535 with blocks 2459-2462 (FIG. 24B) shows that the chaffer opening loop 2531-2535 is similar to the concave opening loop previously described. There are, however, two distinctions.

First, as a final step the chaffer is always driven to the desired setting in the closed-to-open direction which is just opposite the mode of setting the concave. Therefore, block 2533 lacks the addition of the overrun value as is done in block 2461. Also, since the final step in adjusting the chaffer is always a movement in the opening direction a test is provided in the loop at 2534 to determine when the actual chaffer setting is equal to the desired setting. When this occurs a jump is made to 2536 to turn off the actuators.

Returning to FIG. 25A, if the tests at 2519 and 2520 are both false, then the actual chaffer setting is greater than the desired setting and the chaffer must be closed.

When closing the chaffer under automatic control, the control linkage could be damaged if there is foreign material in the chaffer. Thus, to avoid such damage the present system first opens the chaffer to a fully opened (or nearly fully opened) position and, after a delay to allow the foreign material to be cleared by normal combine operation, closes the chaffer to the desired setting.

From decision point 2520 the program proceeds to block 2521 which is the beginning of a loop for fully opening the chaffer. The "open" motor or actuator is turned on and GETVAL is executed at 2522 to address ADC 108 and obtain the actual chaffer setting. At 2523 the value X'E4 (representing a fully, actually a nearly fully opened setting) is subtracted from the actual chaffer setting. The result is tested at 2524 and if the actual setting is less than X'E4 a jump is made back to block 2521.

The loop 2521-2524 is repeated until the chaffer is fully opened. At this point the test at 2524 proves true and the program moves to step 2525 where the motor or actuator for opening the chaffer is turned off. The delay instructions at 2525 delay advancement of the program to allow the foreign material to be removed from the chaffer by normal combine operation.

After the delay, the program proceeds to the loop of instructions 2526-2529 which energize the actuator to close the chaffer toward, and past, the desired setting. In view of the similarity between the loop 2526-2529 and the concave opening loop (2459-2462) one skilled in the art will readily understand the operation of the chaffer closing loop.

The chaffer closing loop is repeated until the chaffer has been moved beyond the desired setting by a predetermined distance. At this time the test at 2529 proves true, the program moves to step 2530 to turn off the actuator for closing the chaffer, and then proceeds to the loop 2531-2535 which opens the chaffer to the desired setting as previously described. The chaffer actuators are then turned off by the instructions at 2536.

The program is now ready to display the chaffer setting. At block 2537 the chaffer LED is turned off, the sieve LED turned on, and the sieve characters blanked. At 2538 OFFS is tested to see if the Adjust routine was entered as the result of keying in an adjustment value. If it was, SKIP4 is tested at 2539 to see if the keyed value represents a chaffer value. If it does, the instructions at 2540 access NUMBR to obtain the lighting values which are stored at CHFC1 and CHFC2. The program then moves to step 2544 and calls the LITED subroutine at 2545 to light the display.

If SKIP4 is not set then the lighting values do not have to be obtained from NUMBR. In this case the program moves directly from 2539 to 2544.

If the adjustment routine was entered as a result of a crop selection then the chaffer opening value to be displayed is obtained by using the CONVR routine. At step 2541 the value three is added to OFFS so as to access a chaffer entry in TABLB. CONVR is called to obtain the chaffer lighting value and upon return from CONVR the lighting values are entered into CHFC1 and CHFC2 at step 2543. LITED is then called to update the chaffer display.

The last parameter to be adjusted is the sieve opening. This is accomplished in the same manner as the adjustment of the chaffer hence the purpose of the sieve adjustment instructions (blocks 2546-2567) is believed to be obvious.

The sieve adjustment is completed when the sieve motors or actuators are turned off at block 2567. Since the sieve is the last parameter to be adjusted, and since the program will return to TLOOP almost immediately thereafter, there is no need to adjust the sieve display. It will be adjusted during TLOOP, along with the other displays, to display a value in accordance with the sieve setting as determined by the output of the ADC 108. This delay in adjusting the sieve display is so small that it is not perceptible to the operator.

At the conclusion of the sieve adjustment the instructions in block 2568 are executed to set the values in memory for turning on the RUN LED, and turning off the ADJUST key LED and the SIEVE key LED. The skip values are all set to zero and the P1 value saved at block 2400 (FIG. 24A) is transferred from the P3 save location to the P1 save location. The address of INIT is placed in P3 and the address of IEXIT placed in P1. PC and P1 are exchanged to branch to IEXIT where INIT is stored at LP3L and LP3H. This will cause the program to proceed to INIT (FIG. 10) after the next key is struck and the instructions of FIG. 9 are executed. Meanwhile, during the interval between the completion of IEXIT and the striking of the next key thr program repeatedly executes TLOOP which causes the ADC 108 to be addressed to obtain the actual values of the various parameters, these values being used to derive lighting values for lighting the digital displays.

In summary, the present invention provides a closed loop system for adjusting and continuously monitoring various operating parameters of a combine, and displaying the values of these parameters to the operator. The operator may utilize the keyboard to vary any one of the parameters. Alternatively, he may key into the keyboard entries identifying a crop to be harvested and the moisture level of that crop. In this case the system selects, from a stored table of values, a set of values for the system parameters. This set of values is then utilized to adjust the parameters so that maximum efficiency (yield) is obtained as the crop is harvested.

While a preferred embodiment of the invention has been described in specific detail, it will be understood by those skilled in the art that various modifications and substitutions may be made in the described embodiment without departing from the spirit and scope of the invention as defined by the appended claims.

For example, it is contemplated that a moisture sensor may be mounted on the combine to sense the moisture level of the crop being harvested, the moisture sensor producing an output signal which may be sampled at ADC 108 during execution of TLOOP in the same manner as the other operating parameters. The moisture level thus sensed could then be categorized as low, medium or high. Thus, when the moisture level sensor is utilized the system does not require the MOISTURE key or the three moisture level keys. Automatic adjustment of all parameters would thus be accomplished in response to crop selection only at the keyboard.

The embodiments of the invention in which an exclusive property or privilege is claimed are defined as follows:

1. In a combine harvester adjustment system having a plurality of actuator means for selectively adjusting a corresponding plurality of system operating parameters over ranges of values, the improvement comprising:
   a keyboard including a plurality of crop keys, one for selecting each of a plurality of crops;

first means for producing a signal representing the moisture level of a crop to be harvested;

memory means for storing sets of optimum operating values, there being one set of optimum operating values corresponding to each different combination of crop and moisture level with each set including an optimum operating value for each actuator means;

a microprocessor responsive to said first means and to actuation of one of said crop keys for reading from said memory the corresponding set of operating values; and, output means responsive to said microprocessor and optimum operating values read from said memory for applying adjusting signals to said actuator means to adjust said operating parameters to said optimum operating values within the range of values for harvesting the selected crop.

2. The improvement as claimed in claim 1 wherein said first means comprises a plurality of moisture keys on said keyboard.

3. The improvement as claimed in claim 1 wherein said improvement includes a data bus, said microprocessor, memory means and keyboard being interconnected by said data bus.

4. The improvement as claimed in claim 3 and further comprising:

sensor means for sensing each of said operating parameters and producing analog signals proportional thereto; and, analog to digital converter means responsive to said sensor means for converting said analog signals to digital signals;

said converter means being connected to said data bus whereby said digital signals may be applied to said microprocessor.

5. The improvement as claimed in claim 3 and further comprising:

means for sensing each of said operating parameters and producing digital signals representing said parameters; and means for applying said digital signals to said data bus.

6. The improvement as claimed in claim 4 or claim 5 wherein said microprocessor includes means for comparing said digital signals with the operating values read from said memory, said microprocessor controlling said output means to apply said adjusting signals to said actuator means until said digital signals and said operating values are compared and found equal.

7. A combine harvester adjustment system for adjusting operating parameters including the sieve opening, chaffer opening, concave clearance, rotor speed and fan speed, said system comprising:

a closed loop including, sensor means for sensing said sieve, chaffer, concave, rotor speed and fan speed and producing analog signals proportional thereto;

analog to digital converter means responsive to said analog signals for producing digital signals;

actuator means for changing said sieve opening, chaffer opening, concave opening, rotor speed and fan speed; and microprocessor means connected between said analog to digital converter means and said actuator means;

a memory connected to said microprocessor for storing adjusting values; and a plurality of keys connected to said microprocessor, said microprocessor including means responsive to actuation of said keys for comparing adjusting values from said memory with the digital values from said converter means, and applying adjusting signals to said actuator means until said adjusting values and digital signals are equal.

8. In a combine harvester adjustment system having actuator means for adjusting at least one system operating parameter selected from the group comprising sieve opening, concave clearance, chaffer opening, rotor speed and fan speed, the improvement comprising:

means for generating digital signals representing actual operating parameters;

keyboard means for entering data relating to a desired setting of at least one of said parameters;

output means for applying adjusting signals to at least one of said actuator means; and, means responsive to said keyboard means and said means for generating digital signals for comparing one of said operating parameters with the data entered at said keyboard and enabling said output means to apply adjusting signals to one of said actuator means until said one operating parameter is equal to said desired setting.

9. The improvement as claimed in claim 8 wherein said means for generating digital signals comprises a plurality of sensor means for sensing said actual operating parameters and producing analog signals representing said actual operating parameters, and analog to digital converter means responsive to said analog signals for producing said digital signals representing said actual operating parameters.

10. The improvement as claimed in claim 8 wherein said means responsive to said keyboard comprises a microprocessor and memory means interconnected by a data bus, said keyboard and said means for generating digital signals being connected to said data bus.

11. The improvement as claimed in claim 10 and further comprising visual display means connected to said data bus and controlled by said microprocessor for selectively displaying said actual operating parameters.

12. The improvement as claimed in claim 11 wherein said keyboard includes a device key corresponding to each of said operating parameters and a plurality of digit keys, and said display means includes a digital display for each of said operating parameters, said microprocessor including means responsive to the striking of a given device key for lighting the digital display for the associated operating parameter with the values of subsequently struck digit keys.

13. The improvement as claimed in claim 10 and further comprising visual display means connected to said data bus, said microprocessor including means responsive to said keyboard as said data is entered therein for controlling said visual display means to display the data entered into said keyboard.

14. The method of adjusting operating parameters of a combine harvester automatically, said method comprising:

storing sets of adjusting values, there being one set of adjusting values for each combination of a crop and a moisture level for that crop;

each set of values including an adjusting value corresponding to each operating parameter;

repetitively sensing said parameters to obtain the actual values thereof;

selecting a crop and a moisture level to thereby select one of said sets of adjusting values;

comparing the adjusting values in the selected one of said sets of adjusting values with said actual values; and, adjusting each operating parameter until the comparison between the actual value and adjusting value for that parameter indicates that the two are equal.

15. The method as claimed in claim 14 wherein the adjusting of each operating parameter is done sequentially in time.

16. The method as claimed in claim 14 wherein the parameters adjusted are included in a group comprising fan speed, rotor speed, concave clearance, chaffer opening and sieve opening.

17. The method as claimed in claim 14 or claim 16 wherein the moisture level selected is determined by sensing the moisture level of the crop being harvested.

* * * * *